United States Patent
Song

(10) Patent No.: US 12,254,285 B2
(45) Date of Patent: Mar. 18, 2025

(54) PROCESSING-IN-MEMORY (PIM) DEVICES

(71) Applicant: SK hynix Inc., Icheon-si (KR)

(72) Inventor: Choung Ki Song, Yongin-si (KR)

(73) Assignee: SK hynix Inc., Icheon-si (KR)

( * ) Notice: Subject to any disclaimer, the term of this patent is extended or adjusted under 35 U.S.C. 154(b) by 890 days.

(21) Appl. No.: 17/399,939

(22) Filed: Aug. 11, 2021

(65) Prior Publication Data

US 2021/0373852 A1    Dec. 2, 2021

Related U.S. Application Data

(63) Continuation-in-part of application No. 17/145,761, filed on Jan. 11, 2021, which is a continuation-in-part
(Continued)

(30) Foreign Application Priority Data

Jan. 17, 2020    (KR) .......... 10-2020-0006902

(51) Int. Cl.
   *G06F 7/544*    (2006.01)
   *G06F 13/16*    (2006.01)
(52) U.S. Cl.
   CPC ........ *G06F 7/5443* (2013.01); *G06F 13/1668* (2013.01)
(58) Field of Classification Search
   CPC .................................................. G06F 7/5443
   See application file for complete search history.

(56) References Cited

U.S. PATENT DOCUMENTS

| 10,042,639 | B2 | 8/2018 | Gopal et al. |
| 2007/0112446 | A1 | 5/2007 | Deveaux et al. |

(Continued)

FOREIGN PATENT DOCUMENTS

| KR | 1020170097633 A | 8/2017 |
| KR | 1020190080120 A | 7/2019 |
| KR | 1020200066953 A | 6/2020 |

OTHER PUBLICATIONS

B. Xia, P. Liu, Q. Yao, "New method for high performance multiply-accumulator design", J. Zhejiang Univ. Sci. A 10 (7), 2009, pp. 1067-1074. (Year: 2009).

(Continued)

*Primary Examiner* — Michael D. Yaary
(74) *Attorney, Agent, or Firm* — WILLIAM PARK & ASSOCIATES LTD.

(57) ABSTRACT

A processing-in-memory (PIM) device includes memory banks, first and second global buffers, multiplying-and-accumulating (MAC) operators, and output circuits. Each memory bank includes a left memory bank providing left weigh data and a right memory bank providing right weigh data. The first global buffer provides left vector data, and the second global buffer provides right vector data. Each MAC operator includes a left MAC operator performing a MAC operation on the left weight data and the left vector data to generate left MAC data and a right MAC operator performing a MAC operation on the right weight data and the right vector data to generate right MAC data. Each output circuit adds the left MAC data to the right MAC data to generate MAC result data and outputs the MAC result data or activation function-processed MAC result data in response to first and second MAC read signals.

16 Claims, 59 Drawing Sheets

Related U.S. Application Data of application No. 17/090,462, filed on Nov. 5, 2020, now Pat. No. 11,537,323.

(60) Provisional application No. 62/959,574, filed on Jan. 10, 2020, provisional application No. 62/959,593, filed on Jan. 10, 2020, provisional application No. 62/958,223, filed on Jan. 7, 2020.

(56) References Cited

U.S. PATENT DOCUMENTS

| | | |
|---|---|---|
| 2018/0121796 A1 | 5/2018 | Deisher et al. |
| 2019/0096453 A1* | 3/2019 | Shin .................... G11C 7/1006 |
| 2020/0110705 A1 | 4/2020 | Jo et al. |
| 2020/0193277 A1 | 6/2020 | Kwon |
| 2020/0294575 A1 | 9/2020 | O et al. |
| 2021/0382691 A1 | 12/2021 | Kim et al. |
| 2022/0164297 A1 | 5/2022 | Sity et al. |

OTHER PUBLICATIONS

J. L. Hennessy and D. A Patterson, Computer Architecture, Fifth Edition: A Quantitative Approach, 5th ed. San Francisco, CA, USA: Morgan Kaufmann Publishers Inc., 2011, p. 12. (Year: 2011).
N.A.., "Understanding Synchronous Dual-Port RAMs", Cypress Semiconductor Corporation, 2017, pp. 1-10. (Year: 2017).

* cited by examiner

PROCESSING-IN-MEMORY (PIM) DEVICES

CROSS-REFERENCE TO RELATED APPLICATIONS

This is a continuation-in-part of U.S. patent application Ser. No. 17/145,761, filed on Jan. 11, 2021, which is a continuation-in-part of U.S. patent application Ser. No. 17/090,462, filed Nov. 5, 2020, which claims the priority of provisional application No. 62/958,223, filed on Jan. 7, 2020, and Korean Application No. 10-2020-0006902, filed on Jan. 17, 2020, which are incorporated herein by reference in their entirety. The U.S. patent application Ser. No. 17/145,761 also claims the priority of provisional application No. 62/959,574, filed on Jan. 10, 2020, and provisional application No. 62/959,593, filed on Jan. 10, 2020, which are incorporated herein by references in their entirety.

BACKGROUND

1. Technical Field

Various embodiments of the present disclosure relate to processing-in-memory (PIM) devices.

2. Related Art

Recently, interest in artificial intelligence (AI) has been increasing not only in the information technology industry but also in the financial and medical industries. Accordingly, in various fields, artificial intelligence, more precisely, the introduction of deep learning, is considered and prototyped. One of backgrounds or causes of this widespread interest may be due to the improved performance of a processor performing arithmetic operations. To improve the performance of the artificial intelligence, it may be necessary to increase the number of layers constituting a neural network in the artificial intelligence to educate the artificial intelligence. This trend has continued in recent years, which has led to an exponential increase in the amount of computations required for the hardware that actually does the computations. Moreover, if the artificial intelligence employs a general hardware system including a memory and a processor which are separated from each other, the performance of the artificial intelligence may be degraded due to limitation of the amount of data communication between the memory and the processor. In order to solve this problem, a PIM device in which a processor and memory are integrated in one semiconductor chip has been used as a neural network computing device. Because the PIM device directly performs arithmetic operations in the PIM device, a data processing speed in the neural network may be improved.

SUMMARY

According to an embodiment, a processing-in-memory (PIM) device may include a plurality of memory banks, a first global buffer, a second global buffer, a plurality of multiplying-and-accumulating (MAC) operators, and a plurality of output circuits. Each of the plurality of memory banks may include a left memory bank providing left weigh data and a right memory bank providing right weigh data. The first global buffer may be configured to provide left vector data. The second global buffer may be configured to provide right vector data. Each of the plurality of MAC operators may include a left MAC operator performing a MAC operation on the left weight data and the left vector data to generate and output left MAC data and a right MAC operator performing a MAC operation on the right weight data and the right vector data to generate and output right MAC data. Each of the plurality of output circuits may add the left MAC data to the right MAC data to generate MAC result data. Each of the plurality of output circuits may be configured to output the MAC result data or activation function-processed MAC result data in response to a first MAC read signal and a second MAC read signal.

BRIEF DESCRIPTION OF THE DRAWINGS

Certain features of the disclosed technology are illustrated by various embodiments with reference to the attached drawings.

DETAILED DESCRIPTION

In the following description of embodiments, it will be understood that the terms "first" and "second" are intended to identify elements, but not used to define a particular number or sequence of elements. In addition, when an element is referred to as being located "on," "over," "above," "under," or "beneath" another element, it is intended to mean relative positional relationship, but not used to limit certain cases for which the element directly contacts the other element, or at least one intervening element is present between the two elements. Accordingly, the terms such as "on," "over," "above," "under," "beneath," "below," and the like that are used herein are for the purpose of describing particular embodiments only and are not intended to limit the scope of the present disclosure. Further, when an element is referred to as being "connected" or "coupled" to another element, the element may be electrically or mechanically connected or coupled to the other element directly, or may be electrically or mechanically connected or coupled to the other element indirectly with one or more additional elements between the two elements. Moreover, when a parameter is referred to as being "predetermined," it may be intended to mean that a value of the parameter is determined in advance of when the parameter is used in a process or an algorithm. The value of the parameter may be set when the process or the algorithm starts or may be set during a period in which the process or the algorithm is executed. A logic "high" level and a logic "low" level may be used to describe logic levels of electric signals. A signal having a logic "high" level may be distinguished from a signal having a logic "low" level. For example, when a signal having a first voltage corresponds to a signal having a logic "high" level, a signal having a second voltage may correspond to a signal having a logic "low" level. In an embodiment, the logic "high" level may be set as a voltage level which is higher than a voltage level of the logic "low" level. Meanwhile, logic levels of signals may be set to be different or opposite according to embodiment. For example, a certain signal having a logic "high" level in one embodiment may be set to have a logic "low" level in another embodiment.

Various embodiments of the present disclosure will be described hereinafter in detail with reference to the accompanying drawings. However, the embodiments described herein are for illustrative purposes only and are not intended to limit the scope of the present disclosure.

Various embodiments are directed to processing-in-memory (PIM) devices.

Figure 1:
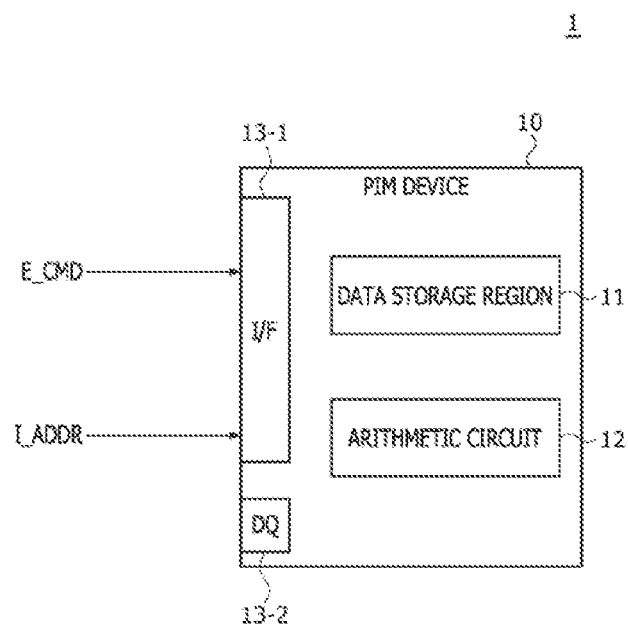
FIG. 1 is a block diagram illustrating a PIM device according to an embodiment of the present disclosure.

FIG. 1 is a block diagram illustrating a PIM device according to an embodiment of the present disclosure. As illustrated in FIG. 1, the PIM device 10 may include a data storage region 11, an arithmetic circuit 12, an interface (I/F) 13-1, and a data (DQ) input/output (I/O) pad 13-2. The data storage region 11 may include a first storage region and a second storage region. In an embodiment, the first storage region and the second storage region may be a first memory bank and a second memory bank, respectively. In another embodiment, the first data storage region and the second storage region may be a memory bank and buffer memory, respectively. The data storage region 11 may include a volatile memory element or a non-volatile memory element. For an embodiment, the data storage region 11 may include both a volatile memory element and a non-volatile memory element.

The arithmetic circuit 12 may perform an arithmetic operation on the data transferred from the data storage region 11. In an embodiment, the arithmetic circuit 12 may include a multiplying-and-accumulating (MAC) operator. The MAC operator may perform a multiplying calculation on the data transferred from the data storage region 11 and perform an accumulating calculation on the multiplication result data. After MAC operations, the MAC operator may output MAC result data. The MAC result data may be stored in the data storage region 11 or output from the PIM device 10 through the data I/O pad 13-2. In an embodiment, the arithmetic circuit 12 may perform additional operations, for example a bias addition operation and an active function operation, for a neural network calculation, for example, an arithmetic operation in a deep learning process. In another embodiment, the PIM device 10 may include a bias addition circuit and active function circuit separated from the arithmetic circuit 12.

The interface 13-1 of the PIM device 10 may receive an external command E_CMD and an input address I_ADDR from an external device. The external device may denote a host or a PIM controller coupled to the PIM device 10. Hereinafter, it may be assumed that the external command E_CMD transmitted to the PIM device 10 is a command requesting the MAC arithmetic operation. That is, the PIM device 10 may perform a MAC arithmetic operation in response to the external command E_CMD. The data I/O pad 13-2 of the PIM device 10 may function as a data communication terminal between a device external to the PIM device 10, for example the PIM controller or a host located outside the PIM system 1. Accordingly, data output from the host or the PIM controller may be input into the PIM device 10 through the data I/O pad 13-2. Also, data output from the PIM device 10 may be input to the host or the PIM controller through the data I/O pad 13-2.

In an embodiment, the PIM device 10 may operate in a memory mode or a MAC arithmetic mode. In the event that the PIM device 10 operates in the memory mode, the PIM device 10 may perform a data read operation or a data write operation for the data storage region 11. In the event that the PIM device 10 operates in the MAC arithmetic mode, the arithmetic circuit 12 of the PIM device 10 may receive first data and second data from the data storage region 11 to perform the MAC arithmetic operation. In the event that PIM device 10 operates in the MAC arithmetic mode, the PIM device 10 may also perform the data write operation for the data storage region 11 to execute the MAC arithmetic operation. The MAC arithmetic operation may be a deterministic arithmetic operation performed during a predetermined fixed time. The word "predetermined" as used herein with respect to a parameter, such as a predetermined fixed time or time period, means that a value for the parameter is determined prior to the parameter being used in a process or algorithm. For some embodiments, the value for the parameter is determined before the process or algorithm begins. In other embodiments, the value for the parameter is determined during the process or algorithm but before the parameter is used in the process or algorithm.

Figure 2:
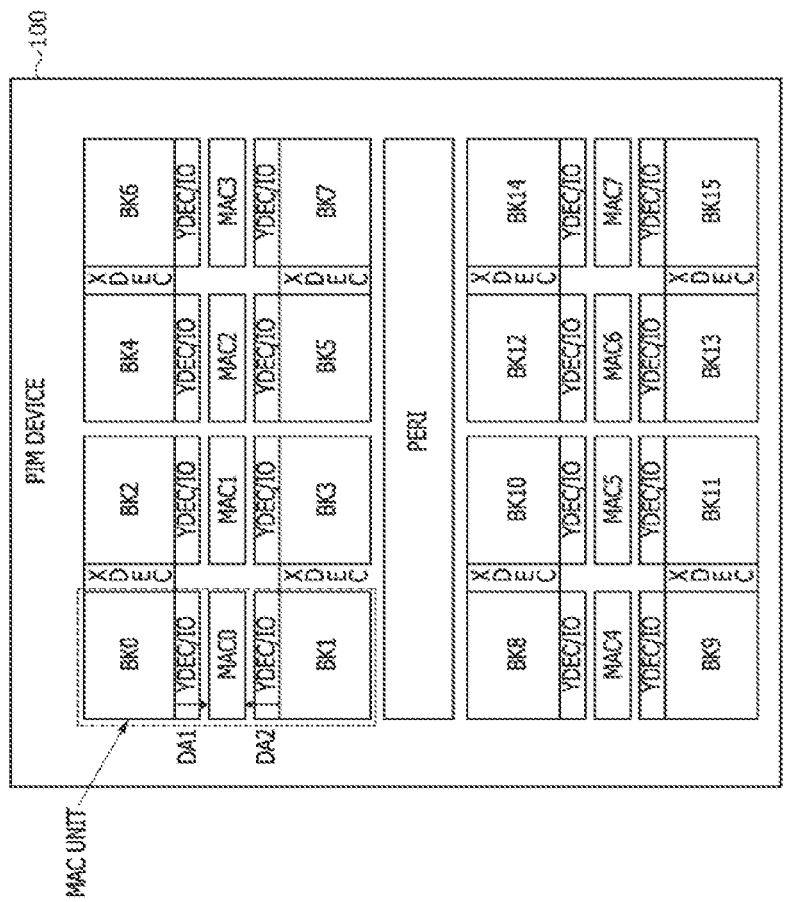
FIG. 2 is a schematic diagram illustrating a disposal structure between memory banks and multiplication/accumulation (MAC) operators included in a PIM device according to a first embodiment of the present disclosure.

FIG. 2 illustrates a disposal structure indicating placement of memory banks BK0, . . . , and BK15 and MAC operators MAC0, . . . , and MAC7 included in a PIM device 100 according to an embodiment of the present disclosure. In an embodiment, the memory banks BK0, . . . , and BK15 and the MAC operators MAC0, . . . , and MAC7 may be included in the data storage region and the arithmetic circuit of the PIM device 10 of FIG. 1, respectively. Referring to FIG. 2, the PIM device 100 may include a data storage region and an arithmetic circuit. In an embodiment, the data storage region may include the memory banks BK0, . . . , and BK15.

Although the present embodiment illustrates an example in which the data storage region includes the memory banks BK0, . . . , and BK15, the memory banks BK0, . . . , and BK15 are merely examples which are suitable for the data storage region. In some embodiments, the memory banks BK0, . . . , and BK15 may be a memory region corresponding to a volatile memory device, for example, a DRAM device. In an embodiment, each of the memory banks BK0, . . . , and BK15 may be a component unit which is independently activated and may be configured to have the same data bus width as data I/O lines in the PIM device 100. In an embodiment, the memory banks BK0, . . . , and BK15 may operate through interleaving such that an active operation of any one of the memory banks is performed in parallel while another memory bank is selected. Although the present embodiment illustrates an example in which the PIM device 100 includes the memory banks BK0, . . . , and BK15, the number of the memory banks is not limited to 16 and may be different in different embodiments. Each of the memory banks BK0, . . . , and BK15 may include at least one cell array which includes memory unit cells located at cross points of a plurality of rows and a plurality of columns. The memory banks BK0, . . . , and BK15 may include a first group of memory banks (e.g., odd-numbered memory banks BK0, BK2, . . . , and BK14) and a second group of memory banks (e.g., even-numbered memory banks BK1, BK3, . . . , and BK15).

A core circuit may be disposed to be adjacent to the memory banks BK0, . . . , and BK15. The core circuit may include X-decoders XDECs and Y-decoders/IO circuits YDEC/IOs. An X-decoder XDEC may also be referred to as a word line decoder or a row decoder. In an embodiment, two odd-numbered memory banks arrayed to be adjacent to each other in one row among the odd-numbered memory banks BK0, BK2, . . . , and BK14 may share one of the X-decoders XDECs with each other. For example, the first memory bank BK0 and the third memory bank BK2 adjacent to each other in a first row may share one of the X-decoders XDECs, and the fifth memory bank BK4 and the seventh memory bank BK6 adjacent to each other in the first row may also share one of the X-decoders XDECs. Similarly, two even-numbered memory banks arrayed to be adjacent to each other in one row among the even-numbered memory banks BK1, BK3, . . . , and BK15 may share one of the X-decoders XDECs with each other. For example, the second memory bank BK1 and the fourth memory bank BK3 adjacent to each other in a second row may share one of the X-decoders XDECs, and the sixth memory bank BK5 and the eighth memory bank BK7 adjacent to each other in the second row may also share one of the X-decoders XDECs. The X-decoder XDEC may receive a row address from an address latch included in a peripheral circuit PERI and may decode the row address to select and enable one of rows (i.e., word lines) coupled to the memory banks adjacent to the X-decoder XDEC.

The Y-decoders/IO circuits YDEC/IOs may be disposed to be allocated to the memory banks BK0, . . . , and BK15, respectively. For example, the first memory bank BK0 may be allocated to one of the Y-decoders/IO circuits YDEC/IOs, and the second memory bank BK1 may be allocated to another one of the Y-decoders/IO circuits YDEC/IOs. Each of the Y-decoders/IO circuits YDEC/IOs may include a Y-decoder YDEC and an I/O circuit IO. The Y-decoder YDEC may also be referred to as a bit line decoder or a column decoder. The Y-decoder YDEC may receive a column address from an address latch included in the peripheral circuit PERI and may decode the column address to select and enable at least one of columns (i.e., bit lines) coupled to the selected memory bank. Each of the I/O circuits may include an I/O sense amplifier for sensing and amplifying a level of a read datum output from the corresponding memory bank during a read operation and a write driver for driving a write datum during a write operation for the corresponding memory bank.

In an embodiment, the arithmetic circuit may include MAC operators MAC0, . . . , and MAC7. Although the present embodiment illustrates an example in which the MAC operators MAC0, . . . , and MAC7 are employed as the arithmetic circuit, the present embodiment may be merely an example of the present disclosure. For example, in some other embodiments, processors other than the MAC operators MAC0, . . . , and MAC7 may be employed as the arithmetic circuit. The MAC operators MAC0, . . . , and MAC7 may be disposed such that one of the odd-numbered memory banks BK0, BK2, . . . , and BK14 and one of the even-numbered memory banks BK1, BK3, . . . , and BK15 share any one of the MAC operators MAC0, . . . , and MAC7 with each other. For example, one odd-numbered memory bank and one even-numbered memory bank arrayed in one column to be adjacent to each other may constitute a pair of memory banks sharing one of the MAC operators MAC0, . . . , and MAC7 with each other. One of the MAC operators MAC0, . . . , and MAC7 and a pair of memory banks sharing the one MAC operator with each other will be referred to as 'a MAC unit' hereinafter.

In an embodiment, the number of the MAC operators MAC0, . . . , and MAC7 may be equal to the number of the odd-numbered memory banks BK0, BK2, . . . , and BK14 or the number of the even-numbered memory banks BK1, BK3, . . . , and BK15. The first memory bank BK0, the second memory bank BK1, and the first MAC operator MAC0 between the first memory bank BK0 and the second memory bank BK1 may constitute a first MAC unit. In addition, the third memory bank BK2, the fourth memory bank BK3, and the second MAC operator MAC1 between the third memory bank BK2 and the fourth memory bank BK3 may constitute a second MAC unit. The first MAC operator MAC0 included in the first MAC unit may receive first data DA1 output from the first memory bank BK0 included in the first MAC unit and second data DA2 output from the second memory bank BK1 included in the first MAC unit. In addition, the first MAC operator MAC0 may perform a MAC arithmetic operation of the first data DA1 and the second data DA2. In the event that the PIM device 100 performs a neural network calculation, for example, an arithmetic operation in a deep learning process, one of the first data DA1 and the second data DA2 may be weight data and the other may be vector data. A configuration of any one of the MAC operators MAC0~MAC7 will be described in more detail hereinafter. As used herein, the tilde "~" indicates a range of components. For example, "MAC0~MAC7" indicates the MAC operators MAC0, MAC1, . . . , and MAC7 shown in FIG. 2.

In the PIM device 100, the peripheral circuit PERI may be disposed in a region other than an area in which the memory banks BK0, BK1, . . . , and BK15, the MAC operators MAC0, . . . , and MAC7, and the core circuit are disposed. The peripheral circuit PERI may include a control circuit and a transmission path for a command/address signal, a control circuit and a transmission path for input/output of data, and a power supply circuit. The control circuit for the command/address signal may include a command decoder for decoding a command included in the command/address signal to generate an internal command signal, an address latch for converting an input address into a row address and a column address, a control circuit for controlling various functions of row/column operations, and a control circuit for controlling a delay locked loop (DLL) circuit. The control circuit for the input/output of data in the peripheral circuit PERI may include a control circuit for controlling a read/write operation, a read/write buffer, and an output driver. The power supply circuit in the peripheral circuit PERI may include a reference power voltage generation circuit for generating an internal reference power voltage and an internal power voltage generation circuit for generating an internal power voltage from an external power voltage.

The PIM device 100 according to the present embodiment may operate in any one mode of a memory mode and a MAC arithmetic mode. In the memory mode, the PIM device 100 may operate to perform the same operations as general memory devices. The memory mode may include a memory read operation mode and a memory write operation mode. In the memory read operation mode, the PIM device 100 may perform a read operation for reading out data from the memory banks BK0, BK1, . . . , and BK15 to output the read data, in response to an external request. In the memory write operation mode, the PIM device 100 may perform a write operation for storing data provided by an external device into the memory banks BK0, BK1, . . . , and BK15, in response to an external request.

In the MAC arithmetic mode, the PIM device 100 may perform the MAC arithmetic operation using the MAC operators MAC0, . . . , and MAC7. For example, the PIM device 100 may perform the read operation of the first data DA1 for each of the odd-numbered memory banks BK0, BK2, . . . , and BK14 and the read operation of the second data DA2 for each of the even-numbered memory banks BK1, BK3, . . . , and BK15, for the MAC arithmetic operation in the MAC arithmetic mode. In addition, each of the MAC operators MAC0, . . . , and MAC7 may perform the MAC arithmetic operation of the first data DA1 and the second data DA2 which are read out of the memory banks to store a result of the MAC arithmetic operation into the memory bank or to output the result of the MAC arithmetic operation. In some cases, the PIM device 100 may perform a data write operation for storing data to be used for the MAC arithmetic operation into the memory banks before the data read operation for the MAC arithmetic operation is performed in the MAC arithmetic mode.

The operation mode of the PIM device 100 according to the present embodiment may be determined by a command which is transmitted from a host or a controller to the PIM device 100. In an embodiment, if a first external command requesting a read operation or a write operation for the memory banks BK0, BK1, . . . , and BK15 is input to the PIM device 100, the PIM device 100 may perform the data read operation or the data write operation in the memory mode. Meanwhile, if a second external command requesting a MAC calculation corresponding to the MAC arithmetic operation is input to the PIM device 100, the PIM device 100 may perform the MAC arithmetic operation.

The PIM device 100 may perform a deterministic MAC arithmetic operation. The term "deterministic MAC arithmetic operation" used in the present disclosure may be defined as the MAC arithmetic operation performed in the PIM device 100 during a predetermined fixed time. Thus, the host or the controller may always predict a point in time (or a clock) when the MAC arithmetic operation terminates in the PIM device 100 at a point in time when an external command requesting the MAC arithmetic operation is transmitted from the host or the controller to the PIM device 100.

No operation for informing the host or the controller of a status of the MAC arithmetic operation is required while the PIM device 100 performs the deterministic MAC arithmetic operation. In an embodiment, a latency during which the MAC arithmetic operation is performed in the PIM device 100 may be fixed for the deterministic MAC arithmetic operation.

Figure 3:
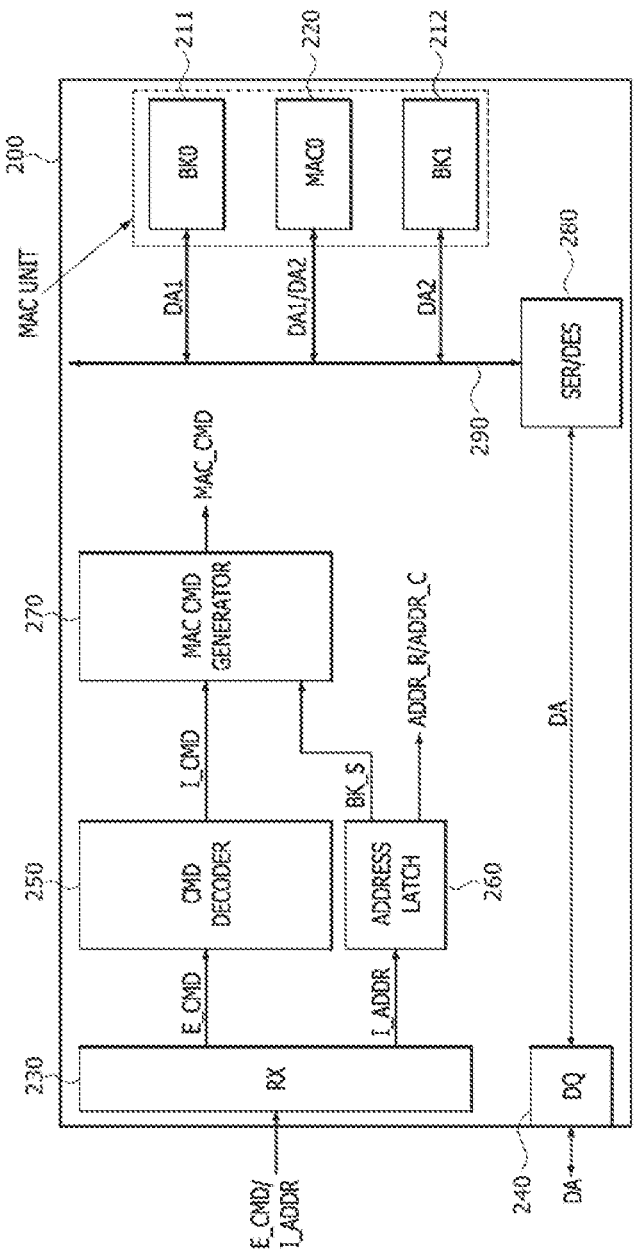
FIG. 3 is a block diagram illustrating a configuration of a PIM device according to the first embodiment of the present disclosure.
Figure 4:
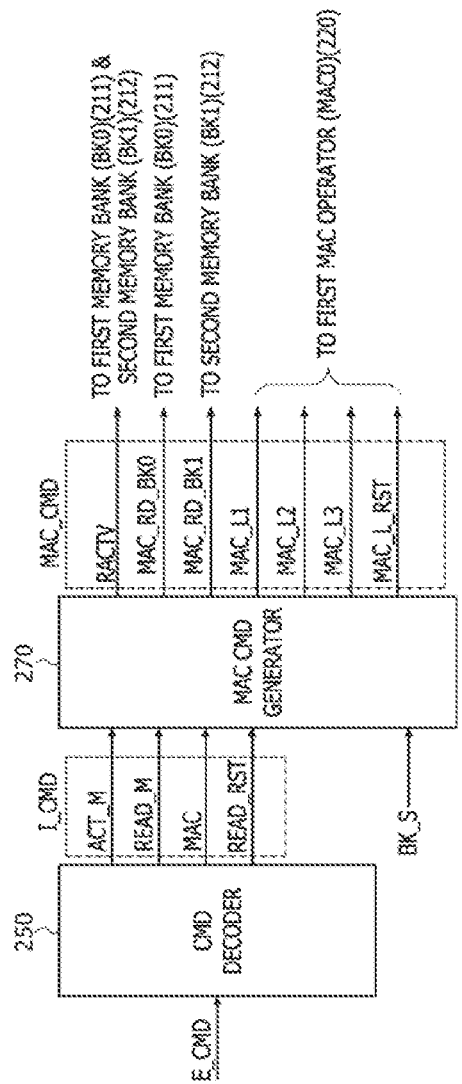
FIG. 4 illustrates internal command signals output from a command decoder and MAC command signals output from a MAC command generator in the PIM device of FIG. 3.

FIG. 3 is a block diagram illustrating a configuration of a PIM device 200 corresponding to the PIM device 100 illustrated in FIG. 3, and FIG. 4 illustrates an internal command signal I_CMD output from a command decoder 250 and a MAC command signal MAC_CMD output from a MAC command generator 270 included in the PIM device 200 of FIG. 3. FIG. 3 illustrates only the first memory bank (BK0) 211, the second memory bank (BK1) 212, and the first MAC operator (MAC0) 220 constituting the first MAC unit among the plurality of MAC units. However, FIG. 3 illustrates merely an example for simplification of the drawing. Accordingly, the following description for the first MAC unit may be equally applicable to the remaining MAC units. Referring to FIG. 3, the PIM device 200 may include a global I/O line (hereinafter, referred to as a 'GIO line') 290. The first memory bank (BK0) 211, the second memory bank (BK1) 212, and the first MAC operator (MAC0) 220 may communicate with each other through the GIO line 290. In an embodiment, the GIO line 290 may be disposed in the peripheral circuit PERI of FIG. 2.

The PIM device 200 may include a receiving driver (RX) 230, a data I/O circuit (DQ) 240, a command decoder 250, an address latch 260, a MAC command generator 270, and a serializer/deserializer (SER/DES) 280. The command decoder 250, the address latch 260, the MAC command generator 270, and the serializer/deserializer 280 may be disposed in the peripheral circuit PERI of the PIM device 100 illustrated in FIG. 2. The receiving driver 230 may receive an external command E_CMD and an input address I_ADDR from an external device. The external device may denote a host or a controller coupled to the PIM device 200. Hereinafter, it may be assumed that the external command E_CMD transmitted to the PIM device 200 is a command requesting the MAC arithmetic operation. That is, the PIM device 200 may perform the deterministic MAC arithmetic operation in response to the external command E_CMD. The data I/O circuit 240 may include an I/O pad. The data I/O circuit 240 may be coupled to data I/O line. The PIM device 200 may communicate with the external device through the data I/O circuit 240. The receiving driver 230 may separately output the external command E_CMD and the input address I_ADDR received from the external device. Data DA input to the PIM device 200 through the data I/O circuit 240 may be processed by the serializer/deserializer 280 and may be transmitted to the first memory bank (BK0) 211 and the second memory bank (BK1) 212 through the GIO line 290 of the PIM device 200. The data DA output from the first memory bank (BK0) 211, the second memory bank (BK1) 212, and the first MAC operator (MAC0) 220 through the GIO line 290 may be processed by the serializer/deserializer 280 and may be output to the external device through the data I/O circuit 240. The serializer/deserializer 280 may convert the data DA into parallel data if the data DA are serial data or may convert the data DA into serial data if the data DA are parallel data. For the data conversion, the serializer/deserializer 280 may include a serializer converting parallel data into serial data and a deserializer converting serial data into parallel data.

The command decoder 250 may decode the external command E_CMD output from the receiving driver 230 to generate and output the internal command signal I_CMD. As illustrated in FIG. 4, the internal command signal I_CMD output from the command decoder 250 may include first to fourth internal command signals. In an embodiment, the first internal command signal may be a memory active signal ACT_M, the second internal command signal may be a memory read signal READ_M, the third internal command signal may be a MAC arithmetic signal MAC, and the fourth internal command signal may be a result read signal READ_RST. The first to fourth internal command signals output from the command decoder 250 may be sequentially input to the MAC command generator 270.

In order to perform the deterministic MAC arithmetic operation of the PIM device 200, the memory active signal ACT_M, the memory read signal READ_M, the MAC arithmetic signal MAC, and the result read signal READ_RST output from the command decoder 250 may be sequentially generated at predetermined points in time (or clocks). In an embodiment, the memory active signal ACT_M, the memory read signal READ_M, the MAC arithmetic signal MAC, and the result read signal READ_RST may have predetermined latencies, respectively. For example, the memory read signal READ_M may be generated after a first latency elapses from a point in time when the memory active signal ACT_M is generated, the MAC arithmetic signal MAC may be generated after a second latency elapses from a point in time when the memory read signal READ_M is generated, and the result read signal READ_RST may be generated after a third latency elapses from a point in time when the MAC arithmetic signal MAC is generated. No signal is generated by the command decoder 250 until a fourth latency elapses from a point in time when the result read signal READ_RST is generated. The first to fourth latencies may be predetermined and fixed. Thus, the host or the controller outputting the external command E_CMD may predict the points in time when the first to fourth internal command signals constituting the internal command signal I_CMD are generated by the command decoder 250 in advance at a point in time when the external command E_CMD is output from the host or the controller.

The address latch 260 may convert the input address I_ADDR output from the receiving driver 230 into a bank selection signal BK_S and a row/column address ADDR_R/ADDR_C to output the bank selection signal BK_S and the row/column address ADDR_R/ADDR_C. The bank selection signal BK_S may be input to the MAC command generator 270. The row/column address ADDR_R/ADDR_C may be transmitted to the first and second memory banks 211 and 212. One of the first and second memory banks 211 and 212 may be selected by the bank selection signal BK_S. One of rows included in the selected memory bank and one of columns included in the selected memory bank may be selected by the row/column address ADDR_R/ADDR_C. In an embodiment, a point in time when the bank selection signal BK_S is input to the MAC command generator 270 may be the same moment as a point in time when the row/column address ADDR_R/ADDR_C is input to the first and second memory banks 211 and 212. In an embodiment, the point in time when the bank selection signal BK_S is input to the MAC command generator 270 and the point in time when the row/column address ADDR_R/ADDR_C is input to the first and second memory banks 211 and 212 may be a point in time when the MAC command is generated to read out data from the first and second memory banks 211 and 212 for the MAC arithmetic operation.

The MAC command generator 270 may output the MAC command signal MAC_CMD in response to the internal command signal I_CMD output from the command decoder 250 and the bank selection signal BK_S output from the address latch 260. As illustrated in FIG. 4, the MAC command signal MAC_CMD output from the MAC command generator 270 may include first to seventh MAC command signals. In an embodiment, the first MAC command signal may be a MAC active signal RACTV, the second MAC command signal may be a first MAC read signal MAC_RD_BK0, the third MAC command signal may be a second MAC read signal MAC_RD_BK1, the fourth MAC command signal may be a first MAC input latch signal MAC_L1, the fifth MAC command signal may be a second MAC input latch signal MAC_L2, the sixth MAC command signal may be a MAC output latch signal MAC_L3, and the seventh MAC command signal may be a MAC result latch signal MAC_L_RST.

The MAC active signal RACTV may be generated based on the memory active signal ACT_M output from the command decoder 250. The first MAC read signal MAC_RD_BK0 may be generated in response to the memory read signal READ_M output from the command decoder 250 and the bank selection signal BK_S having a first level (e.g., a logic "low" level) output from the address latch 260. The first MAC input latch signal MAC_L1 may be generated at a point in time when a certain time elapses from a point in time when the first MAC read signal MAC_RD_BK0 is generated. For various embodiments, a certain time means a fixed time duration. The second MAC read signal MAC_RD_BK1 may be generated in response to the memory read signal READ_M output from the command decoder 250 and the bank selection signal BK_S having a second level (e.g., a logic "high" level) output from the address latch 260. The second MAC input latch signal MAC_L2 may be generated at a point in time when a certain time elapses from a point in time when the second MAC read signal MAC_RD_BK1 is generated. The MAC output latch signal MAC_L3 may be generated in response to the MAC arithmetic signal MAC output from the command decoder 250. Finally, the MAC result latch signal MAC_L_RST may be generated in response to the result read signal READ_RST output from the command decoder 250.

The MAC active signal RACTV output from the MAC command generator 270 may control an activation operation for the first and second memory banks 211 and 212. The first MAC read signal MAC_RD_BK0 output from the MAC command generator 270 may control a data read operation for the first memory bank 211. The second MAC read signal MAC_RD_BK1 output from the MAC command generator 270 may control a data read operation for the second memory bank 212. The first MAC input latch signal MAC_L1 and the second MAC input latch signal MAC_L2 output from the MAC command generator 270 may control an input data latch operation of the first MAC operator (MAC0) 220. The MAC output latch signal MAC_L3 output from the MAC command generator 270 may control an output data latch operation of the first MAC operator (MAC0) 220. The MAC result latch signal MAC_L_RST output from the MAC command generator 270 may control a reset operation of the first MAC operator (MAC0) 220.

As described above, in order to perform the deterministic MAC arithmetic operation of the PIM device 200, the memory active signal ACT_M, the memory read signal READ_M, the MAC arithmetic signal MAC, and the result read signal READ_RST output from the command decoder 250 may be sequentially generated at predetermined points in time (or clocks), respectively. Thus, the MAC active signal RACTV, the first MAC read signal MAC_RD_BK0, the second MAC read signal MAC_RD_BK1, the first MAC input latch signal MAC_L1, the second MAC input latch signal MAC_L2, the MAC output latch signal MAC_L3, and the MAC result latch signal MAC_L_RST may also be generated and output from the MAC command generator 270 at predetermined points in time after the external command E_CMD is input to the PIM device 200, respectively. That is, a time period from a point in time when the first and second memory banks 211 and 212 are activated by the MAC active signal RACTV until a point in time when the first MAC operator (MAC0) 220 is reset by the MAC result latch signal MAC_L_RST may be predetermined, and thus the PIM device 200 may perform the deterministic MAC arithmetic operation.

Figure 5:
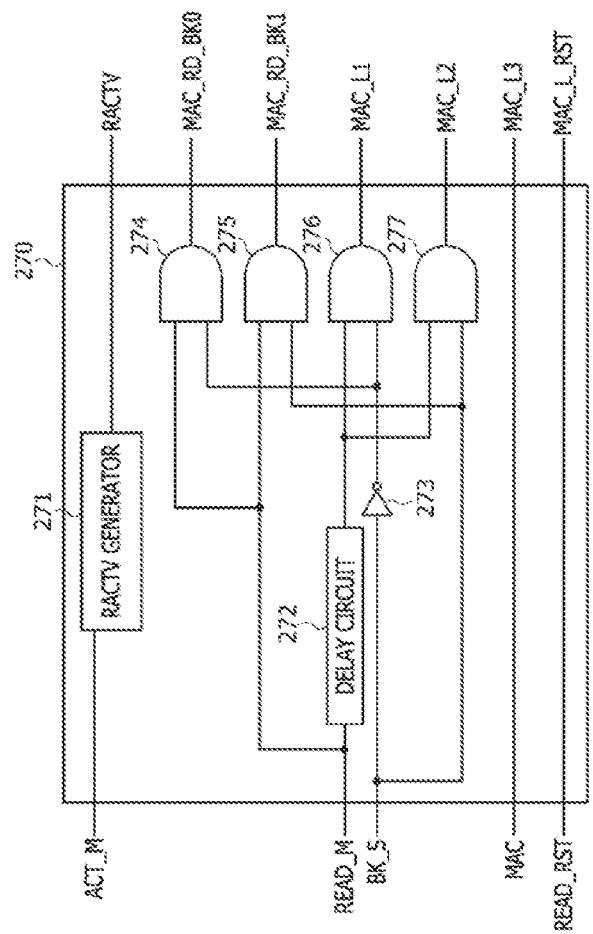
FIG. 5 illustrates an example of a configuration of a MAC command generator included in the PIM device of FIG. 3.

FIG. 5 illustrates an example of a configuration of the MAC command generator 270 included in the PIM device 200 illustrated in FIG. 3. Referring to FIG. 5, the MAC command generator 270 may sequentially receive the memory active signal ACT_M, the memory read signal READ_M, the MAC arithmetic signal MAC, and the result read signal READ_RST from the command decoder 250. In addition, the MAC command generator 270 may also receive the bank selection signal BK_S from the address latch 260. The MAC command generator 270 may output the MAC active signal RACTV, the first MAC read signal MAC_RD_BK0, the second MAC read signal MAC_RD_BK1, the first MAC input latch signal MAC_L1, the second MAC input latch signal MAC_L2, the MAC output latch signal MAC_L3, and the MAC result latch signal MAC_L_RST in series with certain time intervals. For an embodiment, a certain time interval is a time interval having a fixed duration.

In an embodiment, the MAC command generator 270 may be configured to include an active signal generator 271, a delay circuit 272, an inverter 273, and first to fourth AND gates 274, 275, 276, and 277. The active signal generator 271 may receive the memory active signal ACT_M to generate and output the MAC active signal RACTV. The MAC active signal RACTV output from the active signal generator 271 may be transmitted to the first and second memory banks 211 and 212 to activate the first and second memory banks 211 and 212. The delay circuit 272 may receive the memory read signal READ_M and may delay the memory read signal READ_M by a delay time DELAY_T to output the delayed signal of the memory read signal READ_M. The inverter 273 may receive the bank selection signal BK_S and may invert a logic level of the bank selection signal BK_S to output the inverted signal of the bank selection signal BK_S.

The first AND gate 274 may receive the memory read signal READ_M and an output signal of the inverter 273 and may perform a logical AND operation of the memory read signal READ_M and an output signal of the inverter 273 to generate and output the first MAC read signal MAC_RD_BK0. The second AND gate 275 may receive the memory read signal READ_M and the bank selection signal BK_S and may perform a logical AND operation of the memory read signal READ_M and the bank selection signal BK_S to generate and output the second MAC read signal MAC_RD_BK1. The third AND gate 276 may receive an output signal of the delay circuit 272 and an output signal of the inverter 273 and may perform a logical AND operation of the output signals of the delay circuit 272 and the inverter 273 to generate and output the first MAC input latch signal MAC_L1. The fourth AND gate 277 may receive an output signal of the delay circuit 272 and the bank selection signal BK_S and may perform a logical AND operation of the output signal of the delay circuit 272 and the bank selection signal BK_S to generate and output the second MAC input latch signal MAC_L2.

It may be assumed that the memory read signal READ_M input to the MAC command generator 270 has a logic "high" level and the bank selection signal BK_S input to the MAC command generator 270 has a logic "low" level. A level of the bank selection signal BK_S may change from a logic "low" level into a logic "high" level after a certain time elapses. When the memory read signal READ_M has a logic "high" level and the bank selection signal BK_S has a logic "low" level, the first AND gate 274 may output the first MAC read signal MAC_RD_BK0 having a logic "high" level and the second AND gate 275 may output the second MAC read signal MAC_RD_BK1 having a logic "low" level. The first memory bank 211 may transmit the first data DA1 to the first MAC operator 220 according to a control operation based on the first MAC read signal MAC_RD_BK0 having a logic "high" level. If a level transition of the bank selection signal BK_S occurs so that both of the memory read signal READ_M and the bank selection signal BK_S have a logic "high" level, the first AND gate 274 may output the first MAC read signal MAC_RD_BK0 having a logic "low" level and the second AND gate 275 may output the second MAC read signal MAC_RD_BK1 having a logic "high" level. The second memory bank 212 may transmit the second data DA2 to the first MAC operator 220 according to a control operation based on the second MAC read signal MAC_RD_BK1 having a logic "high" level.

Due to the delay time of the delay circuit 272, the output signals of the third and fourth AND gates 276 and 277 may be generated after the first and second MAC read signals MAC_RD_BK0 and MAC_RD_BK1 are generated. Thus, after the second MAC read signal MAC_RD_BK1 is generated, the third AND gate 276 may output the first MAC input latch signal MAC_L1 having a logic "high" level. The first MAC operator 220 may latch the first data DA1 in response to the first MAC input latch signal MAC_L1 having a logic "high" level. After a certain time elapses from a point in time when the first data DA1 are latched by the first MAC operator 220, the fourth AND gate 277 may output the second MAC input latch signal MAC_L2 having a logic "high" level. The first MAC operator 220 may latch the second data DA2 in response to the second MAC input latch signal MAC_L2 having a logic "high" level. The first MAC operator 220 may start to perform the MAC arithmetic operation after the first and second data DA1 and DA2 are latched.

The MAC command generator 270 may generate the MAC output latch signal MAC_L3 in response to the MAC arithmetic signal MAC output from the command decoder 250. The MAC output latch signal MAC_L3 may have the same logic level as the MAC arithmetic signal MAC. For example, if the MAC arithmetic signal MAC having a logic "high" level is input to the MAC command generator 270, the MAC command generator 270 may generate the MAC output latch signal MAC_L3 having a logic "high" level. The MAC command generator 270 may generate the MAC result latch signal MAC_L_RST in response to the result read signal READ_RST output from the command decoder 250. The MAC result latch signal MAC_L_RST may have the same logic level as the result read signal READ_RST. For example, if the result read signal READ_RST having a logic "high" level is input to the MAC command generator 270, the MAC command generator 270 may generate the MAC result latch signal MAC_L_RST having a logic "high" level.

Figure 6:
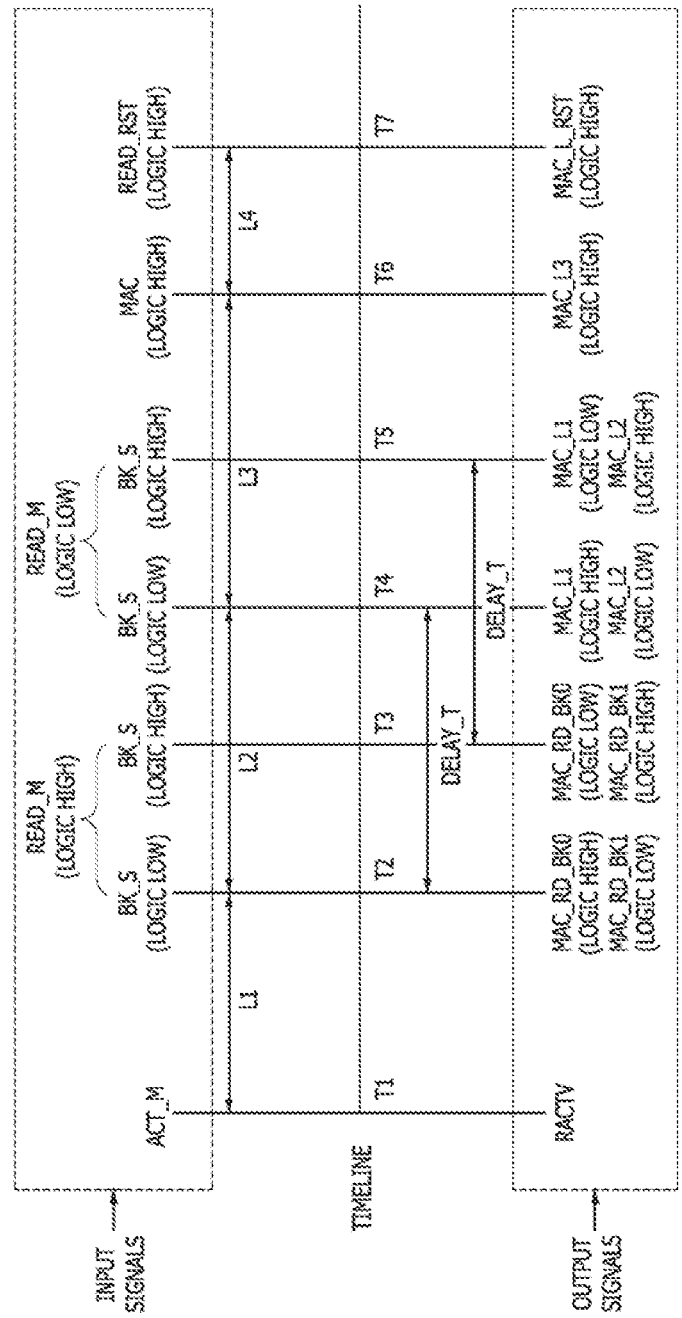
FIG. 6 illustrates input signals and output signals of the MAC command generator illustrated in FIG. 5 with a timeline.

FIG. 6 illustrates input signals and output signals of the MAC command generator 270 illustrated in FIG. 5 along a timeline. In FIG. 6, signals transmitted from the command decoder 250 to the MAC command generator 270 are illustrated in an upper dotted line box, and signals output from the MAC command generator 270 are illustrated in a lower dotted line box. Referring to FIGS. 5 and 6 at a first point in time "T1" of the timeline, the memory active signal ACT_M may be input to the MAC command generator 270 and the MAC command generator 270 may output the MAC active signal RACTV. At a second point in time "T2" when a certain time, for example, a first latency L1 elapses from the first point in time "T1", the memory read signal READ_M having a logic "high" level and the bank selection signal BK_S having a logic "low" level may be input to the MAC command generator 270. In response to the memory read signal READ_M having a logic "high" level and the bank selection signal BK_S having a logic "low" level, the MAC command generator 270 may output the first MAC read signal MAC_RD_BK0 having a logic "high" level and the second MAC read signal MAC_RD_BK1 having a logic "low" level in response to the memory read signal READ_M having a logic "high" level and the bank selection signal BK_S having a logic "low" level, as described with reference to FIG. 5. At a third point in time "T3" when a certain time elapses from the second point in time "T2", a logic level of the bank selection signal BK_S may change from a logic "low" level into a logic "high" level. In such a case, the MAC command generator 270 may output the first MAC read signal MAC_RD_BK0 having a logic "low" level and the second MAC read signal MAC_RD_BK1 having a logic "high" level, as described with reference to FIG. 5.

At a fourth point in time "T4" when the delay time DELAY_T elapses from the second point in time "T2", the MAC command generator 270 may output the first MAC input latch signal MAC_L1 having a logic "high" level and the second MAC input latch signal MAC_L2 having a logic "low" level. The delay time DELAY_T may be set by the delay circuit 272. The delay time DELAY_T may bet to be different according a logic design scheme of the delay circuit 272 and may be fixed once the logic design scheme of the delay circuit 272 is determined. In an embodiment, the delay time DELAY_T may be set to be equal to or greater than a second latency L2. At a fifth point in time "T5" when a certain time elapses from the fourth point in time "T4", the MAC command generator 270 may output the first MAC input latch signal MAC_L1 having a logic "low" level and the second MAC input latch signal MAC_L2 having a logic "high" level. The fifth point in time "T5" may be a moment when the delay time DELAY_T elapses from the third point in time "T3".

At a sixth point in time "T6" when a certain time, for example, a third latency L3 elapses from the fourth point in time "T4", the MAC arithmetic signal MAC having a logic "high" level may be input to the MAC command generator 270. In response to the MAC arithmetic signal MAC having a logic "high" level, the MAC command generator 270 may output the MAC output latch signal MAC_L3 having a logic "high" level, as described with reference to FIG. 5. Subsequently, at a seventh point in time "T7" when a certain time, for example, a fourth latency L4 elapses from the sixth point in time "T6", the result read signal READ_RST having a logic "high" level may be input to the MAC command generator 270. In response to the result read signal READ_RST having a logic "high" level, the MAC command generator 270 may output the MAC result latch signal MAC_L_RST having a logic "high" level, as described with reference to FIG. 5.

In order to perform the deterministic MAC arithmetic operation, moments when the internal command signals ACT_M, READ_M, MAC, and READ_RST generated by the command decoder 250 are input to the MAC command generator 270 may be fixed and moments when the MAC command signals RACTV, MAC_RD_BK0, MAC_RD_BK1, MAC_L1, MAC_L2, MAC_L3, and MAC_L_RST are output from the MAC command generator 270 in response to the internal command signals ACT_M, READ_M, MAC, and READ_RST may also be fixed. Thus, all of the first latency L1 between the first point in time "T1" and the second point in time "T2", the second latency L2 between the second point in time "T2" and the fourth point in time "T4", the third latency L3 between the fourth point in time "T4" and the sixth point in time "T6", and the fourth latency L4 between the sixth point in time "T6" and the seventh point in time "T7" may have fixed values.

In an embodiment, the first latency L1 may be defined as a time it takes to activate both of the first and second memory banks based on the MAC active signal RACTV. The second latency L2 may be defined as a time it takes to read the first and second data out of the first and second memory banks BK0 and BK1 based on the first and second MAC read signals MAC_RD_BK0 and MAC_RD_BK1 and to input the first and second data DA1 and DA2 into the first MAC operator (MAC0) 220. The third latency L3 may be defined as a time it takes to latch the first and second data DA1 and DA2 in the first MAC operator (MAC0) 220 based on the first and second MAC input latch signals MAC_L1 and MAC_L2 and it takes the first MAC operator (MAC0) 220 to perform the MAC arithmetic operation of the first and second data. The fourth latency L4 may be defined as a time it takes to latch the output data in the first MAC operator (MAC0) 220 based on the MAC output latch signal MAC_L3.

Figure 7:
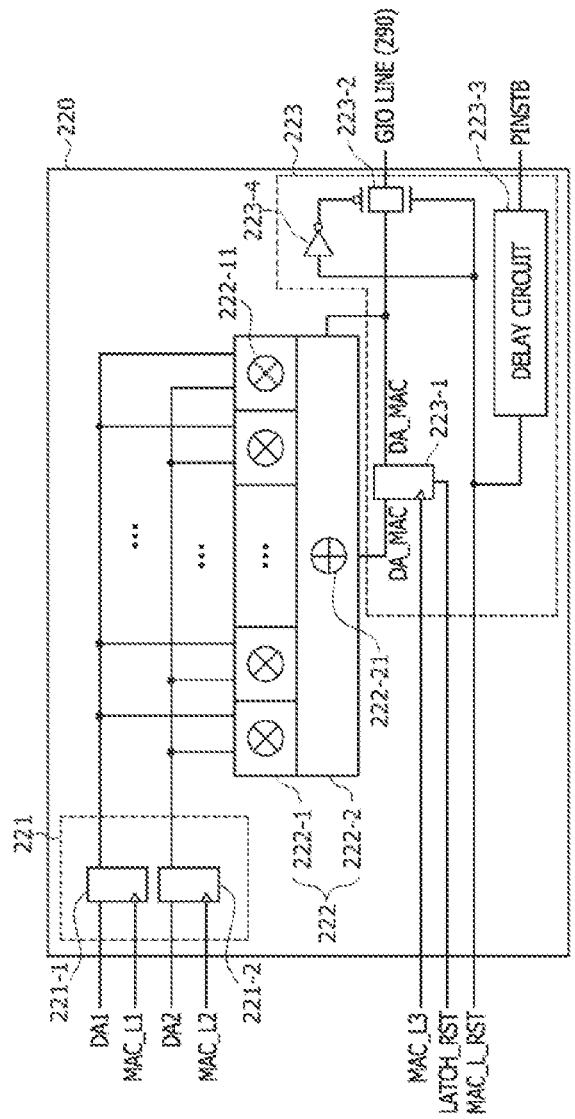
FIG. 7 illustrates an example of a configuration of a MAC operator included in the PIM device of FIG. 3.
Figure 8:
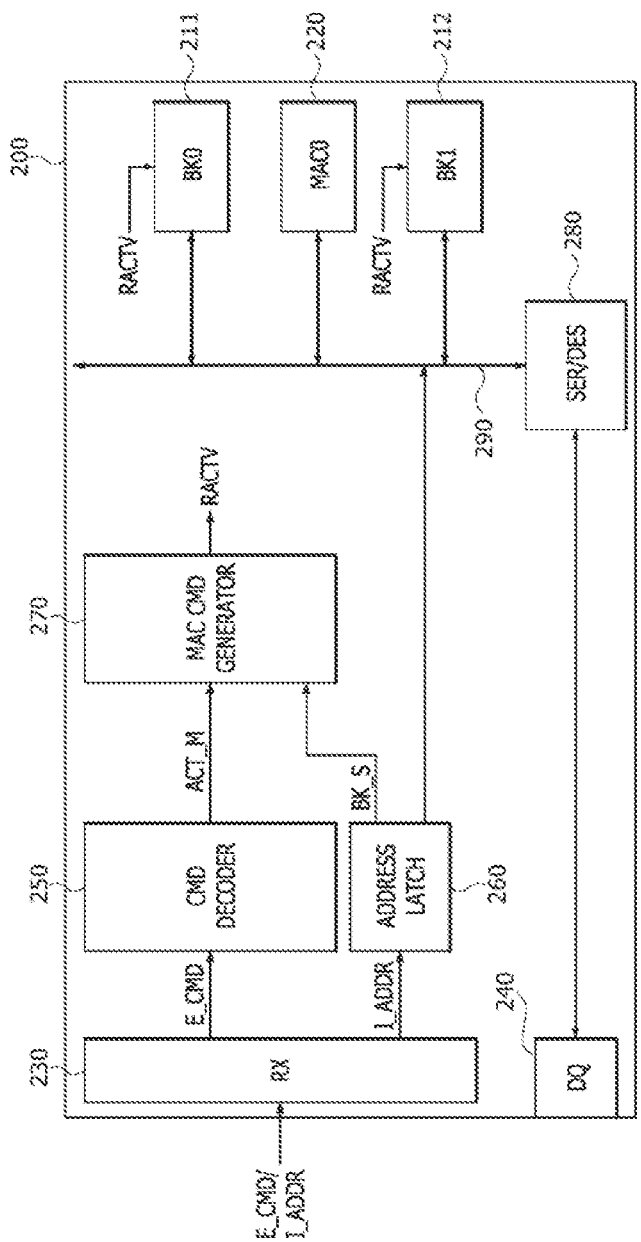
FIGS. 8, 9, 10, 11, 12, 13, and 14 are block diagrams illustrating operations of the PIM device illustrated in FIG. 3.

FIG. 7 illustrates an example of a configuration of the first MAC operator (MAC0) 220 included in the PIM device 200 illustrated in FIG. 3. Referring to FIG. 7, the first MAC operator (MAC0) 220 may be configured to include a data input circuit 221, a MAC circuit 222, and a data output circuit 223. The data input circuit 221 may be configured to include a first input latch 221-1 and a second input latch 221-2. The MAC circuit 222 may be configured to include a multiplication logic circuit circuit 222-1 and an addition logic circuit circuit 222-2. The data output circuit 223 may be configured to include an output latch 223-1, a transfer gate 223-2, a delay circuit 223-3, and an inverter 223-4. In an embodiment, the first input latch 221-1, the second input latch 221-2, and the output latch 223-1 may be realized using flip-flops.

The data input circuit 221 of the first MAC operator (MAC0) 220 may be synchronized with the first and second MAC input latch signals MAC_L1 and MAC_L2 to receive and output the first and second data DA1 and DA2 input through the GIO line 290 to the MAC circuit 222. For example, the first data DA1 may be transmitted from the first memory bank BK0 (211 of FIG. 3) to the first input latch 221-1 of the data input circuit 221 through the GIO line 290, in response to the first MAC read signal MAC_RD_BK0 having a logic "high" level output from the MAC command generator (270 of FIG. 3). The second data DA2 may be transmitted from the second memory bank BK1 (212 of FIG. 2) to the second input latch 221-2 of the data input circuit 221 through the GIO line 290, in response to the second MAC read signal MAC_RD_BK1 having a logic "high" level output from the MAC command generator 270. The first input latch 221-1 may output the first data DA1 to the MAC circuit 222 in synchronization with the first MAC input latch signal MAC_L1 having a logic "high" level output from the MAC command generator 270 (270 of FIG. 3). The second input latch 221-2 may output the second data DA2 to the MAC circuit 222 in synchronization with the second MAC input latch signal MAC_L2 having a logic "high" level output from the MAC command generator (270 of FIG. 3). As described with reference to FIG. 5, the second MAC input latch signal MAC_L2 may be generated at a moment (corresponding to the fifth point in time "T5" of FIG. 6) when a certain time elapses from a moment (corresponding to the fourth point in time "T4" of FIG. 6) when the first MAC input latch signal MAC_L1 is generated. Thus, after the first data DA1 is input to the MAC circuit 222, the second data DA2 may then be input to the MAC circuit 222.

The MAC circuit 222 may perform a multiplying calculation and an accumulative adding calculation for the first and second data DA1 and DA2. The multiplication logic circuit circuit 222-1 of the MAC circuit 222 may include a plurality of multipliers 222-11. Each of the plurality of multipliers 222-11 may perform a multiplying calculation of the first data DA1 output from the first input latch 221-1 and the second data DA2 output from the second input latch 221-2 and may output the result of the multiplying calculation. Bit values constituting the first data DA1 may be separately input to the multipliers 222-11. Similarly, bit values constituting the second data DA2 may also be separately input to the multipliers 222-11. For example, if each of the first and second data DA1 and DA2 is comprised of an 'N'-bit binary stream and the number of the multipliers 222-11 is 'M', the first data DA1 having 'N/M' bits and the second data DA2 having 'N/M' bits may be input to each of the multipliers 222-11. That is, each of the multipliers 222-11 may be configured to perform a multiplying calculation of first 'N/M'-bit data and second 'N/M'-bit data. Multiplication result data output from each of the multipliers 222-11 may have '2N/M' bits.

The addition logic circuit circuit 222-2 of the MAC circuit 222 may include a plurality of adders 222-21. Although not shown in the drawings, the plurality of adders 222-21 may be disposed to provide a tree structure including a plurality of stages. Each of the adders 222-21 disposed at a first stage may receive two sets of multiplication result data from two of the multipliers 222-11 included in the multiplication logic circuit circuit 222-1 and may perform an adding calculation of the two sets of multiplication result data to output addition result data. Each of the adders 222-21 disposed at a second stage may receive two sets of addition result data from two of the adders 222-21 disposed at the first stage and may perform an adding calculation of the two sets of addition result data to output addition result data. The adders 222-21 disposed at a last stage may receive two sets of addition result data from two adders 222-21 disposed at the previous stage and may perform an adding calculation of the two sets of addition result data to output the addition result data. The adders 222-21 constituting the addition logic circuit circuit 222-2 may include an adder for performing an accumulative adding calculation of the addition result data output from the adder 222-21 disposed at the last stage and previous MAC result data stored in the output latch 223-1 of the data output circuit 223.

The data output circuit 223 may output MAC result data DA_MAC output from the MAC circuit 222 to the GIO line 290. For example, the output latch 223-1 of the data output circuit 223 may latch the MAC result data DA_MAC output from the MAC circuit 222 and may output the latched data of the MAC result data DA_MAC in synchronization with the MAC output latch signal MAC_L3 having a logic "high" level output from the MAC command generator (270 of FIG. 3). The MAC result data DA_MAC output from the output latch 223-1 may be fed back to the MAC circuit 222 for the accumulative adding calculation. In addition, the MAC result data DA_MAC may be input to the transfer gate 223-2, and the transfer gate 223-2 may output the MAC result data DA_MAC to the GIO line 290. The output latch 223-1 may be initialized if a latch reset signal LATCH_RST is input to the output latch 223-1. In such a case, all of data latched by the output latch 223-1 may be removed. In an embodiment, the latch reset signal LATCH_RST may be activated by generation of the MAC result latch signal MAC_L_RST having a logic "high" level and may be input to the output latch 223-1.

The MAC result latch signal MAC_L_RST output from the MAC command generator 270 may be input to the transfer gate 223-2, the delay circuit 223-3, and the inverter 223-4. The inverter 223-4 may inversely buffer the MAC result latch signal MAC_L_RST to output the inversely buffered signal of the MAC result latch signal MAC_L_RST to the transfer gate 223-2. The transfer gate 223-2 may transfer the MAC result data DA_MAC from the output latch 223-1 to the GIO line 290 in response to the MAC result latch signal MAC_L_RST having a logic "high" level. The delay circuit 223-3 may delay the MAC result latch signal MAC_L_RST by a certain time to generate and output a latch control signal PINSTB.

FIGS. 8 to 14 are block diagrams illustrating operations of the PIM device 200 illustrated in FIG. 3. In FIGS. 8 to 14, the same reference numerals or the same reference symbols as used in FIG. 3 denote the same elements. First, referring to FIG. 8, if the external command E_CMD requesting the MAC arithmetic operation and the input address I_ADDR are transmitted from an external device to the receiving driver 230, the receiving driver 230 may output the external command E_CMD and the input address I_ADDR to the command decoder 250 and the address latch 260, respectively. The command decoder 250 may decode the external command E_CMD to generate and transmit the memory active signal ACT_M to the MAC command generator 270. The address latch 260 receiving the input address I_ADDR may generate and transmit the bank selection signal BK_S to the MAC command generator 270. The MAC command generator 270 may generate and output the MAC active signal RACTV in response to the memory active signal ACT_M and the bank selection signal BK_S. The MAC active signal RACTV may be transmitted to the first memory bank (BK0) 211 and the second memory bank (BK1) 212. The first memory bank (BK0) 211 and the second memory bank (BK1) 212 may be activated by the MAC active signal RACTV.

Figure 9:
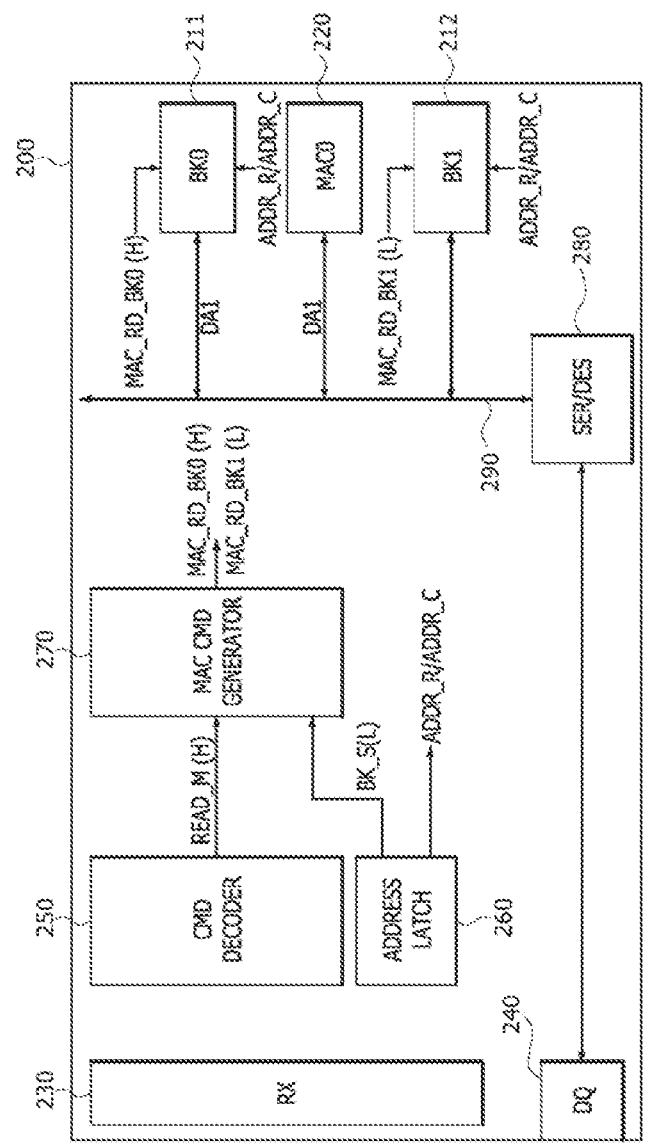

Next, referring to FIG. 9, the command decoder 250 may generate and output the memory read signal READ_M having a logic "high(H)" level to the MAC command generator 270. In addition, the address latch 260 may generate and output the bank selection signal BK_S having a logic "low(L)" level to the MAC command generator 270.

In response to the memory read signal READ_M having a logic "high(H)" level and the bank selection signal BK_S having a logic "low(L)" level, the MAC command generator 270 may generate and output the first MAC read signal MAC_RD_BK0 having a logic "high(H)" level and the second MAC read signal MAC_RD_BK1 having a logic "low(L)" level, as described with reference to FIG. 4. The first MAC read signal MAC_RD_BK0 having a logic "high (H)" level, together with the row/column address ADDR_R/ADDR_C, may be transmitted to the first memory bank (BK0) 211. The second MAC read signal MAC_RD_BK1 having a logic "low(L)" level, together with the row/column address ADDR_R/ADDR_C, may be transmitted to the second memory bank (BK1) 212. The first data DA1 may be read out of the first memory bank (BK0) 211 by the first MAC read signal MAC_RD_BK0 having a logic "high(H)" level and may be transmitted to the first MAC operator (MAC0) 220 through the GIO line 290.

Figure 10:
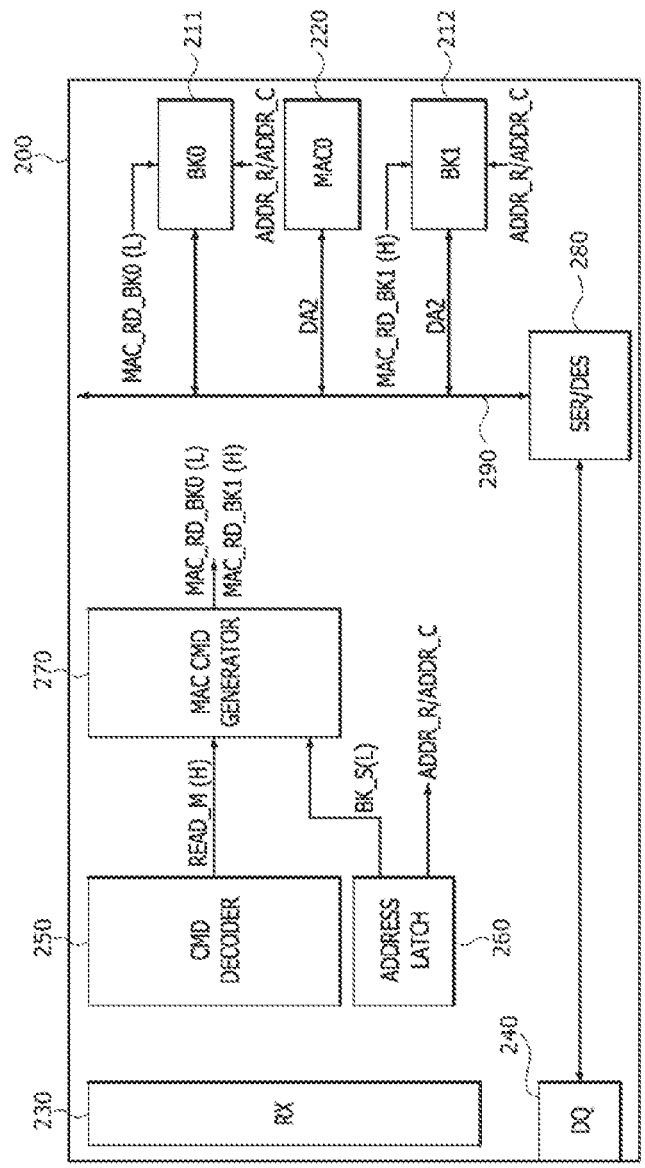

Next, referring to FIG. 10, a logic level of the bank selection signal BK_S may change from a logic "low(L)" level into a logic "high(H)" level while the memory read signal READ_M maintains a logic "high(H)" level. In such a case, as described with reference to FIG. 5, the MAC command generator 270 may generate and output the first MAC read signal MAC_RD_BK0 having a logic "low(L)" level and the second MAC read signal MAC_RD_BK1 having a logic "high(H)" level. The first MAC read signal MAC_RD_BK0 having a logic "low(L)" level, together with the row/column address ADDR_R/ADDR_C, may be transmitted to the first memory bank (BK0) 211. The second MAC read signal MAC_RD_BK1 having a logic "high(H)" level, together with the row/column address ADDR_R/ADDR_C, may be transmitted to the second memory bank (BK1) 212. The second data DA2 may be read out of the second memory bank (BK1) 212 by the second MAC read signal MAC_RD_BK1 having a logic "high(H)" level and may be transmitted to the first MAC operator (MAC0) 220 through the GIO line 290.

Figure 11:
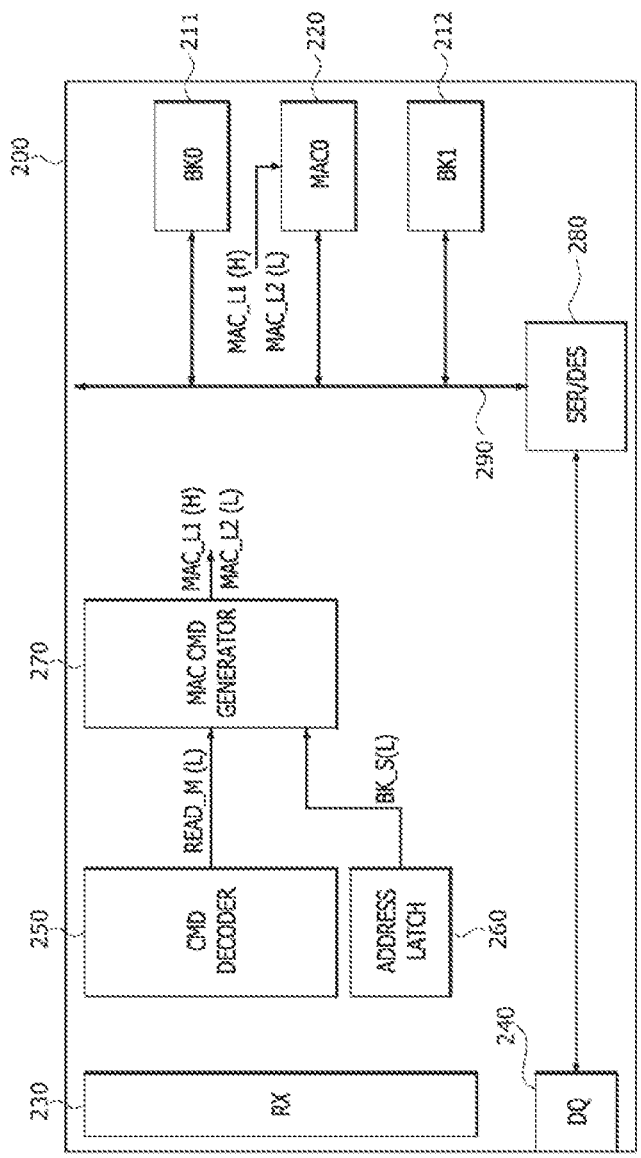

Next, referring to FIG. 11, a logic level of the memory read signal READ_M transmitted from the command decoder 250 to the MAC command generator 270 may change from a logic "high(H)" level into a logic "low(L)" level. In addition, a logic level of the bank selection signal BK_S transmitted from the address latch 260 to the MAC command generator 270 may change from a logic "high(H)" level into a logic "low(L)" level. In such a case, the MAC command generator 270 may generate and output the first MAC input latch signal MAC_L1 having a logic "high(H)" level and the second MAC input latch signal MAC_L2 having a logic "low(L)" level. A point in time when the first MAC input latch signal MAC_L1 having a logic "high(H)" level and the second MAC input latch signal MAC_L2 having a logic "low(L)" level are output from the MAC command generator 270 may be determined by a delay time of the delay circuit (271 of FIG. 4), as described with reference to FIG. 5. The first MAC input latch signal MAC_L1 having a logic "high(H)" level and the second MAC input latch signal MAC_L2 having a logic "low(L)" level output from the MAC command generator 270 may be transmitted to the first MAC operator (MAC0) 220. As described with reference to FIG. 7, the first MAC operator (MAC0) 220 may perform a latch operation of the first data DA1.

Figure 12:
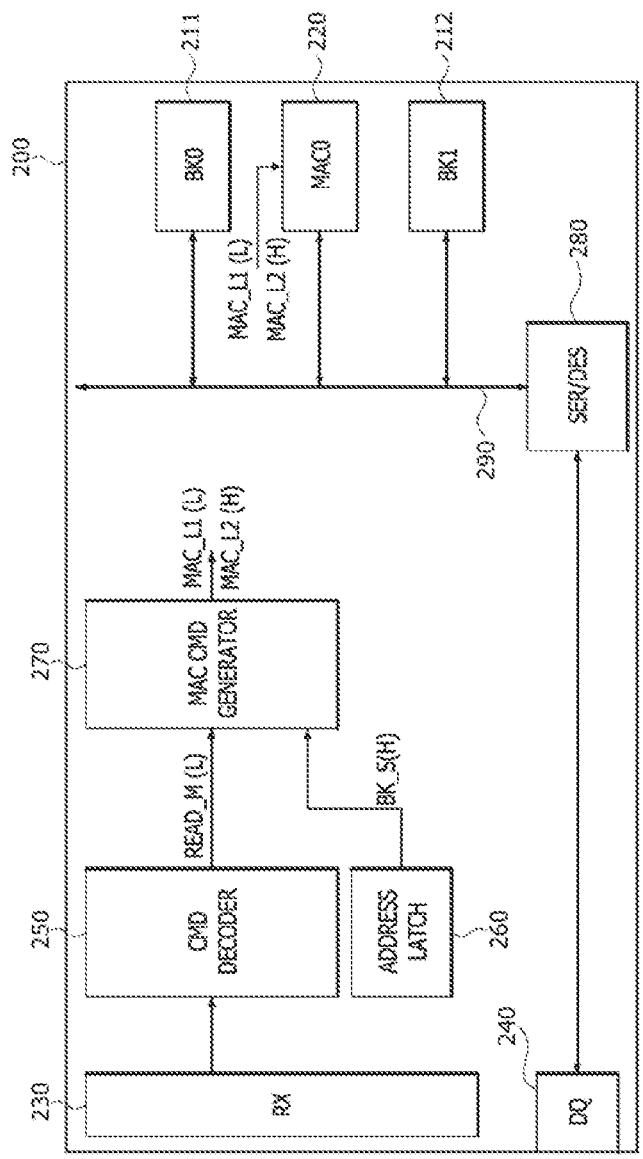

Next, referring to FIG. 12, a logic level of the bank selection signal BK_S transmitted from the address latch 260 to the MAC command generator 270 may change from a logic "low(L)" level into a logic "high(H)" level while the memory read signal READ_M maintains a logic "low(L)" level. In such a case, the MAC command generator 270 may generate and output the first MAC input latch signal MAC_L1 having a logic "low(L)" level and the second MAC input latch signal MAC_L2 having a logic "high(H)" level. A point in time when the first MAC input latch signal MAC_L1 having a logic "low(L)" level and the second MAC input latch signal MAC_L2 having a logic "high(H)" level are output from the MAC command generator 270 may be determined by a delay time of the delay circuit (271 of FIG. 5), as described with reference to FIG. 5. The first MAC input latch signal MAC_L1 having a logic "low(L)" level and the second MAC input latch signal MAC_L2 having a logic "high(H)" level output from the MAC command generator 270 may be transmitted to the first MAC operator (MAC0) 220. As described with reference to FIG. 7, the first MAC operator (MAC0) 220 may perform a latch operation of the second data DA2. After the latch operations of the first and second data DA1 and DA2 terminate, the first MAC operator (MAC0) 220 may perform the MAC arithmetic operation and may generate the MAC result data DA_MAC. The MAC result data DA_MAC generated by the first MAC operator (MAC0) 220 may be input to the output latch 223-1 included in the first MAC operator (MAC0) 220.

Figure 13:
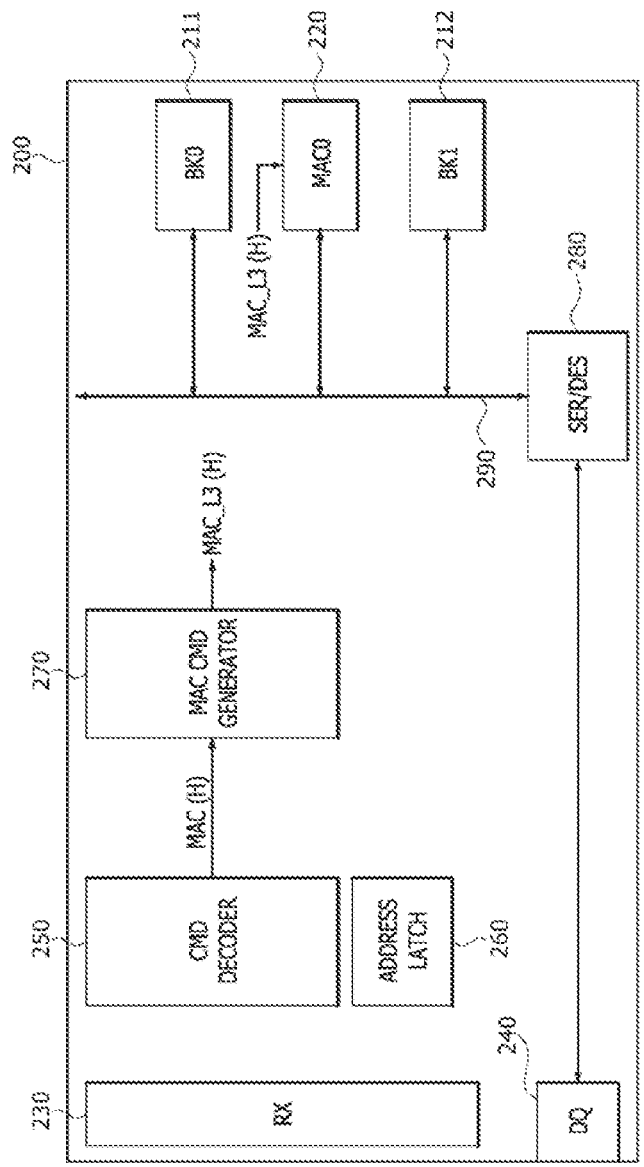

Next, referring to FIG. 13, the command decoder 250 may output and transmit the MAC arithmetic signal MAC having a logic "high(H)" level to the MAC command generator 270. The MAC command generator 270 may generate and output the MAC output latch signal MAC_L3 having a logic "high" level in response to the MAC arithmetic signal MAC having a logic "high(H)" level. The MAC output latch signal MAC_L3 having a logic "high" level may be transmitted to the first MAC operator (MAC0) 220. As described with reference to FIG. 7, the output latch (223-1 of FIG. 7) of the first MAC operator (MAC0) 220 may be synchronized with the MAC output latch signal MAC_L3 having a logic "high" level to transfer the MAC result data DA_MAC output from the MAC circuit 222 of the first MAC operator (MAC0) 220 to the transfer gate (233-2 of FIG. 7) of the first MAC operator (MAC0) 220. The MAC result data DA_MAC output from the output latch (223-1 of FIG. 7) may be fed back to the addition logic circuit circuit (222-2 of FIG. 7) for the accumulative adding calculation.

Figure 14:
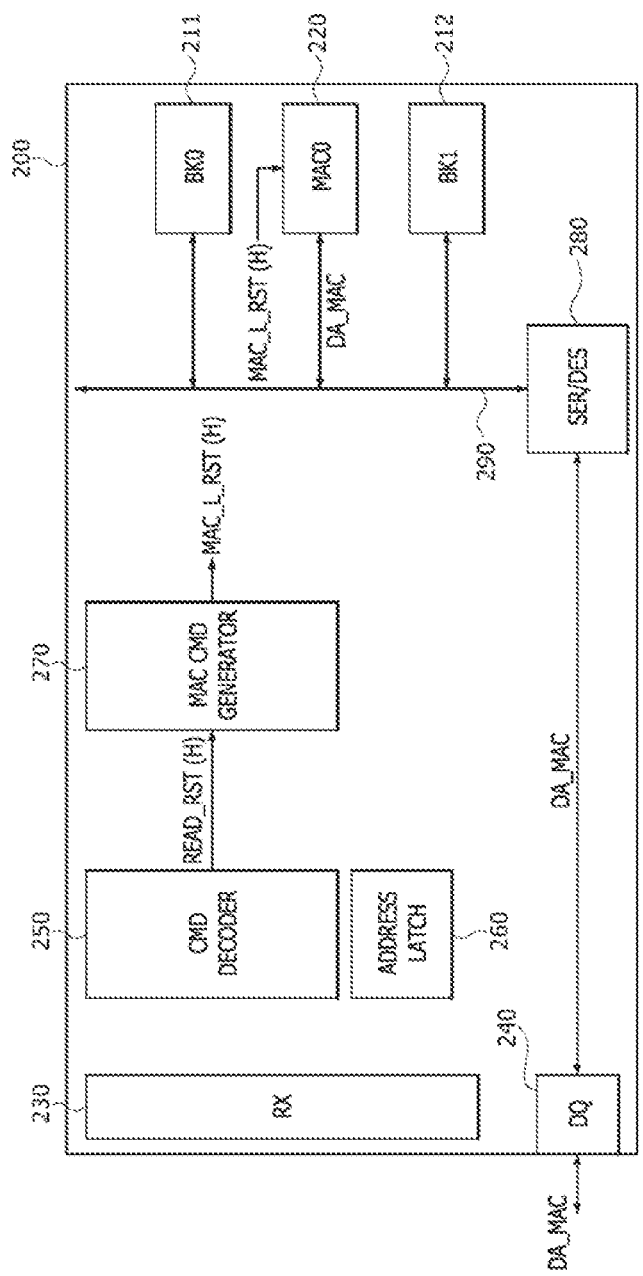

Next, referring to FIG. 14, the command decoder 250 may output and transmit the result read signal READ_RST having a logic "high(H)" level to the MAC command generator 270. The MAC command generator 270 may generate and output the MAC result latch signal MAC_L_RST having a logic "high" level in response to the result read signal READ_RST having a logic "high(H)" level. The MAC result latch signal MAC_L_RST having a logic "high" level may be transmitted to the first MAC operator (MAC0) 220. As described with reference to FIG. 7, the first MAC operator (MAC0) 220 may output the MAC result data DA_MAC to the GIO line 290 in response to the MAC result latch signal MAC_L_RST having a logic "high" level and may also reset the output latch (223-1 of FIG. 6) included in the first MAC operator (MAC0) 220 in response to the MAC result latch signal MAC_L_RST having a logic "high" level. The MAC result data DA_MAC transmitted to the GIO line 290 may be output to an external device through the serializer/deserializer 280 and the data I/O circuit 240.

Figure 15:
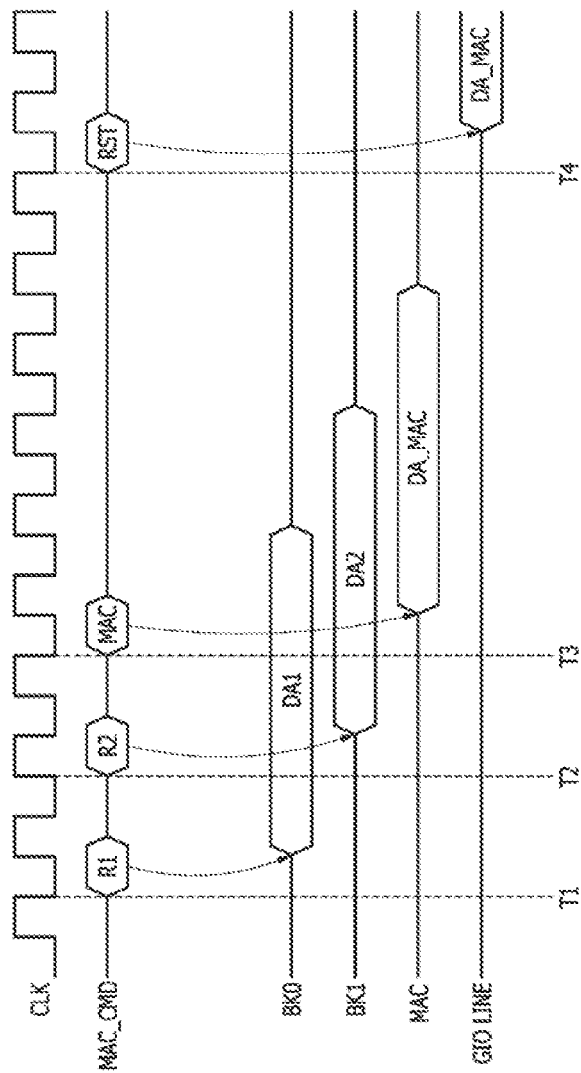
FIG. 15 is a timing diagram illustrating an operation of the PIM device illustrated in FIG. 3.

FIG. 15 is a timing diagram illustrating an operation of the PIM device 200 illustrate in FIG. 3. Referring to FIG. 15, at a first point in time "T1", the MAC command generator 270 may be synchronized with a falling edge of a clock signal CLK to generate and output the first MAC read signal MAC_RD_BK0 (R1) having a logic "high(H)" level. The first memory bank (BK0) 211 may be selected by the first MAC read signal MAC_RD_BK0 (R1) having a logic "high(H)" level so that the first data DA1 are read out of the first memory bank (BK0) 211. At a second point in time "T2", the MAC command generator 270 may be synchronized with a falling edge of the clock signal CLK to generate and output the second MAC read signal MAC_RD_BK1 (R2) having a logic "high(H)" level. The second memory bank (BK1) 212 may be selected by the second MAC read signal MAC_RD_BK1 (R2) having a logic "high(H)" level so that the second data DA2 are read out of the second memory bank (BK1) 212. At a third point in time "T3", the MAC command generator 270 may be synchronized with a falling edge of the clock signal CLK to generate and output the MAC arithmetic signal MAC having a logic "high(H)" level. The first MAC operator (MAC0) 220 may perform the multiplying calculations and the adding calculations of the first and second data DA1 and DA2 to generate the MAC result data DA_MAC, in response to the MAC arithmetic signal MAC having a logic "high(H)" level. At a fourth point in time "T4", the MAC command generator 270 may be synchronized with a falling edge of the clock signal CLK to generate and output the MAC result latch signal MAC_L_RST (RST) having a logic "high" level. The MAC result data DA_MAC generated by the first MAC operator (MAC0) 220 may be transmitted to the GIO line 290 by the MAC result latch signal MAC_L_RST (RST) having a logic "high" level.

Figure 16:
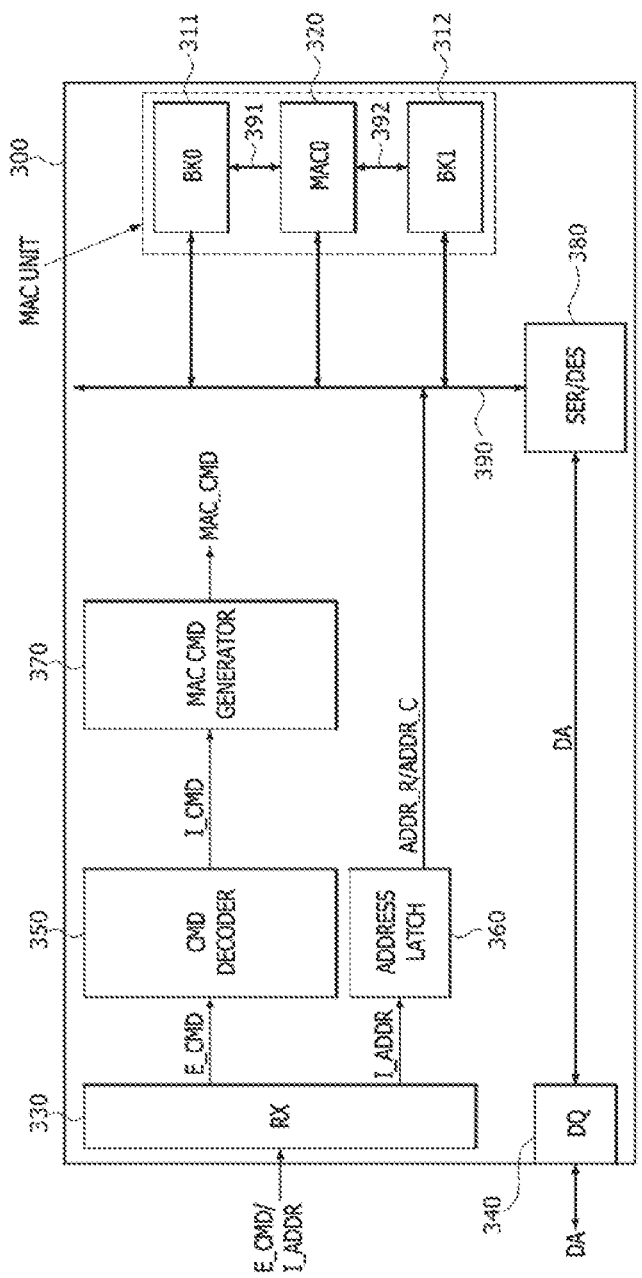
FIG. 16 is a block diagram illustrating another configuration of a PIM device according to the first embodiment of the present disclosure.
Figure 17:
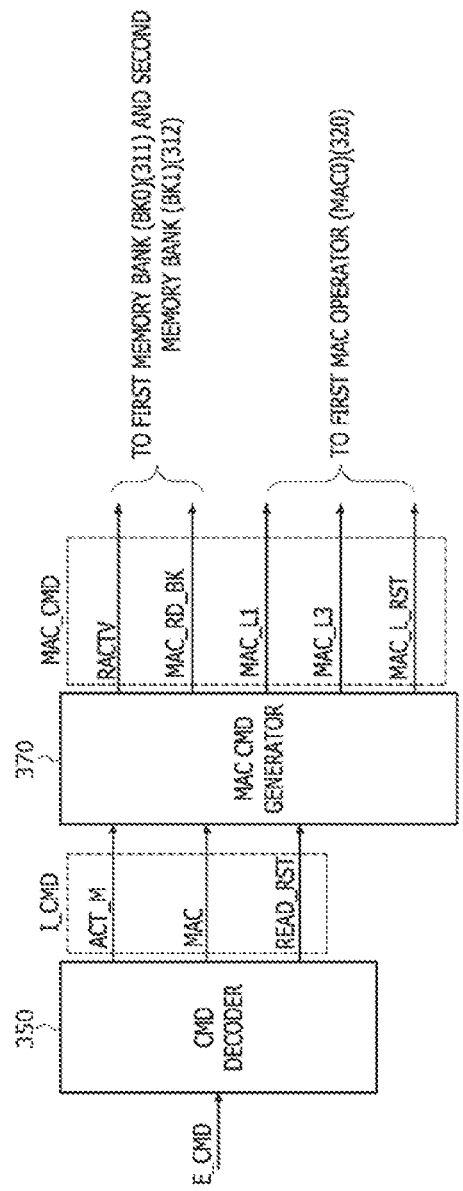
FIG. 17 illustrates internal command signals output from a command decoder and MAC command signals output from a MAC command generator in the PIM device of FIG. 16.

FIG. 16 is a block diagram illustrating another configuration of a PIM device 300 according to an embodiment of the present disclosure, and FIG. 17 illustrates an internal command signal I_CMD output from a command decoder 350 of the PIM device 300 and a MAC command signal MAC_CMD output from a MAC command generator 370 of the PIM device 300. FIG. 16 illustrates only a first memory bank (BK0) 311, a second memory bank (BK1) 312, and a first MAC operator (MAC0) 320 constituting a first MAC unit among the plurality of MAC units. However, FIG. 16 illustrates merely an example for simplification of the drawing. Accordingly, the following description for the first MAC unit may be equally applicable to the remaining MAC units.

Referring to FIG. 16, the PIM device 300 may be configured to include the first memory bank (BK0) 311, the second memory bank (BK1) 312, and the first MAC operator (MAC0) 320. The PIM device 300 according to the present embodiment may include a GIO line 390, a first bank input/output (BIO) line 391, and a second BIO line 392 acting as data transmission lines. Data communication of the first memory bank (BK0) 311, the second memory bank (BK1) 312, and the first MAC operator (MAC0) 320 may be achieved through the GIO line 390. Only the data transmission between the first memory bank (BK0) 311 and the first MAC operator (MAC0) 320 may be achieved through the first BIO line 391, and only the data transmission between the second memory bank (BK1) 312 and the first MAC operator (MAC0) 320 may be achieved through the second BIO line 392. Thus, the first MAC operator (MAC0) 320 may directly receive first data and second data from the first and second memory banks (BK0 and BK1) 311 and 312 through the first BIO line 391 and the second BIO line 392 without using the GIO line 390.

The PIM device 300 may further include a receiving driver (RX) 330, a data I/O circuit (DQ) 340, the command decoder 350, an address latch 360, the MAC command generator 370, and a serializer/deserializer (SER/DES) 380. The command decoder 350, the address latch 360, the MAC command generator 370, and the serializer/deserializer 380 may be disposed in the peripheral circuit PERI of the PIM device 100 illustrated in FIG. 2. The receiving driver 330 may receive an external command E_CMD and an input address I_ADDR from an external device. The external device may denote a host or a controller coupled to the PIM device 300. Hereinafter, it may be assumed that the external command E_CMD transmitted to the PIM device 300 is a command requesting the MAC arithmetic operation. That is, the PIM device 300 may perform the deterministic MAC arithmetic operation in response to the external command E_CMD. The data I/O circuit 340 may include a data I/O pad. The data I/O pad may be coupled with a data I/O line. The PIM device 300 communicates with the external device through the data I/O circuit 340.

The receiving driver 330 may separately output the external command E_CMD and the input address I_ADDR received from the external device. Data DA input to the PIM device 300 through the data I/O circuit 340 may be processed by the serializer/deserializer 380 and may be transmitted to the first memory bank (BK0) 311 and the second memory bank (BK1) 312 through the GIO line 390 of the PIM device 300. The data DA output from the first memory bank (BK0) 311, the second memory bank (BK1) 312, and the first MAC operator (MAC0) 320 through the GIO line 390 may be processed by the serializer/deserializer 380 and may be output to the external device through the data I/O circuit 340. The serializer/deserializer 380 may convert the data DA into parallel data if the data DA are serial data or may convert the data DA into serial data if the data DA are parallel data. For the data conversion, the serializer/deserializer 380 may include a serializer for converting parallel data into serial data and a deserializer for converting serial data into parallel data.

The command decoder 350 may decode the external command E_CMD output from the receiving driver 330 to generate and output the internal command signal I_CMD. As illustrated in FIG. 17, the internal command signal I_CMD output from the command decoder 350 may include first to third internal command signals. In an embodiment, the first internal command signal may be a memory active signal ACT_M, the second internal command signal may be a MAC arithmetic signal MAC, and the third internal command signal may be a result read signal READ_RST. The first to third internal command signals output from the command decoder 350 may be sequentially input to the MAC command generator 370.

In order to perform the deterministic MAC arithmetic operation of the PIM device 300, the memory active signal ACT_M, the MAC arithmetic signal MAC, and the result read signal READ_RST output from the command decoder 350 may be sequentially generated at predetermined points in time (or clocks). In an embodiment, the memory active signal ACT_M, the MAC arithmetic signal MAC, and the result read signal READ_RST may have predetermined latencies, respectively. For example, the MAC arithmetic signal MAC may be generated after a first latency elapses from a point in time when the memory active signal ACT_M is generated, and the result read signal READ_RST may be generated after a third latency elapses from a point in time when the MAC arithmetic signal MAC is generated. No signal is generated by the command decoder 350 until a fourth latency elapses from a point in time when the result read signal READ_RST is generated. The first to fourth latencies may be predetermined and fixed. Thus, the host or the controller outputting the external command E_CMD may predict the points in time when the first to third internal command signals constituting the internal command signal I_CMD are generated by the command decoder 350 in advance at a point in time when the external command E_CMD is output from the host or the controller. That is, the host or the controller may predict a point in time (or a clock) when the MAC arithmetic operation terminates in the PIM device 300 after the external command E_CMD requesting the MAC arithmetic operation is transmitted from the host or the controller to the PIM device 300, even without receiving any signals from the PIM device 300.

The address latch 360 may convert the input address I_ADDR output from the receiving driver 330 into a row/column address ADDR_R/ADDR_C to output the row/column address ADDR_R/ADDR_C. The row/column address ADDR_R/ADDR_C output from the address latch 360 may be transmitted to the first and second memory banks 311 and 312. According to the present embodiment, the first data and the second data to be used for the MAC arithmetic operation may be simultaneously read out of the first and second memory banks (BK0 and BK1) 311 and 312, respectively. Thus, it may be unnecessary to generate a bank selection signal for selecting any one of the first and second memory banks 311 and 312. In an embodiment, a point in time when the row/column address ADDR_R/ADDR_C is input to the first and second memory banks 311 and 312 may be a point in time when a MAC command (i.e., the MAC arithmetic signal MAC) requesting a data read operation for the first and second memory banks 311 and 312 for the MAC arithmetic operation is generated.

The MAC command generator 370 may output the MAC command signal MAC_CMD in response to the internal command signal I_CMD output from the command decoder 350. As illustrated in FIG. 16, the MAC command signal MAC_CMD output from the MAC command generator 370 may include first to fifth MAC command signals. In an embodiment, the first MAC command signal may be a MAC active signal RACTV, the second MAC command signal may be a MAC read signal MAC_RD_BK, the third MAC command signal may be a MAC input latch signal MAC_L1, the fourth MAC command signal may be a MAC output latch signal MAC_L3, and the fifth MAC command signal may be a MAC result latch signal MAC_L_RST.

The MAC active signal RACTV may be generated based on the memory active signal ACT_M output from the command decoder 350. The MAC read signal MAC_RD_BK, the MAC input latch signal MAC_L1, the MAC output latch signal MAC_L3, and the MAC result latch signal MAC_L_RST may be sequentially generated based on the MAC arithmetic signal MAC output from the command decoder 350. That is, the MAC input latch signal MAC_L1 may be generated at a point in time when a certain time elapses from a point in time when the MAC read signal MAC_RD_BK is generated. The MAC output latch signal MAC_L3 may be generated at a point in time when a certain time elapses from a point in time when the MAC input latch signal MAC_L1 is generated. Finally, the MAC result latch signal MAC_L_RST may be generated based on the result read signal READ_RST output from the command decoder 350.

The MAC active signal RACTV output from the MAC command generator 370 may control an activation operation for the first and second memory banks 311 and 312. The MAC read signal MAC_RD_BK output from the MAC command generator 370 may control a data read operation for the first and second memory banks 311 and 312. The MAC input latch signal MAC_L1 output from the MAC command generator 370 may control an input data latch operation of the first MAC operator (MAC0) 320. The MAC output latch signal MAC_L3 output from the MAC command generator 370 may control an output data latch operation of the first MAC operator (MAC0) 320. The MAC result latch signal MAC_L_RST output from the MAC command generator 370 may control an output operation of MAC result data of the first MAC operator (MAC0) 320 and a reset operation of the first MAC operator (MAC0) 320.

As described above, in order to perform the deterministic MAC arithmetic operation of the PIM device 300, the memory active signal ACT_M, the MAC arithmetic signal MAC, and the result read signal READ_RST output from the command decoder 350 may be sequentially generated at predetermined points in time (or clocks), respectively. Thus, the MAC active signal RACTV, the MAC read signal MAC_RD_BK, the MAC input latch signal MAC_L1, the MAC output latch signal MAC_L3, and the MAC result latch signal MAC_L_RST may also be generated and output from the MAC command generator 370 at predetermined points in time after the external command E_CMD is input to the PIM device 300, respectively. That is, a time period from a point in time when the first and second memory banks 311 and 312 are activated by the MAC active signal RACTV until a point in time when the first MAC operator (MAC0) 320 is reset by the MAC result latch signal MAC_L_RST may be predetermined.

Figure 18:
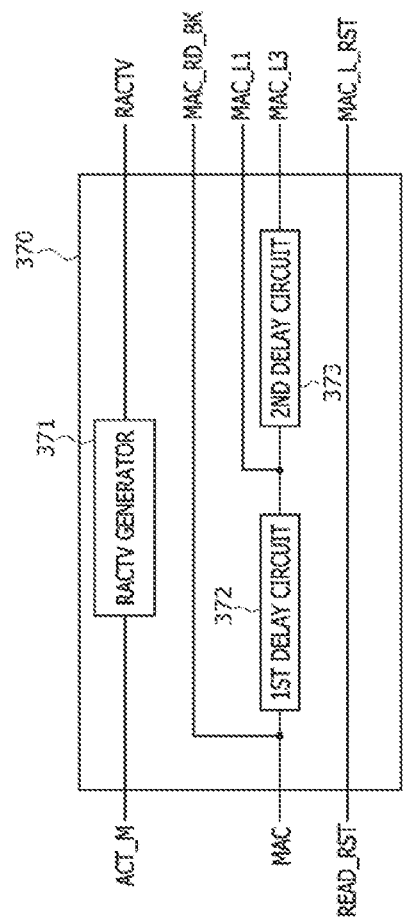
FIG. 18 illustrates an example of a configuration of a MAC command generator included in the PIM device of FIG. 16.

FIG. 18 illustrates an example of a configuration of the MAC command generator 370 included in the PIM device 300 illustrated in FIG. 16. Referring to FIG. 18, the MAC command generator 370 may sequentially receive the memory active signal ACT_M, the MAC arithmetic signal MAC, and the result read signal READ_RST from the command decoder 350. In addition, the MAC command generator 370 may sequentially generate and output the MAC active signal RACTV, the MAC read signal MAC_RD_BK, the MAC input latch signal MAC_L1, the MAC output latch signal MAC_L3, and the MAC result latch signal MAC_L_RST. The MAC active signal RACTV, the MAC read signal MAC_RD_BK, the MAC input latch signal MAC_L1, the MAC output latch signal MAC_L3, and the MAC result latch signal MAC_L_RST may be output in series with certain time intervals.

In an embodiment, the MAC command generator 370 may be configured to include an active signal generator 371, a first delay circuit 372, and a second delay circuit 373. The active signal generator 371 may receive the memory active signal ACT_M to generate and output the MAC active signal RACTV. The MAC active signal RACTV output from the active signal generator 371 may be transmitted to the first and second memory banks 311 and 312 to activate the first and second memory banks 311 and 312. The MAC command generator 370 may receive the MAC arithmetic signal MAC output from the command decoder 350 to output the MAC arithmetic signal MAC as the MAC read signal MAC_RD_BK. The first delay circuit 372 may receive the MAC arithmetic signal MAC and may delay the MAC arithmetic signal MAC by a first delay time DELAY_T1 to generate and output the MAC input latch signal MAC_L1. The second delay circuit 373 may receive an output signal of the first delay circuit 372 and may delay the output signal of the first delay circuit 372 by a second delay time DELAY_T2 to generate and output the MAC output latch signal MAC_L3. The MAC command generator 370 may generate the MAC result latch signal MAC_L_RST in response to the result read signal READ_RST output from the command decoder 350.

The MAC command generator 370 may generate and output the MAC active signal RACTV in response to the memory active signal ACT_M output from the command decoder 350. Subsequently, the MAC command generator 370 may generate and output the MAC read signal MAC_RD_BK in response to the MAC arithmetic signal MAC output from the command decoder 350. The MAC arithmetic signal MAC may be input to the first delay circuit 372. The MAC command generator 370 may delay the MAC arithmetic signal MAC by a certain time determined by the first delay circuit 372 to generate and output an output signal of the first delay circuit 372 as the MAC input latch signal MAC_L1. The output signal of the first delay circuit 372 may be input to the second delay circuit 373. The MAC command generator 370 may delay the MAC input latch signal MAC_L1 by a certain time determined by the second delay circuit 373 to generate and output an output signal of the second delay circuit 373 as the MAC output latch signal MAC_L3. Subsequently, the MAC command generator 370 may generate and output the MAC result latch signal MAC_L_RST in response to the result read signal READ_RST output from the command decoder 350.

Figure 19:
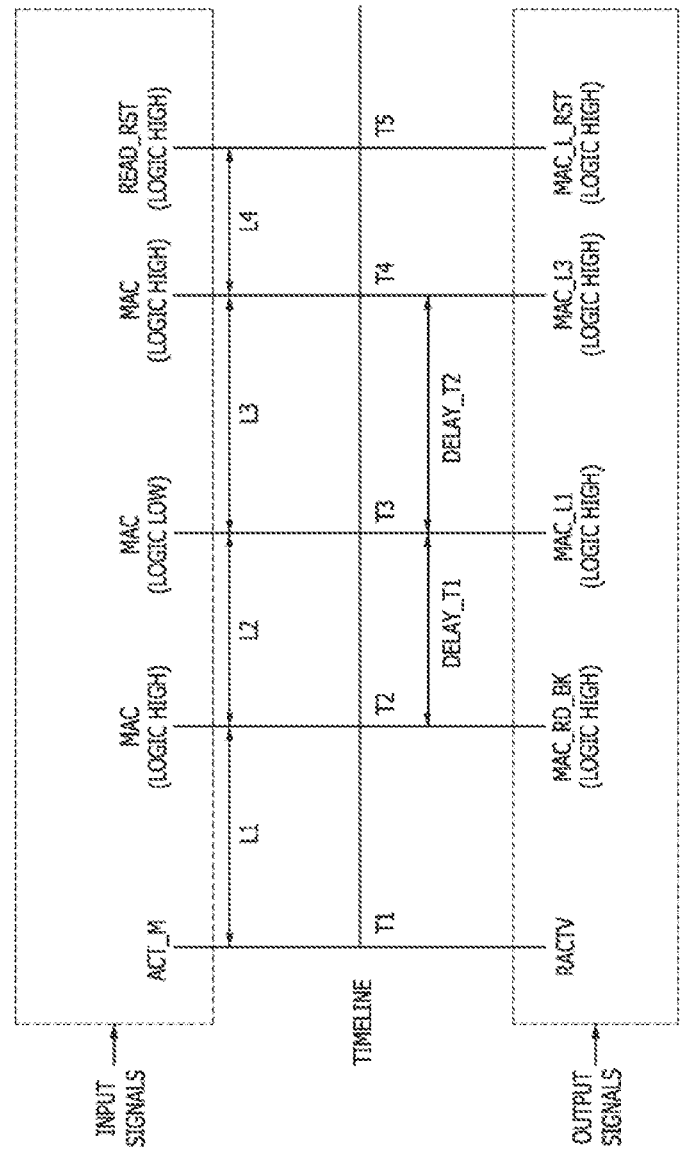
FIG. 19 illustrates input signals and output signals of the MAC command generator illustrated in FIG. 18 with a timeline.

FIG. 19 illustrates input signals and output signals of the MAC command generator 370 illustrated in FIG. 18 with a timeline. In FIG. 19, signals transmitted from the command decoder 350 to the MAC command generator 370 are illustrated in an upper dotted line box, and signals output from the MAC command generator 370 are illustrated in a lower dotted line box. Referring to FIGS. 18 and 19, at a first point in time "T1" of the timeline, the memory active signal ACT_M may be input to the MAC command generator 370 and the MAC command generator 370 may output the MAC active signal RACTV. At a second point in time "T2" when a certain time, for example, a first latency L1 elapses from the first point in time "T1", the MAC arithmetic signal MAC having a logic "high" level may be input to the MAC command generator 370. In response to the MAC arithmetic signal MAC having a logic "high" level, the MAC command generator 370 may output the MAC read signal MAC_RD_BK having a logic "high" level. At a third point in time "T3" when a certain time elapses from the second point in time "T2", a logic level of the MAC arithmetic signal MAC may change from a logic "high" level into a logic "low" level.

At the third point in time "T3" when the first delay time DELAY_T1 elapses from the second point in time "T2", the MAC command generator 370 may output the MAC input latch signal MAC_L1 having a logic "high" level. The first delay time DELAY_T1 may correspond to a delay time determined by the first delay circuit 372 illustrated in FIG. 18. The first delay time DELAY_T1 may be set to be different according to a logic design scheme of the first delay circuit 372. In an embodiment, the first delay time DELAY_T1 may be set to be equal to or greater than a second latency L2. At a fourth point in time "T4" when a certain time elapses from the third point in time "T3", the MAC command generator 370 may output the MAC output latch signal MAC_L3 having a logic "high" level. The fourth point in time "T4" may be a moment when the second delay time DELAY_T2 elapses from the third point in time "T3". The second delay time DELAY_T2 may correspond to a delay time determined by the second delay circuit 373 illustrated in FIG. 18. The second delay time DELAY_T2 may be set to be different according to a logic design scheme of the second delay circuit 373. In an embodiment, the second delay time DELAY_T2 may be set to be equal to or greater than a third latency L3. At a fifth point in time "T5" when a certain time, for example, a fourth L4 elapses from the fourth point in time "T4", the result read signal READ_RST having a logic "high" level may be input to the MAC command generator 370. In response to the result read signal READ_RST having a logic "high" level, the MAC command generator 370 may output the MAC result latch signal MAC_L_RST having a logic "high" level, as described with reference to FIG. 18.

In order to perform the deterministic MAC arithmetic operation, moments when the internal command signals ACT_M, MAC, and READ_RST generated by the command decoder 350 are input to the MAC command generator 370 may be fixed and moments when the MAC command signals RACTV, MAC_RD_BK, MAC_L1, MAC_L3, and MAC_L_RST are output from the MAC command generator 370 in response to the internal command signals ACT_M, MAC, and READ_RST may also be fixed. Thus, all of the first latency L1 between the first point in time "T1" and the second point in time "T2", the second latency L2 between the second point in time "T2" and the third point in time "T3", the third latency L3 between the third point in time "T3" and the fourth point in time "T4", and the fourth latency L4 between the fourth point in time "T4" and the fifth point in time "T5" may have fixed values.

In an embodiment, the first latency L1 may be defined as a time it takes to activate both of the first and second memory banks based on the MAC active signal RACTV. The second latency L2 may be defined as a time it takes to read the first and second data out of the first and second memory banks (BK0 and BK1) 311 and 312 based on the MAC read signals MAC_RD_BK and to input the first and second data DA1 and DA2 into the first MAC operator (MAC0) 320. The third latency L3 may be defined as a time it takes to latch the first and second data DA1 and DA2 in the first MAC operator (MAC0) 320 based on the MAC input latch signals MAC_L1 and it takes the first MAC operator (MAC0) 320 to perform the MAC arithmetic operation of the first and second data. The fourth latency L4 may be defined as a time it takes to latch the output data in the first MAC operator (MAC0) 320 based on the MAC output latch signal MAC_L3.

Figure 20:
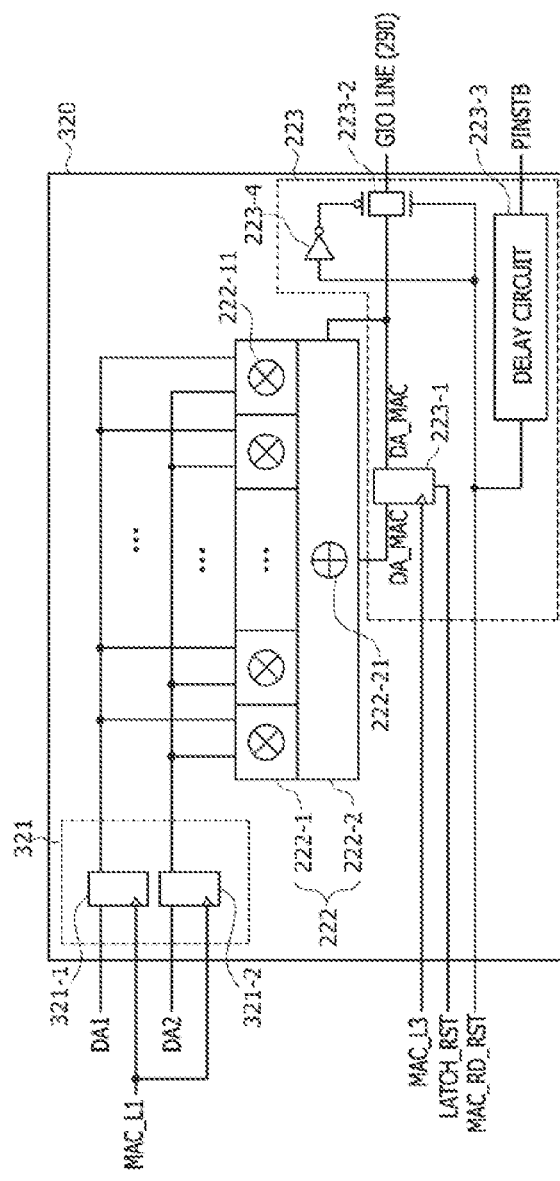
FIG. 20 illustrates an example of a configuration of a MAC operator included in the PIM device of FIG. 16.
Figure 21:
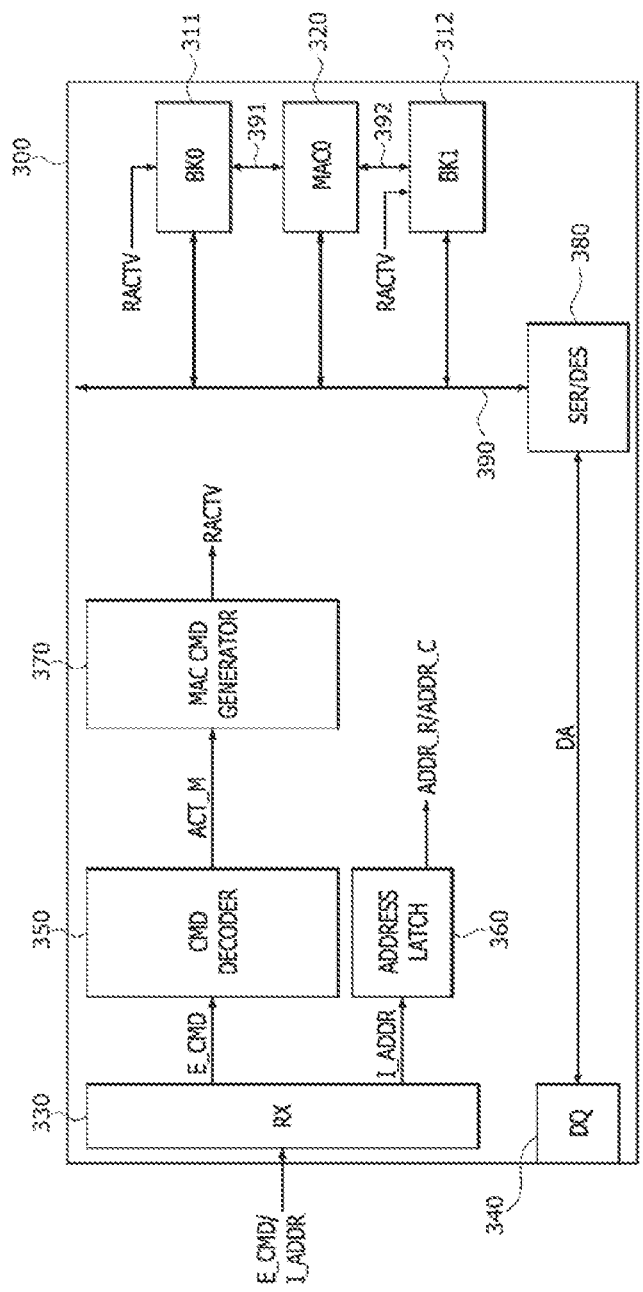
FIGS. 21, 22, 23, 24, and 25 are block diagrams illustrating operations of the PIM device illustrated in FIG. 16.

FIG. 20 illustrates an example of a configuration of the first MAC operator (MAC0) 320 included in the PIM device 300 of FIG. 16. The first MAC operator (MAC0) 320 included in the PIM device 300 may have the same configuration as the first MAC operator (MAC0) 220 described with reference to FIG. 7 except for a signal applied to clock terminals of first and second input latches 321-1 and 321-2 constituting a data input circuit 321. Thus, in FIG. 20, the same reference numerals or the same reference symbols as used in FIG. 7 denote the same elements, and descriptions of the same elements as set forth with reference to FIG. 7 will be omitted hereinafter.

Describing in detail the differences between the first MAC operator (MAC0) 220 and the first MAC operator (MAC0) 320, in case of the first MAC operator (MAC0) 220 illustrated in FIG. 7, the first input latch (221-1 of FIG. 7) and the second input latch (221-2 of FIG. 7) of the data input circuit (221 of FIG. 7) may be synchronized with the first and second MAC input latch signals MAC_L1 and MAC_L2, respectively, sequentially generated with a certain time interval to output the first data DA1 and the second data DA2. In contrast, in case of the first MAC operator (MAC0) 320, the MAC input latch signal MAC_L1 may be input to both of the clock terminals of the first and second input latches 321-1 and 321-2 constituting a data input circuit 321. Thus, both of the first and second input latches 321-1 and 321-2 may be synchronized with the MAC input latch signal MAC_L1 to output the first data DA1 and the second data DA2, respectively. Accordingly, the first MAC operator (MAC0) 320 may transmit the first and second data DA1 and DA2 to the MAC circuit 222 in parallel without any time interval between the first and second data DA1 and DA2. As a result, the MAC arithmetic operation of the MAC circuit 222 may be quickly performed without any delay of data input time.

FIGS. 21 to 25 are block diagrams illustrating operations of the PIM device 300 illustrated in FIG. 16. In FIGS. 21 to 25, the same reference numerals or the same reference symbols as used in FIG. 16 denote the same elements. First, referring to FIG. 21, if the external command E_CMD requesting the MAC arithmetic operation and the input address I_ADDR are transmitted from an external device to the receiving driver 330, the receiving driver 330 may output the external command E_CMD and the input address I_ADDR to the command decoder 350 and the address latch 360, respectively. The command decoder 350 may decode the external command E_CMD to generate and transmit the memory active signal ACT_M to the MAC command generator 370. The MAC command generator 370 may generate and output the MAC active signal RACTV in response to the memory active signal ACT_M. The MAC active signal RACTV may be transmitted to the first memory bank (BK0) 311 and the second memory bank (BK1) 312. Both of the first memory bank (BK0) 311 and the second memory bank (BK1) 312 may be activated by the MAC active signal RACTV.

Figure 22:
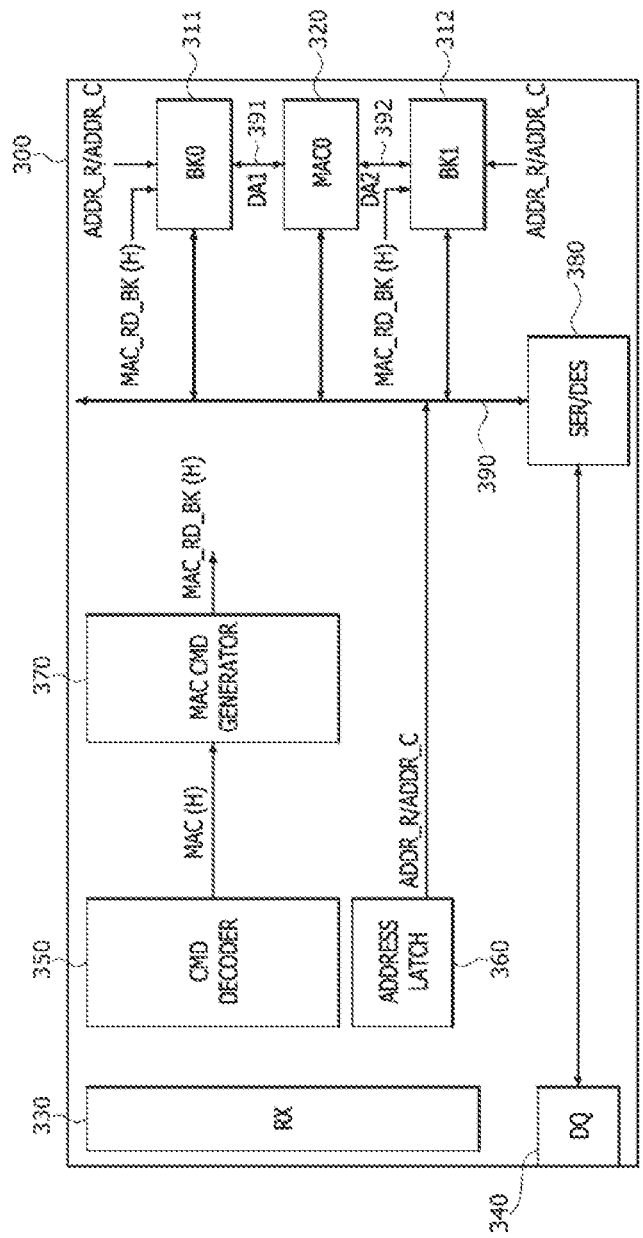

Next, referring to FIG. 22, the command decoder 350 may generate and output the MAC arithmetic signal MAC having a logic "high(H)" level to the MAC command generator 370. In response to the MAC arithmetic signal MAC having a logic "high(H)" level, the MAC command generator 370 may generate and output the MAC read signal MAC_RD_BK having a logic "high(H)" level. The MAC read signal MAC_RD_BK having a logic "high(H)" level, together with the row/column address ADDR_R/ADDR_C, may be transmitted to the first memory bank (BK0) 311 and the second memory bank (BK1) 312. The first data DA1 may be read out of the first memory bank (BK0) 311 by the MAC read signal MAC_RD_BK having a logic "high(H)" level and may be transmitted to the first MAC operator (MAC0) 320 through the first BIO line 391. In addition, the second data DA2 may be read out of the second memory bank (BK1) 312 by the MAC read signal MAC_RD_BK having a logic "high(H)" level and may be transmitted to the first MAC operator (MAC0) 320 through the second BIO line 392.

Figure 23:
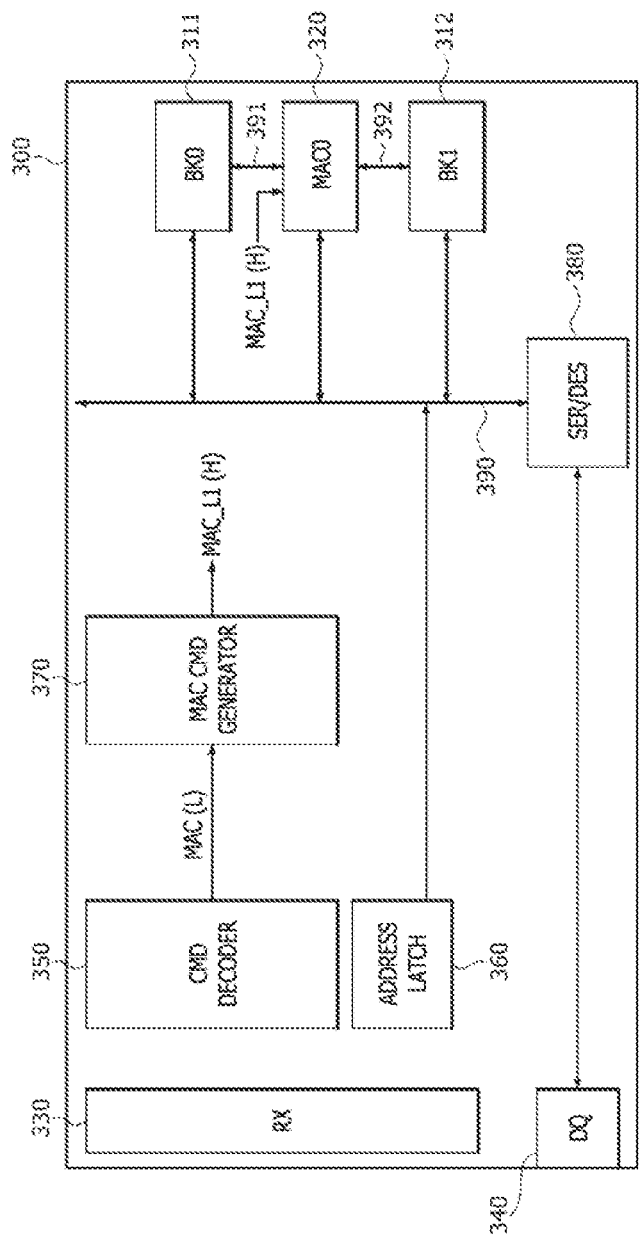

Next, referring to FIG. 23, a logic level of the MAC arithmetic signal MAC output from the command decoder 350 may change from a logic "high(H)" level into a logic "low(L)" level at a point in time when the first delay time DELAY_T1 determined by the first delay circuit (372 of FIG. 18) elapses from a point in time when the MAC read signal MAC_RD_BK is output from the MAC command generator 370. The MAC command generator 370 may generate and output the MAC input latch signal MAC_L1 having a logic "high(H)" level in response to the MAC arithmetic signal MAC having a logic "low(L)" level. The MAC input latch signal MAC_L1 having a logic "high(H)" level may be transmitted to the first MAC operator (MAC0) 320. The first MAC operator (MAC0) 320 may be synchronized with the MAC input latch signal MAC_L1 having a logic "high(H)" level to perform a latch operation of the first and second data DA1 and DA2 output from the first and second memory banks (BK0 and BK1) 311 and 312. If the latch operation of the first and second data DA1 and DA2 terminates, the first MAC operator (MAC0) 320 may perform the MAC arithmetic operation and may generate the MAC result data DA_MAC. The MAC result data DA_MAC generated by the first MAC operator (MAC0) 320 may be input to the output latch (223-1 of FIG. 20) included in the first MAC operator (MAC0) 320.

Figure 24:
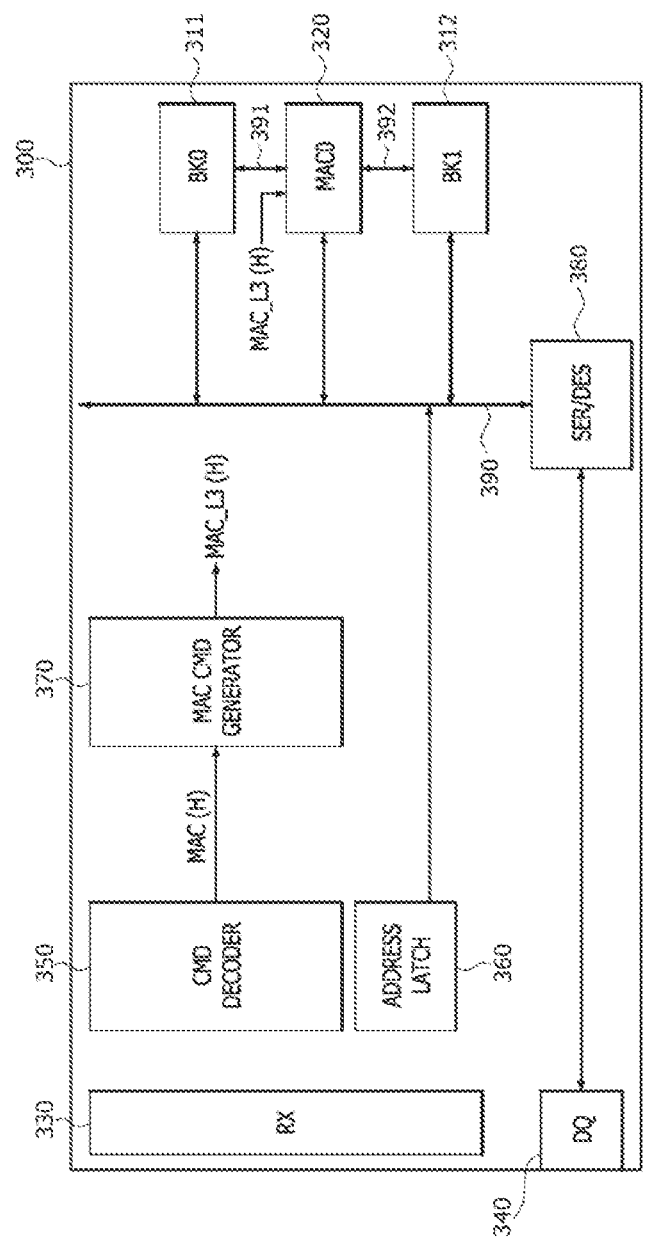

Next, referring to FIG. 24, a logic level of the MAC arithmetic signal MAC output from the command decoder 350 may change from a logic "low(L)" level into a logic "high(H)" level at a point in time when the second delay time DELAY_T2 determined by the second delay circuit (373 of FIG. 18) elapses from a point in time when the MAC input latch signal MAC_L1 having a logic "high(H)" level is output from the MAC command generator 370. The MAC command generator 370 may generate and output the MAC output latch signal MAC_L3 having a logic "high(H)" level in response to the MAC arithmetic signal MAC having a logic "high(H)" level. The MAC output latch signal MAC_L3 having a logic "high(H)" level may be transmitted to the first MAC operator (MAC0) 320. The output latch (223-1 of FIG. 20) included in the first MAC operator (MAC0) 320 may be synchronized with the MAC output latch signal MAC_L3 having a logic "high(H)" level to transfer the MAC result data DA_MAC generated by the MAC circuit (222 of FIG. 20) to the transfer gate (223-2 of FIG. 20) included in the first MAC operator (MAC0) 320. The MAC result data DA_MAC output from the output latch (223-1 of FIG. 20) may be fed back to the addition logic circuit circuit (222-2 of FIG. 20) for the accumulative adding calculation executed by the MAC circuit (222 of FIG. 20).

Figure 25:
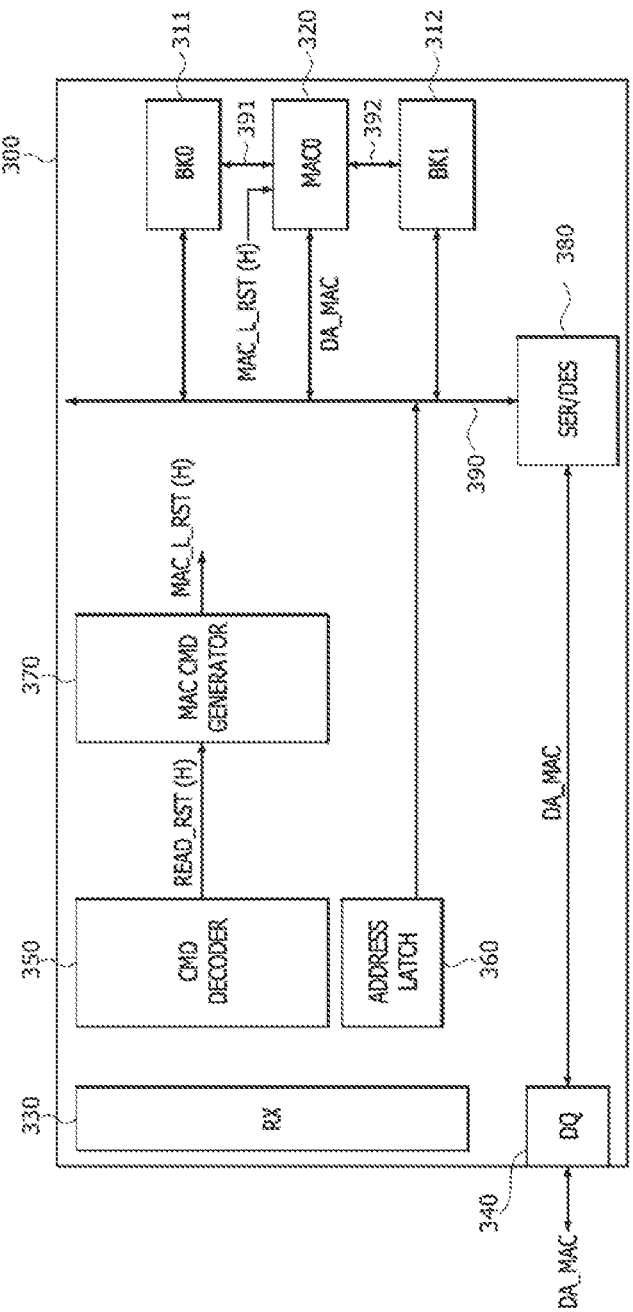

Next, referring to FIG. 25, the command decoder 350 may output and transmit the result read signal READ_RST having a logic "high(H)" level to the MAC command generator 370. The MAC command generator 370 may generate and output the MAC result latch signal MAC_L_RST having a logic "high" level in response to the result read signal READ_RST having a logic "high(H)" level. The MAC result latch signal MAC_L_RST having a logic "high" level may be transmitted to the first MAC operator (MAC0) 320. As described with reference to FIG. 20, the first MAC operator (MAC0) 320 may output the MAC result data DA_MAC to the GIO line 390 in response to the MAC result latch signal MAC_L_RST having a logic "high" level and may also reset the output latch (223-1 of FIG. 20) included in the first MAC operator (MAC0) 320 in response to the MAC result latch signal MAC_L_RST having a logic "high" level. The MAC result data DA_MAC transmitted to the GIO line 390 may be output to an external device through the serializer/deserializer 380 and the data I/O line 340. Although not shown in the drawings, the MAC result data DA_MAC output from the first MAC operator (MAC0) 320 may be written into the first memory bank (BK0) 311 through the first BIO line 391 without using the GIO line 390 or may be written into the second memory bank (BK1) 312 through the second BIO line 392 without using the GIO line 390.

Figure 26:
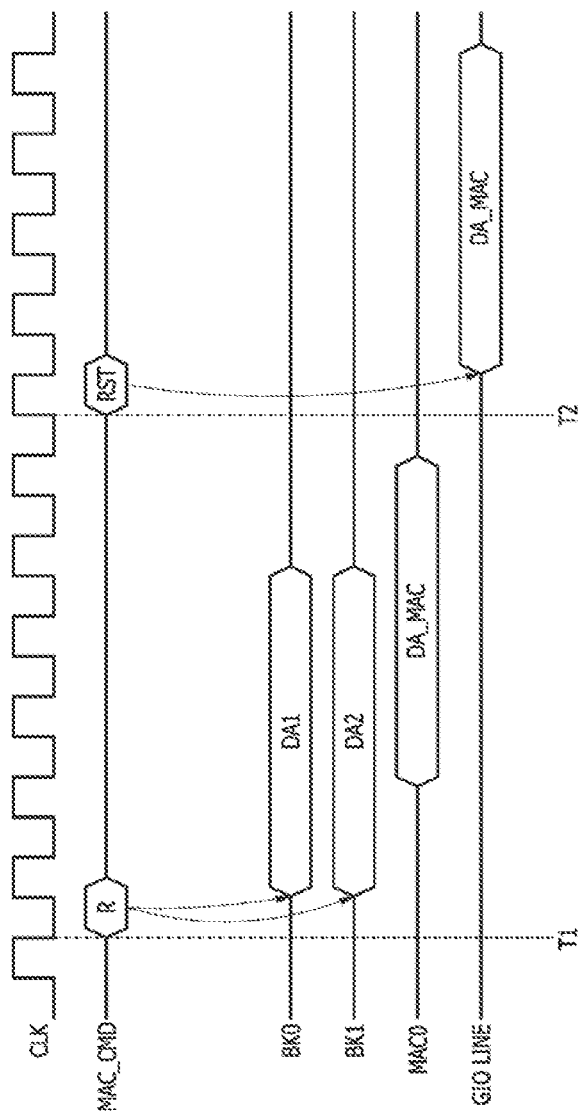
FIG. 26 is a timing diagram an operation of the PIM device illustrated in FIG. 16.

FIG. 26 is a timing diagram illustrating an operation of the PIM device 300 illustrated in FIG. 16. Referring to FIG. 26, at a first point in time "T1", the MAC command generator 370 may be synchronized with a falling edge of a clock signal CLK to generate and output the MAC read signal MAC_RD_BK (R) having a logic "high(H)" level. The first and second memory banks (BK0 and BK1) 311 and 312 may be selected by the MAC read signal MAC_RD_BK (R) having a logic "high(H)" level so that the first data DA1 and the second data DA2 are read out of the first and second memory banks (BK0 and BK1) 311 and 312. If a certain time elapses from a point in time when first data DA1 and the second data DA2 are read out, the first MAC operator (MAC0) 320 may perform the MAC arithmetic operation of the first and second data DA1 and DA2 to generate the MAC result data DA_MAC. At a second point in time "T2", the MAC command generator 370 may be synchronized with a falling edge of the clock signal CLK to generate and output the MAC result latch signal MAC_L_RST (RST) having a logic "high" level. The MAC result data DA_MAC may be transmitted to the GIO line 390 by the MAC result latch signal MAC_L_RST (RST) having a logic "high" level.

Figure 27:
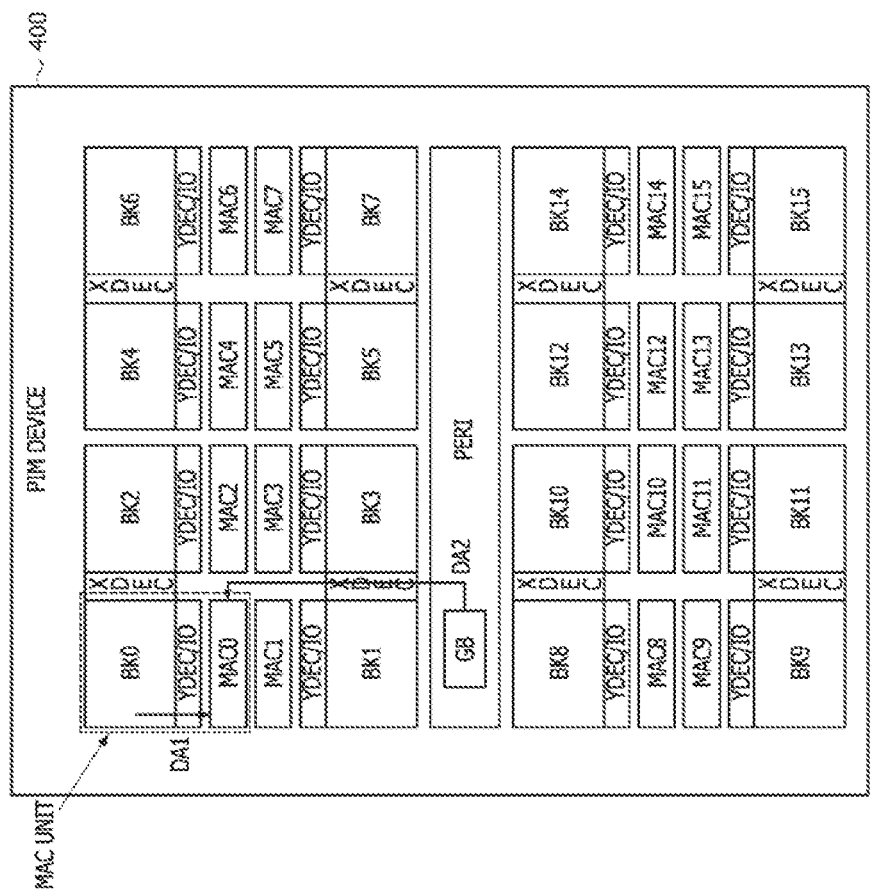
FIG. 27 is a schematic diagram illustrating an arrangement of memory banks and multiplication/accumulation (MAC) operators included in a PIM device according to a second embodiment of the present disclosure.

FIG. 27 illustrates a disposal structure indicating placement of memory banks and MAC operators included in a PIM device 400 according to another embodiment of the present disclosure. Referring to FIG. 27, the PIM device 400 may include memory devices such as a plurality of memory banks (e.g., first to sixteenth memory banks BK0, . . . , and BK15), processing devices such as a plurality of MAC operators (e.g., first to sixteenth MAC operators MAC0, . . . , and MAC15), and a global buffer GB. A core circuit may be disposed to be adjacent to the memory banks BK0, . . . , and BK15. The core circuit may include X-decoders XDECs and Y-decoders/IO circuits YDEC/IOs. The memory banks BK0, . . . , and BK15 and the core circuit may have the same configuration as described with reference to FIG. 2. Thus, descriptions of the memory banks BK0, . . . , and BK15 and the core circuit will be omitted hereinafter. The MAC operators MAC0, . . . , and MAC15 may be disposed to be allocated to the memory banks BK0, . . . , and BK15, respectively. That is, in the PIM device 400, two or more memory banks do not share one MAC operator with each other. Thus, the number of the MAC operators MAC0, . . . , and MAC15 included in the PIM device 400 may be equal to the number of the memory banks BK0, . . . , and BK15 included in the PIM device 400. One of the memory banks BK0, . . . , and BK15 together with one of the MAC operators MAC0, . . . , and MAC15 may constitute one MAC unit. For example, the first memory bank BK0 and the first MAC operator MAC0 may constitute a first MAC unit, and the second memory bank BK1 and the second MAC operator MAC1 may constitute a second MAC unit. Similarly, the sixteenth memory bank BK15 and the sixteenth MAC operator MAC15 may constitute a sixteenth MAC unit. In each of the first to sixteenth MAC units, the MAC operator may receive first data DA1 to be used for the MAC arithmetic operation from the respective memory bank.

The PIM device 400 may further include a peripheral circuit PERI. The peripheral circuit PERI may be disposed in a region other than an area in which the memory banks BK0, BK1, . . . , and BK15; the MAC operators MAC0, . . . , and MAC15; and the core circuit are disposed. The peripheral circuit PERI may be configured to include a control circuit relating to a command/address signal, a control circuit relating to input/output of data, and a power supply circuit. The peripheral circuit PERI of the PIM device 400 may have substantially the same configuration as the peripheral circuit PERI of the PIM device 100 illustrated in FIG. 2. A difference between the peripheral circuit PERI of the PIM device 400 and the peripheral circuit PERI of the PIM device 100 is that the global buffer GB is disposed in the peripheral circuit PERI of the PIM device 400. The global buffer GB may receive second data DA2 to be used for the MAC operation from an external device and may store the second data DA2. The global buffer GB may output the second data DA2 to each of the MAC operators MAC0, ..., and MAC15 through a GIO line. In the event that the PIM device 400 performs neural network calculation, for example, an arithmetic operation in a deep learning process, the first data DA1 may be weight data and the second data DA2 may be vector data.

The PIM device 400 according to the present embodiment may operate in a memory mode or a MAC arithmetic mode. In the memory mode, the PIM device 400 may operate to perform the same operations as general memory devices. The memory mode may include a memory read operation mode and a memory write operation mode. In the memory read operation mode, the PIM device 400 may perform a read operation for reading out data from the memory banks BK0, BK1, ..., and BK15 to output the read data, in response to an external request. In the memory write operation mode, the PIM device 400 may perform a write operation for storing data provided by an external device into the memory banks BK0, BK1, ..., and BK15, in response to an external request. In the MAC arithmetic mode, the PIM device 400 may perform the MAC arithmetic operation using the MAC operators MAC0, ..., and MAC15. In the PIM device 400, the MAC arithmetic operation may be performed in a deterministic way, and the deterministic MAC arithmetic operation of the PIM device 400 will be described more fully hereinafter. For example, the PIM device 400 may perform the read operation of the first data DA1 for each of the memory banks BK0, ..., and BK15 and the read operation of the second data DA2 for the global buffer GB, for the MAC arithmetic operation in the MAC arithmetic mode. In addition, each of the MAC operators MAC0, ..., and MAC15 may perform the MAC arithmetic operation of the first data DA1 and the second data DA2 to store a result of the MAC arithmetic operation into the memory bank or to output the result of the MAC arithmetic operation to an external device. In some cases, the PIM device 400 may perform a data write operation for storing data to be used for the MAC arithmetic operation into the memory banks before the data read operation for the MAC arithmetic operation is performed in the MAC arithmetic mode.

The operation mode of the PIM device 400 according to the present embodiment may be determined by a command which is transmitted from a host or a controller to the PIM device 400. In an embodiment, if a first external command requesting a read operation or a write operation for the memory banks BK0, BK1, ..., and BK15 is transmitted from the host or the controller to the PIM device 400, the PIM device 400 may perform the data read operation or the data write operation in the memory mode. Alternatively, if a second external command requesting the MAC arithmetic operation is transmitted from the host or the controller to the PIM device 400, the PIM device 400 may perform the data read operation and the MAC arithmetic operation.

The PIM device 400 may perform the deterministic MAC arithmetic operation. Thus, the host or the controller may always predict a point in time (or a clock) when the MAC arithmetic operation terminates in the PIM device 400 from a point in time when an external command requesting the MAC arithmetic operation is transmitted from the host or the controller to the PIM device 400. Because the timing is predictable, no operation for informing the host or the controller of a status of the MAC arithmetic operation is required while the PIM device 400 performs the deterministic MAC arithmetic operation. In an embodiment, a latency during which the MAC arithmetic operation is performed in the PIM device 400 may be set to a fixed value for the deterministic MAC arithmetic operation.

Figure 28:
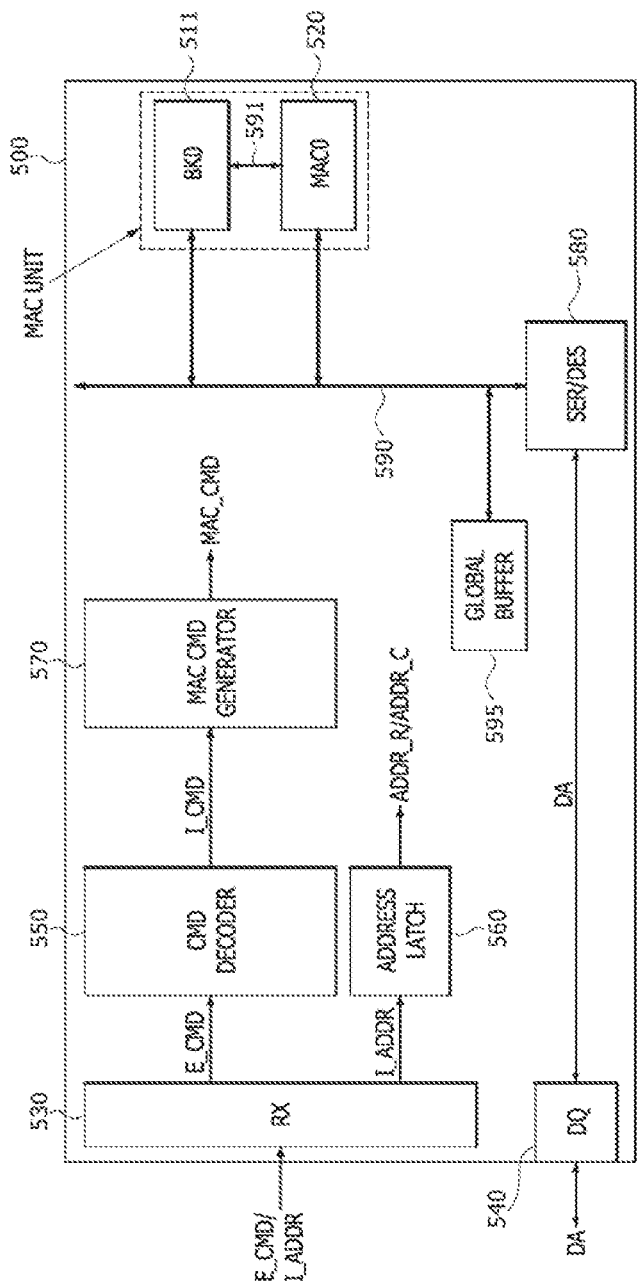
FIG. 28 is a block diagram illustrating a configuration of a PIM device according to the second embodiment of the present disclosure.

FIG. 28 is a block diagram illustrating an example of a detailed configuration of a PIM device 500 corresponding to the PIM device 400 illustrated in FIG. 27. FIG. 28 illustrates only a first memory bank (BK0) 511 and a first MAC operator (MAC0) 520 constituting a first MAC unit among a plurality of MAC units. However, FIG. 28 illustrates merely an example for simplification of the drawing. Accordingly, the following description for the first MAC unit may be equally applicable to the remaining MAC units. Referring to FIG. 28, the PIM device 500 may be configured to include the first memory bank (BK0) 511 and the first MAC operator (MAC0) 520 constituting the first MAC unit as well as a global buffer 595. The PIM device 500 may further include a GIO line 590 and a BIO line 591 used as data transmission lines. The first memory bank (BK0) 511 and the first MAC operator (MAC0) 520 may communicate with the global buffer 595 through the GIO line 590. Only the data transmission between the first memory bank (BK0) 511 and the first MAC operator (MAC0) 520 may be achieved through the BIO line 591. The BIO line 591 is dedicated specifically for data transmission between the first memory bank (BK0) 511 and the first MAC operator (MAC0) 520. Thus, the first MAC operator (MAC0) 520 may receive the first data DA1 to be used for the MAC arithmetic operation from the first memory bank (BK0) 511 through the BIO line 591 and may receive the second data DA2 to be used for the MAC arithmetic operation from the global buffer 595 through the GIO line 590.

The PIM device 500 may include a receiving driver (RX) 530, a data I/O circuit (DQ) 540, a command decoder 550, an address latch 560, a MAC command generator 570, and a serializer/deserializer (SER/DES) 580. The command decoder 550, the address latch 560, the MAC command generator 570, and the serializer/deserializer 580 may be disposed in the peripheral circuit PERI of the PIM device 400 illustrated in FIG. 27. The receiving driver 530 may receive an external command E_CMD and an input address I_ADDR from an external device. The external device may denote a host or a controller coupled to the PIM device 500. Hereinafter, it may be assumed that the external command E_CMD transmitted to the PIM device 500 is a command requesting the MAC arithmetic operation. That is, the PIM device 500 may perform the deterministic MAC arithmetic operation in response to the external command E_CMD. The data I/O circuit 540 may provide a means through which the PIM device 500 communicates with the external device.

The receiving driver 530 may separately output the external command E_CMD and the input address I_ADDR received from the external device. Data DA input to the PIM device 500 through the data I/O circuit 540 may be processed by the serializer/deserializer 580 and may be transmitted to the first memory bank (BK0) 511 and the global buffer 595 through the GIO line 590 of the PIM device 500. The data DA output from the first memory bank (BK0) 511 and the first MAC operator (MAC0) 520 through the GIO line 590 may be processed by the serializer/deserializer 580 and may be output to the external device through the data I/O circuit 540. The serializer/deserializer 580 may convert the data DA into parallel data if the data DA are serial data or may convert the data DA into serial data if the data DA are parallel data. For the data conversion, the serializer/ deserializer 580 may include a serializer converting parallel data into serial data and a deserializer converting serial data into parallel data.

The command decoder 550 may decode the external command E_CMD output from the receiving driver 530 to generate and output the internal command signal I_CMD. The internal command signal I_CMD output from the command decoder 550 may be the same as the internal command signal I_CMD described with reference to FIG. 17. That is, the internal command signal I_CMD may include a first internal command signal corresponding to the memory active signal ACT_M, a second internal command signal corresponding to the MAC arithmetic signal MAC, and a third internal command signal corresponding to the result read signal READ_RST. The first to third internal command signals output from the command decoder 550 may be sequentially input to the MAC command generator 570. As described with reference to FIG. 17, the memory active signal ACT_M, the MAC arithmetic signal MAC, and the result read signal READ_RST output from the command decoder 550 may be sequentially generated at predetermined points in time (or clocks) in order to perform the deterministic MAC arithmetic operation of the PIM device 500. Thus, the host or the controller outputting the external command E_CMD may predict the points in time when the first to third internal command signals constituting the internal command signal I_CMD are generated by the command decoder 550 in advance at a point in time when the external command E_CMD is output from the host or the controller. That is, the host or the controller may predict a point in time (or a clock) when the MAC arithmetic operation terminates in the PIM device 500 after the external command E_CMD requesting the MAC arithmetic operation is transmitted from the host or the controller to the PIM device 500, even without receiving any signals from the PIM device 500.

The address latch 560 may convert the input address I_ADDR output from the receiving driver 530 into a row/column address ADDR_R/ADDR_C to output the row/column address ADDR_R/ADDR_C. The row/column address ADDR_R/ADDR_C output from the address latch 560 may be transmitted to the first memory bank (BK0) 511. According to the present embodiment, the first data and the second data to be used for the MAC arithmetic operation may be simultaneously read out of the first memory bank (BK0) 511 and the global buffer 595, respectively. Thus, it may be unnecessary to generate a bank selection signal for selecting the first memory bank 511. A point in time when the row/column address ADDR_R/ADDR_C is input to the first memory bank 511 may be a point in time when a MAC command (i.e., the MAC arithmetic signal MAC) requesting a data read operation for the first memory bank 511 for the MAC arithmetic operation is generated.

The MAC command generator 570 may output the MAC command signal MAC_CMD in response to the internal command signal I_CMD output from the command decoder 550. The MAC command signal MAC_CMD output from the MAC command generator 570 may be the same as the MAC command signal MAC_CMD described with reference to FIG. 17. That is, the MAC command signal MAC_CMD output from the MAC command generator 570 may include the MAC active signal RACTV corresponding to the first MAC command signal, the MAC read signal MAC_RD_BK corresponding to the second MAC command signal, the MAC input latch signal MAC_L1 corresponding to the third MAC command signal, the MAC output latch signal MAC_L3 corresponding to the fourth MAC command signal, and the MAC result latch signal MAC_L_RST corresponding to the fifth MAC command signal.

The MAC active signal RACTV may be generated based on the memory active signal ACT_M output from the command decoder 550. The MAC read signal MAC_RD_BK, the MAC input latch signal MAC_L1, the MAC output latch signal MAC_L3, and the MAC result latch signal MAC_L_RST may be sequentially generated based on the MAC arithmetic signal MAC output from the command decoder 550. That is, the MAC input latch signal MAC_L1 may be generated at a point in time when a certain time elapses from a point in time when the MAC read signal MAC_RD_BK is generated. The MAC output latch signal MAC_L3 may be generated at a point in time when a certain time elapses from a point in time when the MAC input latch signal MAC_L1 is generated. Finally, the MAC result latch signal MAC_L_RST may be generated based on the result read signal READ_RST output from the command decoder 550.

The MAC active signal RACTV output from the MAC command generator 570 may control an activation operation for the first memory bank 511. The MAC read signal MAC_RD_BK output from the MAC command generator 570 may control a data read operation for the first memory bank 511 and the global buffer 595. The MAC input latch signal MAC_L1 output from the MAC command generator 570 may control an input data latch operation of the first MAC operator (MAC0) 520. The MAC output latch signal MAC_L3 output from the MAC command generator 570 may control an output data latch operation of the first MAC operator (MAC0) 520. The MAC result latch signal MAC_L_RST output from the MAC command generator 570 may control an output operation of MAC result data of the first MAC operator (MAC0) 520 and a reset operation of the first MAC operator (MAC0) 520.

As described above, in order to perform the deterministic MAC arithmetic operation of the PIM device 500, the memory active signal ACT_M, the MAC arithmetic signal MAC, and the result read signal READ_RST output from the command decoder 550 may be sequentially generated at predetermined points in time (or clocks), respectively. Thus, the MAC active signal RACTV, the MAC read signal MAC_RD_BK, the MAC input latch signal MAC_L1, the MAC output latch signal MAC_L3, and the MAC result latch signal MAC_L_RST may also be generated and output from the MAC command generator 570 at predetermined points in time after the external command E_CMD is input to the PIM device 500, respectively. That is, a time period from a point in time when the first and second memory banks 511 is activated by the MAC active signal RACTV until a point in time when the first MAC operator (MAC0) 520 is reset by the MAC result latch signal MAC_L_RST may be predetermined.

The MAC command generator 570 of the PIM device 500 according to the present embodiment may have the same configuration as described with reference to FIG. 18. In addition, the input signals and the output signals of the MAC command generator 570 may be input to and output from the MAC command generator 570 at the same points in time as described with reference to FIG. 19. As described with reference to FIGS. 18 and 19, the MAC command generator 570 may sequentially receive the memory active signal ACT_M, the MAC arithmetic signal MAC, and the result read signal READ_RST from the command decoder 550. In addition, the MAC command generator 570 may sequentially generate and output the MAC active signal RACTV, the MAC read signal MAC_RD_BK, the MAC input latch signal MAC_L1, the MAC output latch signal MAC_L3, and the MAC result latch signal MAC_L_RST. The MAC active signal RACTV, the MAC read signal MAC_RD_BK, the MAC input latch signal MAC_L1, the MAC output latch signal MAC_L3, and the MAC result latch signal MAC_L_RST may be output from the MAC command generator 570 in series with certain time intervals.

The MAC command generator 570 may generate and output the MAC active signal RACTV in response to the memory active signal ACT_M output from the command decoder 550. Subsequently, the MAC command generator 570 may generate and output the MAC read signal MAC_RD_BK in response to the MAC arithmetic signal MAC output from the command decoder 550. The MAC command generator 570 may delay the MAC arithmetic signal MAC by a certain time determined by the first delay circuit (372 of FIG. 18) to generate and output the MAC input latch signal MAC_L1. The MAC command generator 570 may delay the MAC input latch signal MAC_L1 by a certain time determined by the second delay circuit (373 of FIG. 18) to generate and output the MAC output latch signal MAC_L3. Subsequently, the MAC command generator 570 may generate and output the MAC result latch signal MAC_L_RST in response to the result read signal READ_RST output from the command decoder 550.

Figure 29:
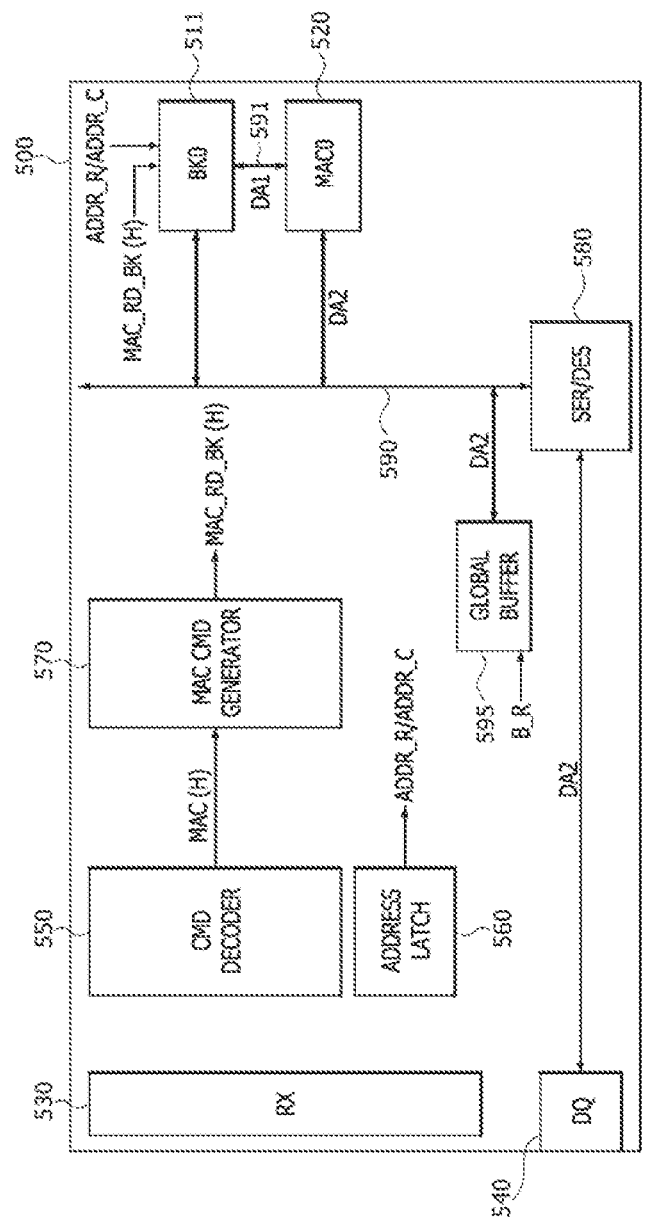
FIG. 29 is a block diagram illustrating an operation of the PIM device illustrated in FIG. 28.

FIG. 29 is a block diagram illustrating an operation of the PIM device 500 illustrated in FIG. 28. In FIG. 29, the same reference numerals or the same reference symbols as used in FIG. 16 denote the same elements. The operation of the PIM device 500 according to the present embodiment may be similar to the operation of the PIM device 300 described with reference to FIG. 16 except a transmission process of the first and second data DA1 and DA2 input to the first MAC operator (MAC0) 520. Thus, the operation of the PIM device 500 executed before the first and second data DA1 and DA2 are transmitted to the first MAC operator (MAC0) 520 may be the same as the operation of the PIM device 300 described with reference to FIG. 21. As illustrated in FIG. 29, when the MAC arithmetic signal MAC having a logic "high(H)" level is transmitted from the command decoder 550 to the MAC command generator 570, the MAC command generator 570 may generate and output the MAC read signal MAC_RD_BK having a logic "high(H)" level. The MAC read signal MAC_RD_BK having a logic "high(H)" level, together with the row/column address ADDR_R/ADDR_C, may be transmitted to the first memory bank (BK0) 511. In such a case, a global buffer read signal B_R may also be transmitted to the global buffer 595. The first data DA1 may be read out of the first memory bank (BK0) 511 by the MAC read signal MAC_RD_BK having a logic "high(H)" level and may be transmitted to the first MAC operator (MAC0) 520 through the BIO line 591. In addition, the second data DA2 may be read out of the global buffer 595 by the global buffer read signal B_R and may be transmitted to the first MAC operator (MAC0) 520 through the GIO line 590. The operation of the PIM device 500 executed after the first and second data DA1 and DA2 are transmitted to the first MAC operator (MAC0) 520 may be the same as the operation of the PIM device 300 described with reference to FIGS. 23 to 25.

Figure 30:
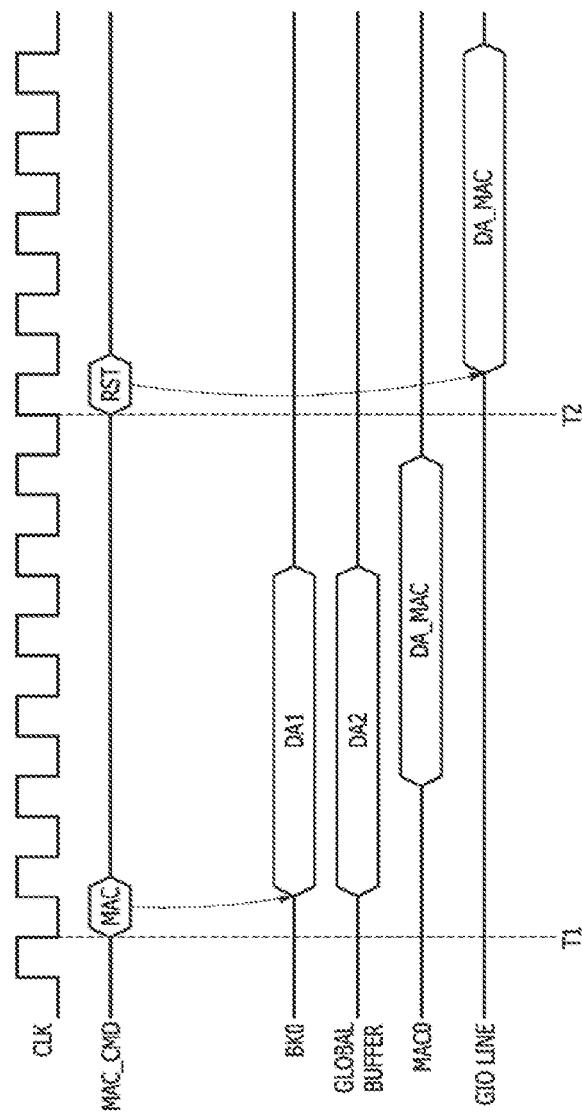
FIG. 30 is a timing diagram illustrating an operation of the PIM device illustrated in FIG. 28.

FIG. 30 is a timing diagram illustrating an operation of the PIM device 500 illustrated in FIG. 28. Referring to FIG. 30, at a first point in time "T1", the MAC command generator 570 may be synchronized with a falling edge of a clock signal CLK to generate and output the MAC read signal MAC_RD_BK (R) having a logic "high(H)" level. The first memory bank (BK0) 511 may be selected by the MAC read signal MAC_RD_BK (R) having a logic "high(H)" level so that the first data DA1 are read out of the first memory bank (BK0) 511. In addition, the second data DA2 may be read out of the global buffer 595. If a certain time elapses from a point in time when the first and second data DA1 and DA2 are read out of the first memory bank (BK0) 511 and the global buffer 595, the first MAC operator (MAC0) 520 may perform the MAC arithmetic operation of the first and second data DA1 and DA2 to generate the MAC result data DA_MAC. At a second point in time "T2", the MAC command generator 570 may be synchronized with a falling edge of the clock signal CLK to generate and output the MAC result latch signal MAC_L_RST (RST). The MAC result data DA_MAC may be transmitted to an external device through the GIO line 590 or to the first memory bank (BK0) 511 through the BIO line 591, by the MAC result latch signal MAC_L_RST (RST).

Figure 31:
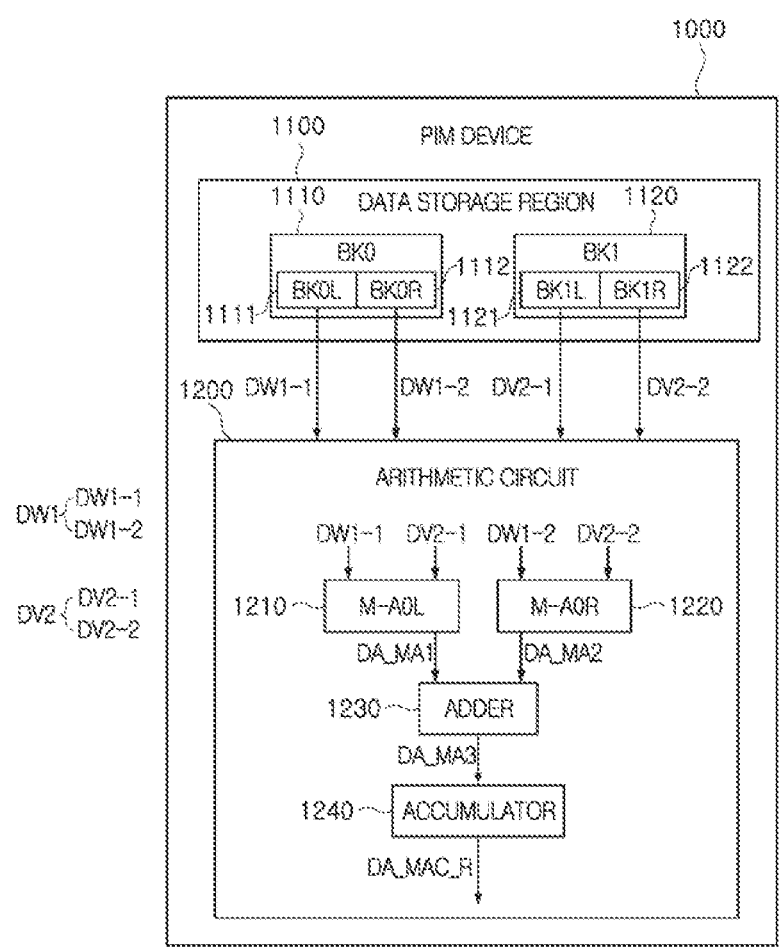
FIG. 31 is a block diagram illustrating a PIM device according to an embodiment of the present disclosure.

FIG. 31 is a block diagram illustrating a PIM device 1000 according to an embodiment of the present disclosure. Referring to FIG. 31, the PIM device 1000 may include a data storage region 1100 and an arithmetic circuit 1200. The data storage region 1100 may store first data DW1 and second data DV2. The first data DW1 and the second data DV2 may be separately stored in the data storage region 1100. The first data DW1 may include a first portion DW1-1 and a second portion DW1-2. The second data DV2 may include a first portion DV2-1 and a second portion DV2-2. The arithmetic circuit 1200 may perform a multiplying-and-accumulating (MAC) operation on the first data DW1 and the second data DV2 transmitted from the data storage region 1100 to output MAC result data. The description of the PIM (10 of FIG. 1) described with reference to FIG. 1 may be equally applied to the PIM device 1000 illustrated in FIG. 31. For example, the PIM device 1000 may operate in a memory mode and a MAC operation mode, like the PIM device (10 of FIG. 1) illustrated in FIG. 1.

The data storage region 1100 may include a first memory bank (BK0) 1110 and a second memory bank (BK1) 1120. The first memory bank (BK0) 1110 may include a first left bank (BK0L) 1111 that stores the first portion DW1-1 of the first data DW1 and a first right bank (BK0R) 1112 that stores the second portion DW1-2 of the first data DW1. The second memory bank (BL1) 1120 may include a second left bank (BK1L) 1121 that stores the first portion DV2-1 of the second data DV2 and a second right bank (BK1R) 1122 that stores the second portion DV2-2 of the second data DV2.

The arithmetic circuit 1200 may receive the first portion DW1-1 of the first data DW1 from the first left bank (BK0L) 1111, and may receive the second portion DW1-2 of the first data DW1 from the first right bank (BK0R) 1112. In addition, the arithmetic circuit 1200 may receive the first portion DV2-1 of the second data DV2 from the second left bank (BK1L) 1121, and may receive the second portion DV2-2 of the second data DV2 from the second right bank (BK1R) 1122.

The arithmetic circuit 1200 may include a first multiplication-addition circuit (M-A0L) 1210, a second multiplication-addition circuit (M-A0R) 1220, an adder 1230, and an accumulator 1240. The first multiplication-addition circuit (MA0L) 1210 may output first multiplication-addition data DA_MA1 generated by performing first multiplication-addition calculation on the first portion DW1-1 of the first data DW1 and the first portion DV2-1 of the second data DV2. The second multiplication-addition circuit (MA0R) 1220 may output second multiplication-addition data DA_MA2 generated by performing second multiplication-addition calculation on the second portion DW1-2 of the first data DW1 and the second portion DV2-2 of the second data DV2. In an embodiment, the above-described first multiplication-addition calculation and second multiplication-addition calculation may be simultaneously performed. The words "simultaneous" and "simultaneously" as used herein with respect to occurrences mean that the occurrences take place on overlapping intervals of time. For example, if a first occurrence takes place over a first interval of time and a second occurrence takes place simultaneously over a second interval of time, then the first and second intervals at least partially overlap each other such that there exists a time at which the first and second occurrences are both taking place.

The adder 1230 may receive the first multiplication-addition data DA_MA1 from the first multiplication-addition circuit (M-A0L) 1210 and the second multiplication-addition data DA_MA2 from the second multiplication-addition circuit (M-A0R) 1220. The adder 1230 may output third multiplication-addition data DA_MA3 generated by adding the first multiplication-addition data DA_MA1 and the second multiplication-addition data DA_MA2. The accumulator 1240 may receive the third multiplication-addition data DA_MA3 from the adder 1230. The accumulator 1240 may output MAC result data DA_MAC_R generated by accumulating the third multiplication-addition data DA_MA3 transmitted from the adder 1230.

Figure 32:
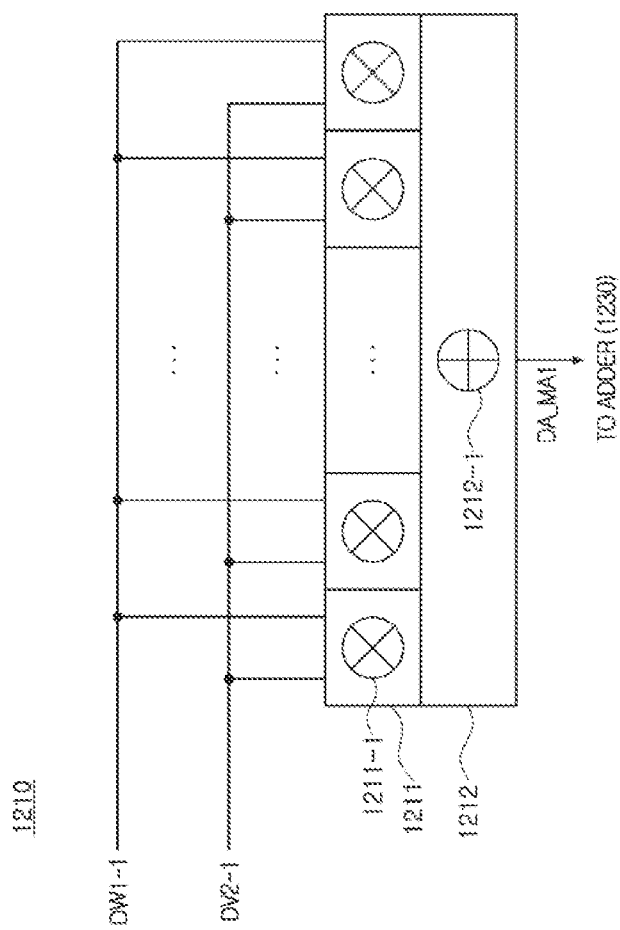
FIGS. 32, 33, and 34 illustrate an example of a detailed configuration of sub-elements of an arithmetic circuit illustrated in FIG. 31.
Figure 33:
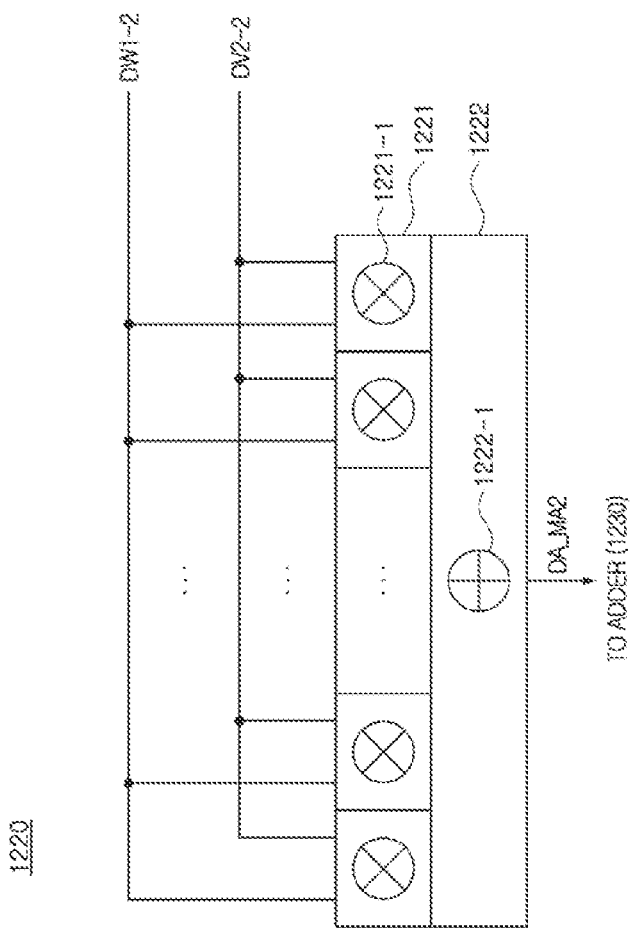
Figure 34:
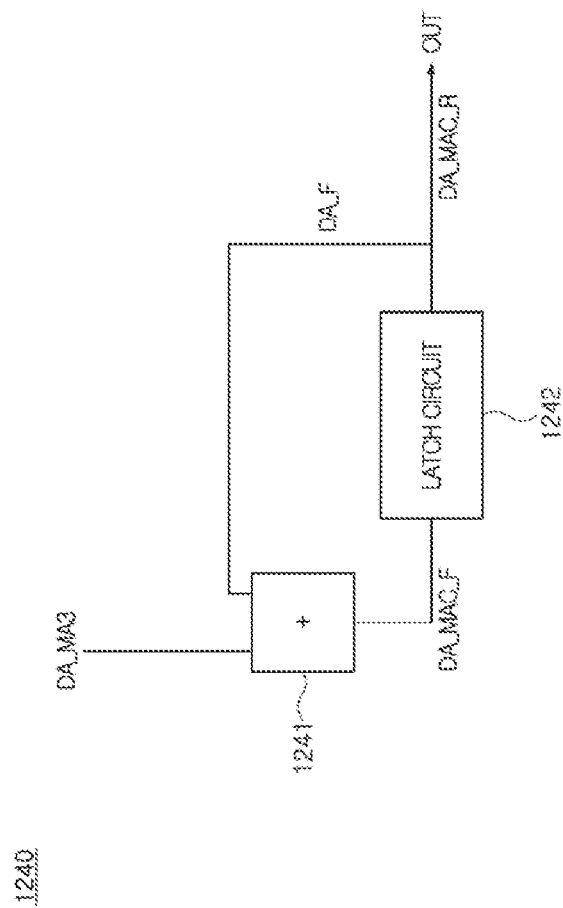

FIGS. 32 to 34 illustrate an example of detailed configurations of sub-elements of the arithmetic circuit 1200 illustrated in FIG. 31. For example, FIG. 32 illustrates an example of a detailed configuration of the first multiplication-addition circuit (M-A0L) 1210. FIG. 33 illustrates an example of a detailed configuration of the second multiplication-addition circuit (M-A0R) 1220. FIG. 34 illustrates an example of a detailed configuration of the accumulator 1240.

Referring to FIG. 32, the first multiplication-addition circuit M-A0L 1210 may include a first multiplication logic circuit 1211 and a first addition logic circuit 1212. The first multiplication logic circuit 1211 may include a plurality of first multipliers 1211-1. Each of the first multipliers 1211-1 may perform multiplication calculation on the input first portion DW1-1 of the first data DW1 and the first portion DV2-1 of the second data DV2, and output multiplication result data. The first addition logic circuit 1212 may include a plurality of first adders 1212-1. The first adders 1212-1 may perform addition calculation on the data output from the first multipliers 1211-1. Although not illustrated in FIG. 32, the plurality of first adders 1212-1 may be disposed in a tree structure having a plurality of stages. Each of the first adders 1212-1 of a first stage may receive multiplication result data from the two first multipliers 1211-1 among the first multipliers 1211-1 of the first multiplication logic circuit 1211, perform addition calculation, and output addition result data. Each of the first adders 1212-1 of a second stage may receive addition result data from the two first adders 1212-1 among the first adders 1212-1 of the first stage, perform addition calculation, and output addition result data. The first adders 1212-1 of a last stage may receive addition result data from the two first adders 1212-1 of the previous stage, perform addition calculation, and output addition result data.

Referring to FIG. 33, the second multiplication-addition circuit M-A0R 1220 may include a second multiplication logic circuit 1221 and a second addition logic circuit 1222. The second multiplication logic circuit 1221 may include a plurality of second multipliers 1221-1. Each of the second multipliers 1221-1 may perform multiplication calculation on the input second portion DW1-2 of the first data DW1 and the second portion DV2-2 of the second data DV2, and output multiplication result data. The second addition logic circuit 1222 may include a plurality of second adders 1222-1. The second adders 1222-1 may perform addition calculation on the data output from the second multipliers 1221-1. Although not illustrated in FIG. 33, the plurality of second adders 1222-1 may be disposed in a tree structure having a plurality of stages. Each of the second adders 1222-1 of a first stage may receive multiplication result data from the two second multipliers 1221-1 among the second multipliers 1221-1 of the second multiplication logic circuit 1221, perform addition calculation, and output addition result data. Each of the second adders 1222-1 of a second stage may receive addition result data from the two second adders 1222-1 among the second adders 1222-1 of the first stage, perform addition calculation, and output addition result data. The second adders 1222-1 of a last stage may receive addition result data from the two second adders 1222-1 of the previous stage, perform addition calculation, and output addition result data.

Referring to FIG. 34, the accumulator 1240 may include an accumulating adder 1241 and a latch circuit 1242. The accumulating adder 1241 may add feedback data DA_F to the third multiplication-addition data DA_MA3 transmitted from the adder 1230 of FIG. 31 to output MAC result data DA_MAC_F in which the feedback data DA_F has been added. The latch circuit 1242 may receive and latch the MAC result data DA_MAC_F transmitted from the accumulating adder 1241, in which the feedback data DA_F has been added. Thereafter, the latch circuit 1242 may transmit the MAC result data DA_MAC_F, in which the feedback data DA_F has been added, to the accumulating adder 1241 as the feedback data DA_F. When all calculations on the first data DW1 and the second data DV2 are finished, the final MAC result data DA_MAC_R of the first data DW1 and the second data DV2 may be output from the latch circuit 1242 to the outside OUT.

In an embodiment, the MAC calculation operation of the arithmetic circuit 1200 may be repeated a plurality of times. For example, when a data amount of the first data DW1 and the second data DV2 is greater than a data amount that the arithmetic circuit 1200 can calculate at one time, the MAC calculation operation may be repeatedly performed until calculations on all of the first data DW1 and the second data DV2 are finished. That is, the first multiplication-addition circuit (M_A0L) 1210 may sequentially output the first multiplication-addition data DA_MA1 multiple times. The second multiplication-addition circuit (M-A0R) 1220 may sequentially output the second multiplication-addition data DA_MA2 multiple times. The adder 1230 may sequentially output the third multiplication-addition data DA_MA3 multiple times. In the present embodiment, the accumulating adder 1241 may add the feedback data DA_F to the third multiplication-addition data DA_MA3 sequentially transmitted from the adder 1230 to output MAC result data DA_MAC_F, in which the feedback data DA_F has been added. The latch circuit 1242 may transmit the MAC result data DA_MAC_F, in which the feedback data DA_F has been added, to the accumulating adder 1241 again as feedback data DA_F. Through such processes, the third multiplication-addition data DA_MA3 output from the adder 1230 may be accumulated. The above-described processes are repeated until the calculations on all the first data DW1 and second data DV2 are finished.

Figure 35:
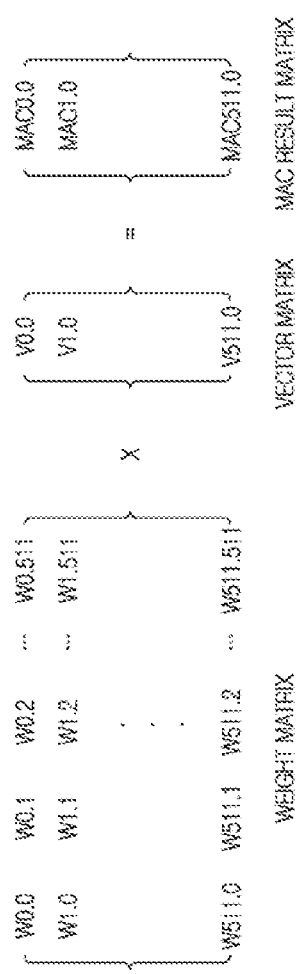
FIG. 35 illustrates an example of an MAC operation performed in a PIM device illustrated in FIG. 31.

FIG. 35 illustrates an example of an MAC calculation operation performed in the PIM device 1000 illustrated in FIG. 31. Referring to FIG. 35, the MAC calculation performed by the PIM device 1000 may be performed through a matrix calculation operation. The PIM device 1000 may perform matrix multiplication calculations on a weight matrix WEIGHT MATRIX of M+1 rows and N+1 columns ((M+1)×(N+1)) (M, N are natural numbers) and a vector matrix VECTOR MATRIX of N+1 rows and 1 column ((N+1)×1) under control of an external controller. A MAC result matrix of N+1 rows and 1 column ((N+1)×1) may be generated according to the matrix multiplication calculations on the weight matrix and the vector matrix. For example, the weight matrix may be configured as a 512×512 matrix, and the vector matrix may be configured as a 512×1 matrix. In this case, the weight matrix may be composed of 512×512 elements W0.0, . . . , and W511.511. The vector matrix may be composed of 512 elements X0.0, . . . , and X511.0. The MAC result matrix may be composed of 512 elements MAC0.0, . . . , and MAC511.0. Each of the elements constituting the weight matrix and each of the elements constituting the vector matrix may be configured as a binary stream having a plurality of bit values.

The multiplication calculation of the weight matrix and the vector matrix may conform to a neural network structure of a multi-layer perceptron (MLP) method. In general, an MLP-type neural network for performing deep learning may include an input layer, a plurality of, for example, at least three or more hidden layers, and an output layer. The multiplication calculation of the weight matrix and the vector matrix illustrated in FIG. 32, that is, the MAC operation may correspond to calculation in one of the hidden layers. In the case of a first hidden layer, the MAC operation may be performed using the input second data DV2. However, the MAC operation in each of the hidden layers from a second hidden layer to a last hidden layer may be performed by using an operation result in the previous hidden layer as the second data DV2.

Figure 36:
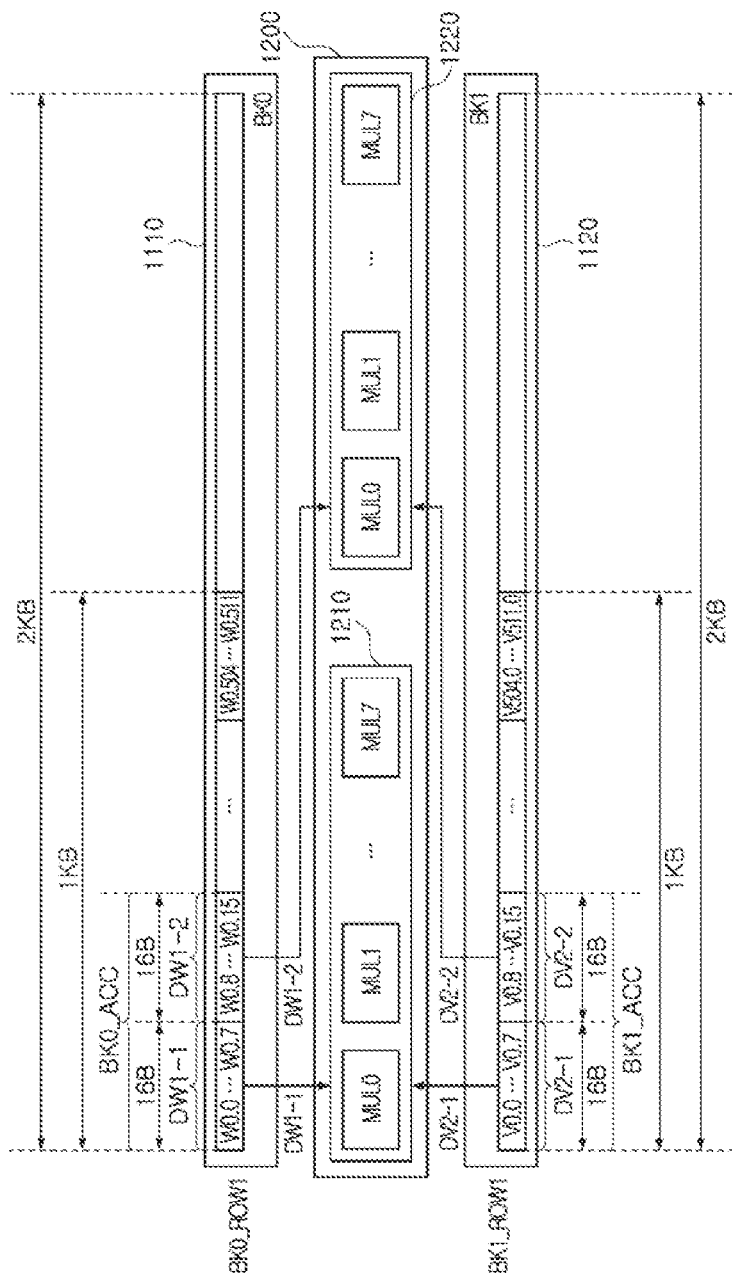
FIG. 36 illustrates a method of accessing data in the PIM device illustrated in FIG. 31.

FIG. 36 illustrates an example of a method of accessing data in the PIM device 1000 illustrated in FIG. 31. Referring to FIG. 36, in this example, the first data DW1 may be composed of elements W0.0, . . . , W0.511 in the first row of the 512×512 weight matrix illustrated in FIG. 35. The second data DV2 may be composed of elements V0.0, . . . , and V511.0 of the 512×1 vector matrix illustrated in FIG. 35. In this example, it is assumed that each of the elements W0.0, . . . , and W0.511 of the first row of the weight matrix and each of the elements V0.0, . . . , and V511.0 of the vector matrix have a size of 2 bytes. Accordingly, the first data DW1 and the second data DV2 may each have a size of 1 Kbytes 1 KB.

In this embodiment, it is exemplified that the first data DW1 is stored in a first row BK0_ROW1 of the first memory bank (BK0) 1110 having a storage capacity of 2 Kbytes 2 KB. In addition, in this embodiment, the first left bank (BK0L) 1111 and the first right bank (BK0R) 1112 each transmit data to the arithmetic circuit 1200 by 16 bytes 16B in order to perform a single MAC operation. In this case, the first left bank (BK0L) 1111 may transmit the first portion DW1-1 of the first data DW1 corresponding to the elements W0.0, . . . , and W0.7 of the first to eighth columns of the first row of the weight matrix to the first multiplication-addition circuit 1210 of the arithmetic circuit 1200. The first right bank (BK0R) 1112 may transmit the second portion DW1-2 of the first data DW1 corresponding to the elements W0.8, . . . , and W0.15 of the ninth to sixteenth columns of the first row of the weight matrix to the second multiplication-addition circuit 1220 of the arithmetic circuit 1200. This process may be repeatedly performed a plurality of times until all of the MAC operations for the entire first data DW1 corresponding to the elements W0.0, . . . , and W0.511 of the first row of the weight matrix are finished.

Similar to the first data DW1, it is exemplified that the second data DV2 is also stored in the first row BK1_ROW1 of the second memory bank (BK1) 1120 having a storage capacity of 2 Kbytes in this example. In addition, in this example, it is exemplified that the second left bank (BK1L) 1121 and the second right bank (BK1R) 1122 each transmit data by 16 bytes 16B to the arithmetic circuit 1200. In this case, the second left bank (BK1L) 1121 may transmit the first portion DV2-1 of the second data DV2 corresponding to the elements V0.0, . . . , and V7.0 of the first to eighth columns of the vector matrix to the first multiplication-addition circuit 1210 of the arithmetic circuit 1200. The second right bank (BK1R) 1122 may transmit the second portion DV2-2 of the second data DV2 corresponding to the elements V8.0, . . . , and V15.0 of the ninth to sixteenth columns of the vector matrix to the second multiplication-addition circuit 1220 of the arithmetic circuit 1200. This process may be repeatedly performed a plurality of times until all of the MAC operations for the entire second data DV2 corresponding to the elements W0.0, . . . , and W511.0 of the vector matrix are finished.

The multipliers included in the first and second multiplication-addition circuits 1210 and 1220 may each perform multiplication-addition operation on the input data. Each of the multipliers included in the first and second multiplication-addition circuits 1210 and 1220 may receive the first data DW1 and the second data DV2 of 16 Bytes 16B. For example, when each of the first and second multiplication-addition circuits 1210 and 1220 includes eight multipliers MUL0, . . . , and MUL7, each of the first and second multiplication-addition circuits 1210 and 1220 may perform multiplication-addition operations of 256 Bytes at one time.

Figure 37:
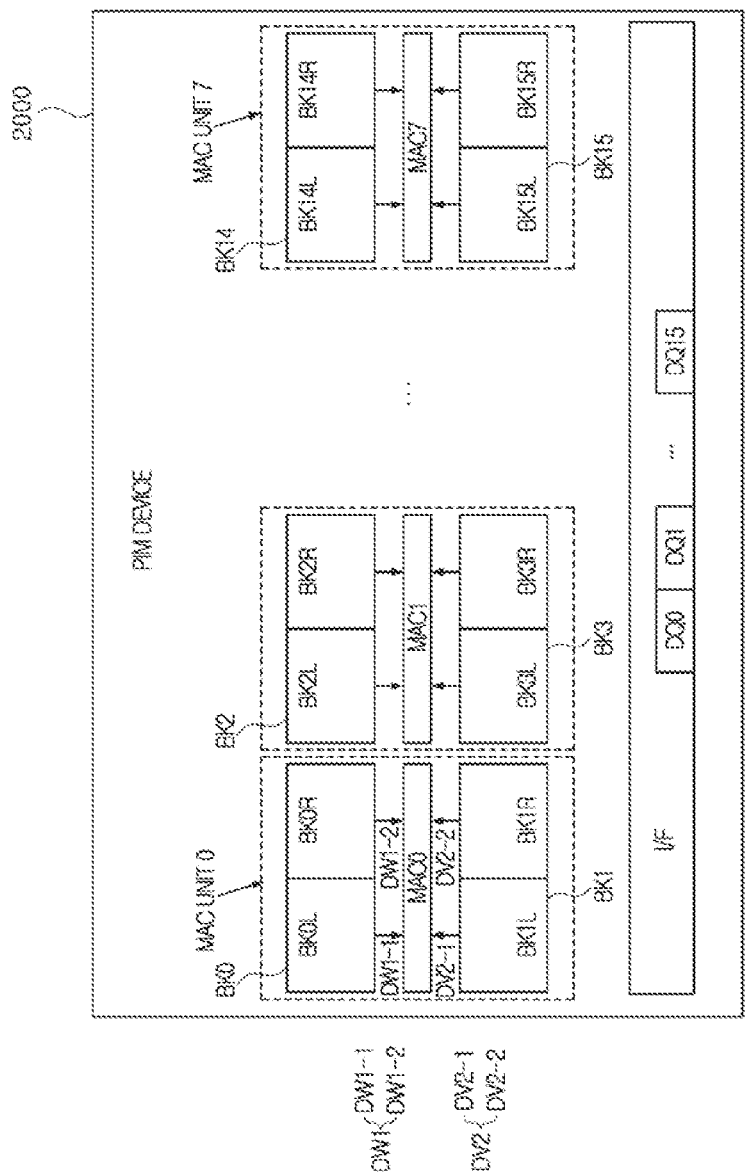
FIG. 37 illustrates a disposal structure of memory banks and operation circuits in a PIM device according to another embodiment of the present disclosure.

FIG. 37 illustrates a disposal structure of memory banks and arithmetic circuits in a PIM device 2000 according to another embodiment of the present disclosure. Referring to FIG. 37, the PIM device 2000 may include a plurality of storage regions, a plurality of MC operators MAC0, . . . , and MAC7, and an interface I/F. The plurality of storage regions may include storage regions of a first group providing first data DW1 and storage regions of a second group providing second data DV2. Each of the plurality of MAC operators MAC0, . . . , and MAC7 may perform MAC operations on the first data DW1 and the second data DV2 provided from the storage regions.

The storage regions of the first group and second group may be composed of a plurality of memory banks BK0, . . . , and BK15. For example, the storage regions of the first group may be composed of even-numbered memory banks BK0, BK2, . . . , and BK14, and the storage regions of the second group may be composed of odd-numbered memory banks BK1, BK3, . . . , and BK15. Although, in FIG. 37, the PIM device 2000 includes 16 memory banks BK0, . . . , and BK15, this is only an example and the number of the memory banks may be variously set.

A first storage region, which is one of the storage regions of the first group, a second storage region, which is one of the storage regions of the second group, and one MAC operator receiving data from the first storage region and the second storage region may constitute one MAC unit. For example, a first memory bank BK0, which is one of the storage regions of the first group, a second memory bank BK1, which is one of the storage regions of the second group, and a first MAC operator MAC0 may constitute a first MAC unit MAC UNIT 0. Similarly, a fifteenth memory bank BK14, a sixteenth memory bank BK15, and an eighth MAC operator MAC7 may constitute an eighth MAC unit MAC UNIT 7. Explanation for the first MAC unit MAC UNIT 0 may be equally applied to other MAC units.

A configuration of the first MAC unit MAC UNIT 0 may be substantially the same as a configuration of the arithmetic circuit (1200 of FIG. 31) described with reference to FIGS. 31 to 34. For example, the first MAC unit MAC UNIT 0 may include components substantially the same as the first multiplication-addition circuit (1210 of FIG. 31), the second multiplication-addition circuit (1220 of FIG. 31), the adder (1230 of FIG. 31), and the accumulator (1240 of FIG. 31) described above with reference to FIGS. 31 to 34. Accordingly, the detailed description for the configuration of the first MAC unit MAC UNIT 0 will be omitted.

The interface I/F may include a plurality of data input and output (input/output) circuits DQ0, . . . , and DQ15 performing data transmission between the outside and the memory banks BK0, . . . , and BK15. Although FIG. 37 illustrates 16 data input/output circuits DQ0, . . . , and DQ15, this is only an example, and the number of the data input/output circuits may be variously set. Each of the data input/output circuits DQ0, . . . , and DQ15 may include an input/output pad. Each of the data input/output circuits DQ0, . . . , and DQ15 may be connected to a data input/output line. The PIM device 2000 may communicate with external devices through the data input/output circuits DQ0, . . . , and DQ15. The data input/output circuits DQ0, . . . , and DQ15 may transmit data transmitted from the outside to the memory banks BK0, . . . , and BK15, or transmit data transmitted from the memory banks BK0, . . . , and BK15 to the outside.

Half of the data input/output circuits DQ0, . . . , and DQ15 may be allocated to the left banks BK0L, . . . , and BK15L of each of the memory banks BK0, . . . , and BK15, and the other half of the data input/output circuits DQ0, . . . , and DQ15 may be allocated to the right banks BK0R, . . . , and BK15R of each of the memory banks BK0, . . . , and BK15. That is, the left banks BK0L, . . . , and BK15L of each of the memory banks BK0, . . . , and BK15 may perform data transmission with the outside through half of the data input/output circuits DQ0, . . . , and DQ15. The right banks BK0R, . . . BK15R of each of the memory banks BK0, . . . , and BK15 may perform data transmission with the outside through the other half of the data input/output circuits DQ0, . . . , and DQ15 except for the data input/output circuits allocated to the left banks BK0L, . . . , and BK15L. In an embodiment, each of the first left bank BK0L and the second left bank BK1L may perform data transmission with the outside through the first to eighth data input/output circuits DQ0, . . . , and DQ7. Each of the first right bank BK0R and the second right bank BK1R may perform data transmission with the outside through the ninth to sixteenth data input/output circuits DQ0, . . . , and DQ15.

Figure 38:
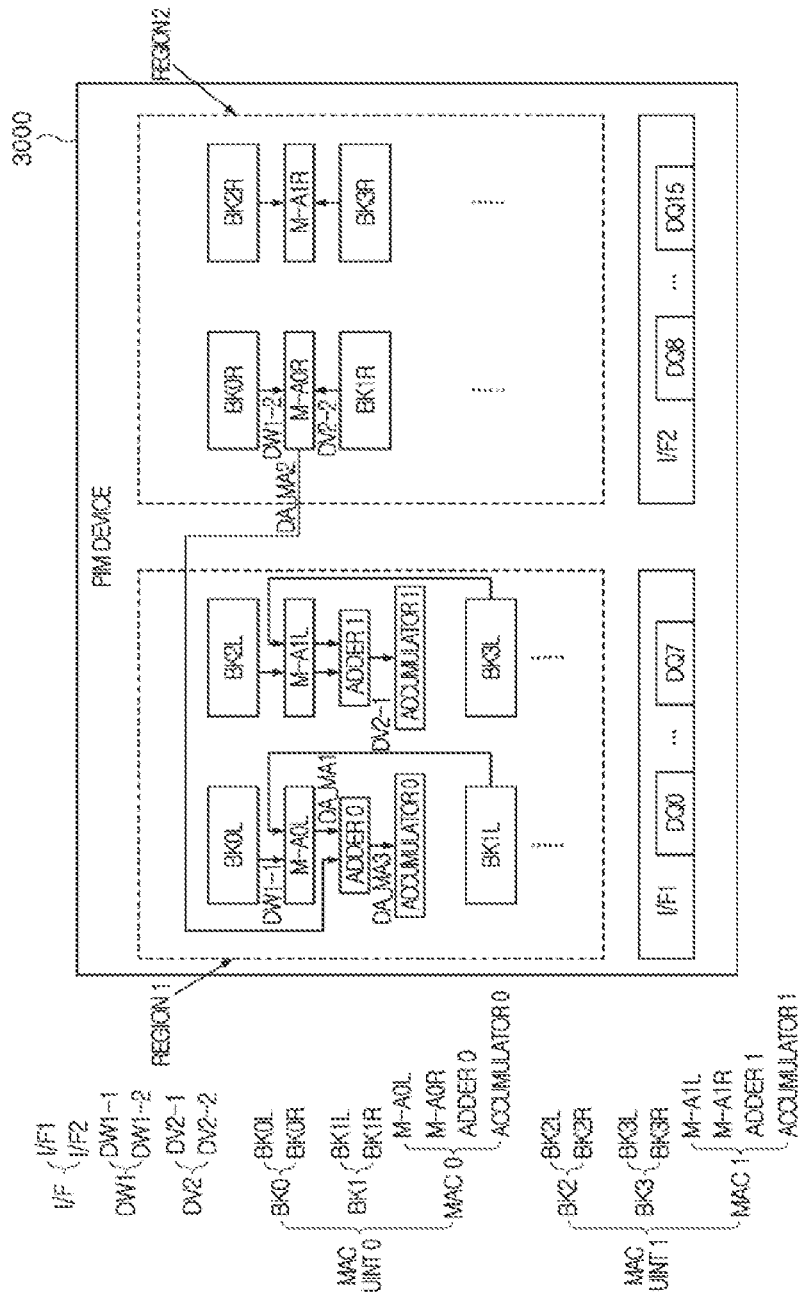
FIG. 38 illustrates an arrangement structure of memory banks and operation circuits in a PIM device according to yet another embodiment of the present disclosure.

FIG. 38 illustrates a disposal structure of memory banks and arithmetic circuits in a PIM device 3000 according to yet another embodiment of the present disclosure. Referring to FIG. 38, the PIM device 3000 may include a plurality of storage regions, a plurality of MAC operators MAC0 and MAC1, and an interface I/F. The storage regions may include a first group of storage regions that store and provide first data DW1, and a second group of storage regions that store and provide second data DV2. Each of the plurality of MAC operators MAC0 and MAC1 may perform MAC operations on the first data DW1 and the second data DV2 provided from the storage regions. The storage regions of the first group and second group may each be composed of a plurality of memory banks BK0, . . . , and BK3. The number of the memory banks may be variously set. In an embodiment, the storage regions of the first group may be composed of even-numbered memory banks BK0 and BK2, and the storage regions of the second group may be composed of odd-numbered memory banks BK1 and BK3.

A first storage region, which is one of the storage regions of the first group, a second storage region, which is one of the storage regions of the second group, and one MAC operator receiving data from the first storage region and the second storage region may constitute one MAC unit. For example, a first memory bank BK0 that is one of the storage regions of the first group, a second memory bank BK1 that is one of the storage regions of the second group, and a first MAC operator MAC0 may constitute a first MAC unit MAC UNIT 0. Similarly, a third memory bank BK2, a fourth memory bank BK3, and a second MAC operator MAC1 may constitute a second MAC unit MAC UNIT 1. The explanation for the first MAC unit MAC UNIT 0 may be equally applied to other MAC units. A detailed configuration of the first MAC unit MAC UNIT 0 will be described below with reference to FIG. 39.

The interfaces I/F may include a first interface I/F1 allocated to a first region REGION 1 and a second interface I//F2 allocated to a second region REGION 2. The first interface I/F1 may include a plurality of data input/output circuits DQ0, . . . , and DQ7 performing data transmission between the outside and the left banks BK0L, . . . , and BK3L of each of the memory banks BK0, . . . , and BK3. The second interface I/F2 may include a plurality of data input/output circuits DQ8, . . . , and DQ15 performing data transmission between the outside and the right banks BK0R, . . . , and BK3R of each of the memory banks BK0, . . . , and BK3. Previously, the descriptions of the data input/output circuits (DQ0, . . . , and DQ15 of FIG. 37) described with reference to FIG. 37 may be equally applied to the data input/output circuits DQ0, . . . , and DQ15 illustrated in FIG. 38.

In the PIM device 3000, a region may be divided into two portions in consideration of placement intervals, sizes, and data transmission efficiency of the memory banks BK0, . . . , and BK3 and the data input/output circuits DQ1, . . . , and DQ15. That is, the left banks BK0L, . . . , and BK3L of the memory banks BK0, . . . , and BK3 may be disposed in the first region REGION 1, and the right banks BK0R, . . . , and BK3R of the memory banks BK0, . . . , BK3 may be disposed in the second region REGION 2. The data input/output circuits DQ0, . . . , and DQ7 allocated to the left banks BK0L, . . . , and BK3L may be disposed adjacent to the first region REGION 1, and the data input/output circuits DQ8, . . . , and DQ15 allocated to the right banks BK0R, . . . , and BK3R may be disposed adjacent to the second region REGION 2.

Figure 39:
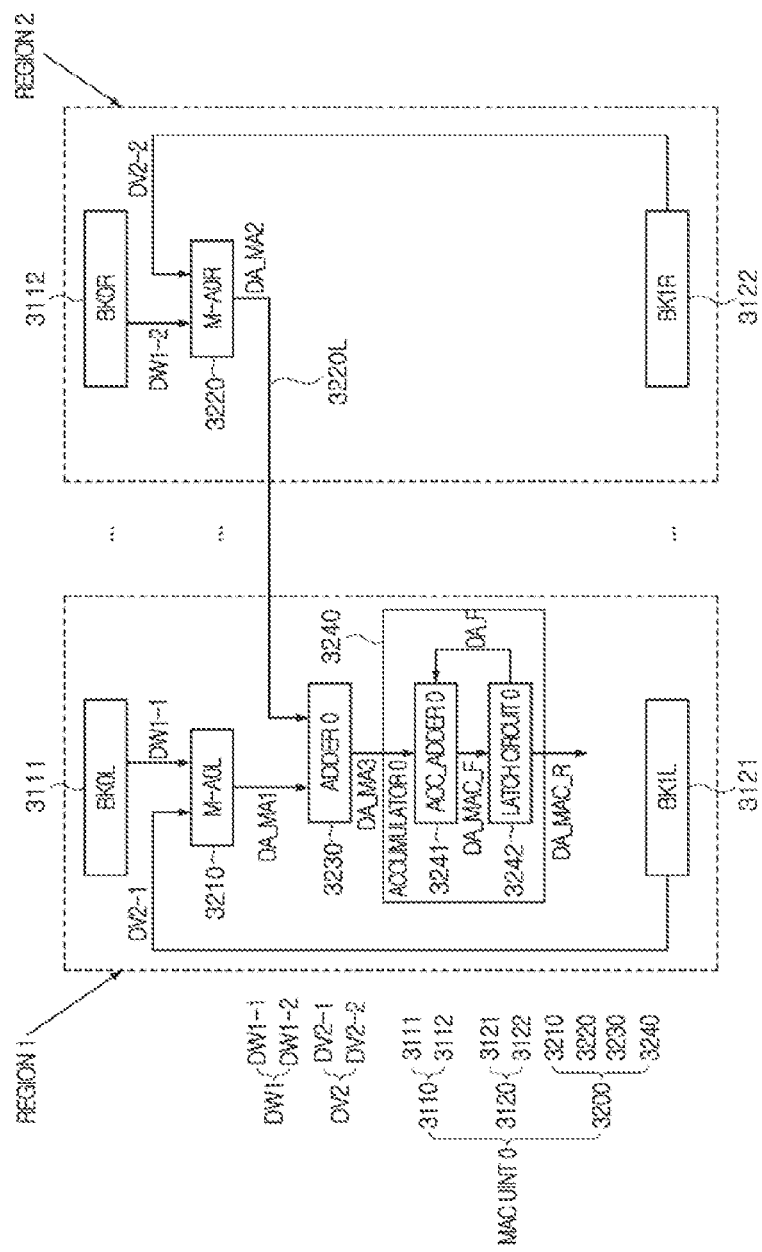
FIG. 39 illustrates an example of a configuration of a MAC unit included in the PIM device shown in FIG. 38.

FIG. 39 illustrates an example of a configuration of the first MAC unit MAC UNIT 0 included in the PIM device 3000 of FIG. 38. Referring to FIG. 39, the first MAC unit MAC UNIT 0 may include a first memory bank 3110, a second memory bank 3120, and a first MAC operator 3200. The first memory bank 3110 may include a first left bank (BK0L) 3111 that stores a first portion DW1-1 of first data DW1 composed of the first portion DW1-1 and a second portion DW1-2, and a first right bank (BK0R) 3112 that stores a second portion DW1-2 of the first data DW1. The first left bank (BK0L) 3111 may be positioned in the first region REGION 1, and the first right bank (BK0R) 3112 may be positioned in the second region REGION 2. The second memory bank 3120 may include a second left bank (BK1L) 3121 that stores a first portion DV2-1 of second data DV2 composed of the first portion DV2-1 and a second portion DV2-2 of the second data DV2. The second left bank (BK1L) 3121 may be positioned in the first region REGION 1 and the second right bank (BK1R) 3122 may be positioned in the second region REGION 2.

The first MAC operator 3200 may include a first multiplication-addition circuit (M-A0L) 3210, a second multiplication-addition circuit (M-A0R) 3220, an adder 3230, and an accumulator 3240. The first multiplication-addition circuit (M-A0L) 3210 may receive the first portion DW1-1 of the first data DW1 from the first left bank (BK0L) 3111, and may receive the first portion DV2-1 of the second data DV2 from the second left bank (BK1L) 3121. The first multiplication-addition circuit (M-A0L) 3210 may output first multiplication-addition data DA_MA1 generated by performing a first multiplication-addition operation on the first portion DW1-1 of the first data DW1 and the first portion DV2-1 of the second data DV2. The first multiplication-addition circuit (M-A0L) 3210 may be positioned in the first region REGION 1.

The second multiplication-addition circuit (M-A0R) 3220 may receive the second portion DW1-2 of the first data DW1 from the first right bank (BK0R) 3112, and may receive the second portion DV2-2 of the second data DV2 from the second right bank (BK1R) 3122. The second multiplication-addition circuit (M-A0R) 3220 may output second multiplication-addition data DA_MA2 generated by performing a second multiplication-addition operation on the second portion DW1-2 of the first data DW1 and the second portion DV2-1 of the second data DV2. The second multiplication-addition circuit (M-A0R) 3220 may be positioned in the second region REGION 2.

The adder 3230 may receive the first multiplication-addition data DA_MA1 from the first multiplication-addition circuit (M-A0L) 3210 and the second multiplication-addition data DA_MA2 from the second multiplication-addition circuit (M-A0R) 3220. The adder 3230 may output third multiplication-addition data DA_MA3 generated by summing the first multiplication-addition data DA_MA1 and the second multiplication-addition data DA_MA2. The adder 3230 may be positioned in the first region REGION 1.

The PIM device 3000 may further include a data transmission line 3220L configured to connect the adder 3230 positioned in the first region REGION 1 and the second multiplication-addition circuit (M-A0R) 3220 positioned in the second region REGION 2. The second multiplication-addition data DA_MA2 may be transmitted from the second multiplication-addition circuit (M-A0R) 3220 to the adder 3230.

The accumulator 3240 may receive the third multiplication-addition data DA_MA3 from the adder 3230. The accumulator 3240 may output final MAC result data DA_MAC_R generated by accumulating the third multiplication-addition data DA_MAC3 transmitted from the adder 3230. The accumulator 3240 may be positioned in the first region REGION 1. For example, the accumulator 3240 may include an accumulating adder 3241 and a latch circuit 3242. The accumulating adder 3241 may add feedback data DA_F to the third multiplication-addition data DA_MAC3 transmitted from the adder 3230 to output MAC result data DA_MAC_F in which the feedback data DA_F has been added. The latch circuit 3242 may receive and latch the MAC result data DA_MAC_F transmitted from the accumulating adder 3241, in which the feedback data DA_F has been added. The latch circuit 3242 may transmit the MAC result data DA_MAC_F transmitted from the accumulating adder 3241, in which the feedback data DA_F has been added to the accumulating adder 3241 as feedback data DA_F. When all operations on the first data DW1 and the second data DV2 are finished, the final MAC result data DA_MAC_R of the first data DW1 and the second data DV2 may be output from the latch circuit 3242. Like the arithmetic circuit (1200 of FIG. 31) described above with reference to FIGS. 31 to 34, the MAC operation of the first MAC operator 3200 may also be repeated a plurality of times.

Figure 40:
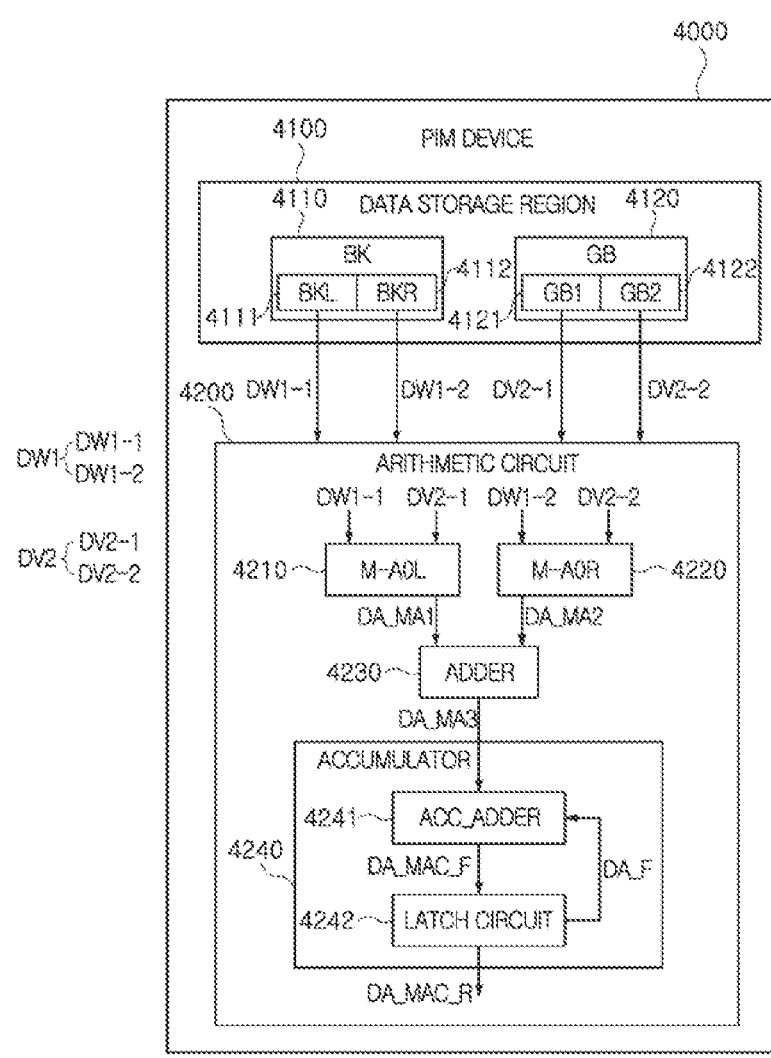
FIG. 40 is a block diagram of a PIM device according to another embodiment of the present disclosure.

FIG. 40 is a block diagram of a PIM device 4000 according to yet another embodiment of the present disclosure. Referring to FIG. 40, the PIM device 4000 may include a data storage region 4100 and an arithmetic circuit 4200. The data storage region 4100 may store first data DW1 and second data DV2. The data storage region 4100 may separately store the first data DW1 and the second data DV2. The first data DW1 may be composed of a first portion DW1-1 and a second portion DW1-2. The second data DV2 may be composed of a first portion DV2-1 and a second portion DV2-2. The arithmetic circuit 4200 may perform a multiplication-and-accumulation (MAC) operation on the first data DW1 and the second data DV2 transmitted from the data storage region 4100 to output MAC operation results. The description of the PIM device (10 of FIG. 1) described with reference to FIG. 1 may be equally applied to the PIM device 4000 illustrated in FIG. 40. For example, the PIM device 4000 may operate in a memory mode and a MAC operation mode, like the PIM device (10 of FIG. 1) illustrated in FIG. 1.

The data storage region 4100 may include a memory bank (BK) 4110 and a global buffer (GB) 4120. The memory bank (BK) 4110 may include a left bank (BKL) 4111 that stores the first portion DW1-1 of the first data DW1 and a right bank (BKR) 4112 that stores the second portion DW1-2 of the first data DW1. The global buffer (GB) 4120 may include a first global bank (GB1) 4121 that stores the first portion DV2-1 of the second data DV2 and a second global bank (GB2) 4122 that stores the second portion DV2-2 of the second data DV2.

The arithmetic circuit 4200 may receive the first portion DW1-1 of the first data DW1 from the left bank (BKL) 4111, and may receive the second portion DW1-2 of the first data DW1 from the right bank (BKR) 4112. In addition, the arithmetic circuit 4200 may receive the first portion DV2-1 of the second data DV2 from the first global buffer (GB1) 4121, and may receive the second portion DV2-2 of the second data DV2 from the second global buffer (GB2) 4122. The arithmetic circuit 4200 may include a first multiplication-addition circuit (M-A0L) 4210, a second multiplication-addition circuit (M-A0R) 4220, an adder 4230, and an accumulator 4240. The first multiplication-addition circuit (M-A0L) 4210, the second multiplication-addition circuit (M-A0R) 4220, the adder 4230, and the accumulator 4240 may have substantially the same configurations as the first multiplication-addition circuit M-A0L (1210 of FIG. 31), the second multiplication-addition circuit M-A0L (1220 of FIG. 31), the adder (1230 of FIG. 31), and the accumulator (1240 of FIG. 31) described above with reference to FIGS. 31 to 34. Therefore, the descriptions of the corresponding components will be omitted.

Figure 41:
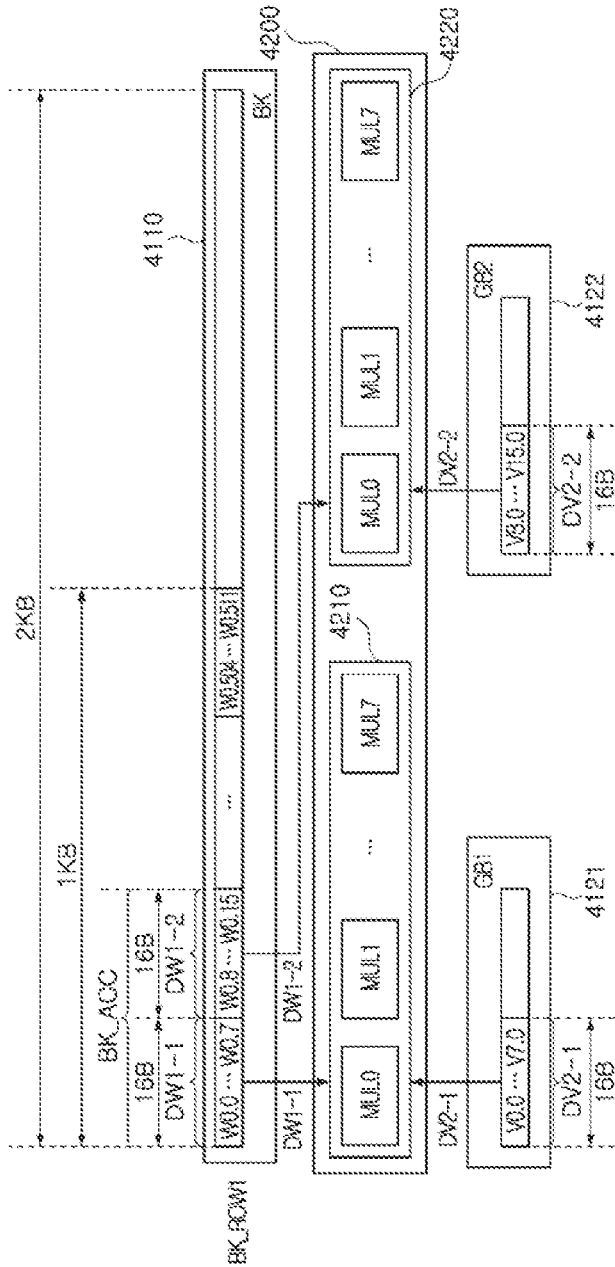
FIG. 41 illustrates a method of accessing data in the PIM device illustrated in FIG. 40.

FIG. 41 illustrates an example of a method of accessing data in the PIM device 4000 illustrated in FIG. 40. Referring to FIG. 41, in this example, the first data DW1 may be composed of the elements W0.0, . . . , and W0.511 of the first row of the 512×512 weight matrix illustrated in FIG. 35. The second data DV2 may be composed of the elements V0.0, . . . , and V511.0 of the 512×1 vector matrix illustrated in FIG. 35. In this embodiment, it is premised that each of the elements W0.0, . . . , and W0.511 of the first row of the weight matrix and each of the elements V0.0, . . . , and V511.0 of the vector matrix have a size of 2 bytes. Accordingly, the first data DW1 and the second data DV2 may each have a size of 1 Kbyte 1 KB.

In this embodiment, it may be exemplified that the first data DW1 is stored, for example, in a first row BK_ROW1 of the memory bank (BK) 4110 having a storage capacity of 2 Kbytes 2 KB. In addition, in this embodiment, it may be exemplified that each of the left bank (BKL) 4111 and the right bank (BKR) 4112 transmits 16 bytes 16B of data to the arithmetic circuit 4200 to perform a single MAC operation. In this case, the left bank (BKL) 4111 may transmit the first portion DW1-1 of the first data DW1 corresponding to the elements W0.0, . . . , and W0.7 of the first to eighth columns of the first row of the weight matrix to the first multiplication-addition circuit 4210 of the arithmetic circuit 4200. The right bank (BKR) 4112 may transmit the second portion DW1-2 of the first data DW1 corresponding to the elements W0.8, . . . , and W0.15 of the ninth to sixteenth columns of the first row of the weight matrix to the second multiplication-addition circuit 4220 of the arithmetic circuit 4200. This process may be repeatedly performed a plurality of times until all of the MAC operations for the entire first data DW1 corresponding to the elements W0.0, . . . , and W0.511 of the first row of the weight matrix are finished.

In this embodiment, it is exemplified that the first global buffer (GB1) 4121 and the second global buffer (GB2) 4122 may each transmit 16 bytes of data to the arithmetic circuit 4200 to perform a single MAC operation. In this case, the first global buffer (GB1) 4121 may transmit the first portion DV2-1 of the second data DV2 corresponding to the elements V0.0, . . . , and V7.0 of the first to eighth columns of the vector matrix to the first multiplication-addition circuit 4210 of the arithmetic circuit 4200. The second global buffer (GB2) 4122 may transmit the second portion DV2-2 of the second data DV2 corresponding to the elements V8.0, . . . , and V15.0 of the ninth to sixteenth columns of the vector matrix to the second multiplication-addition circuit 4220 of the arithmetic circuit 4200. This process may be repeatedly performed a plurality of times until all of the MAC operations for the entire second data DV2 corresponding to the elements W0.0, . . . , and W0.511 of the vector matrix are finished.

The multipliers included in the first and second multiplication-addition circuits 4210 and 4220 may each perform a multiplication-addition operation of the input data. Each of the multipliers included in the first and second multiplication-addition circuits 4210 and 4220 may receive the first data DW1 and the second data DV2 of 16 Bytes 16B. For example, when each of the first and second multiplication-addition circuits 4210 and 4220 includes 8 multipliers MUL0, . . . , and MUL7, the first and second multiplication-addition circuits 4210 and 4220 may perform multiplication-addition operations of 256 Bytes at one time. Although not shown in FIG. 41, the second data DV2 transmitted from the first and second global buffers (GB1) 4210 and (GB2) 4220 may be input to the arithmetic circuit 4200 through separate global input/output lines.

Figure 42:
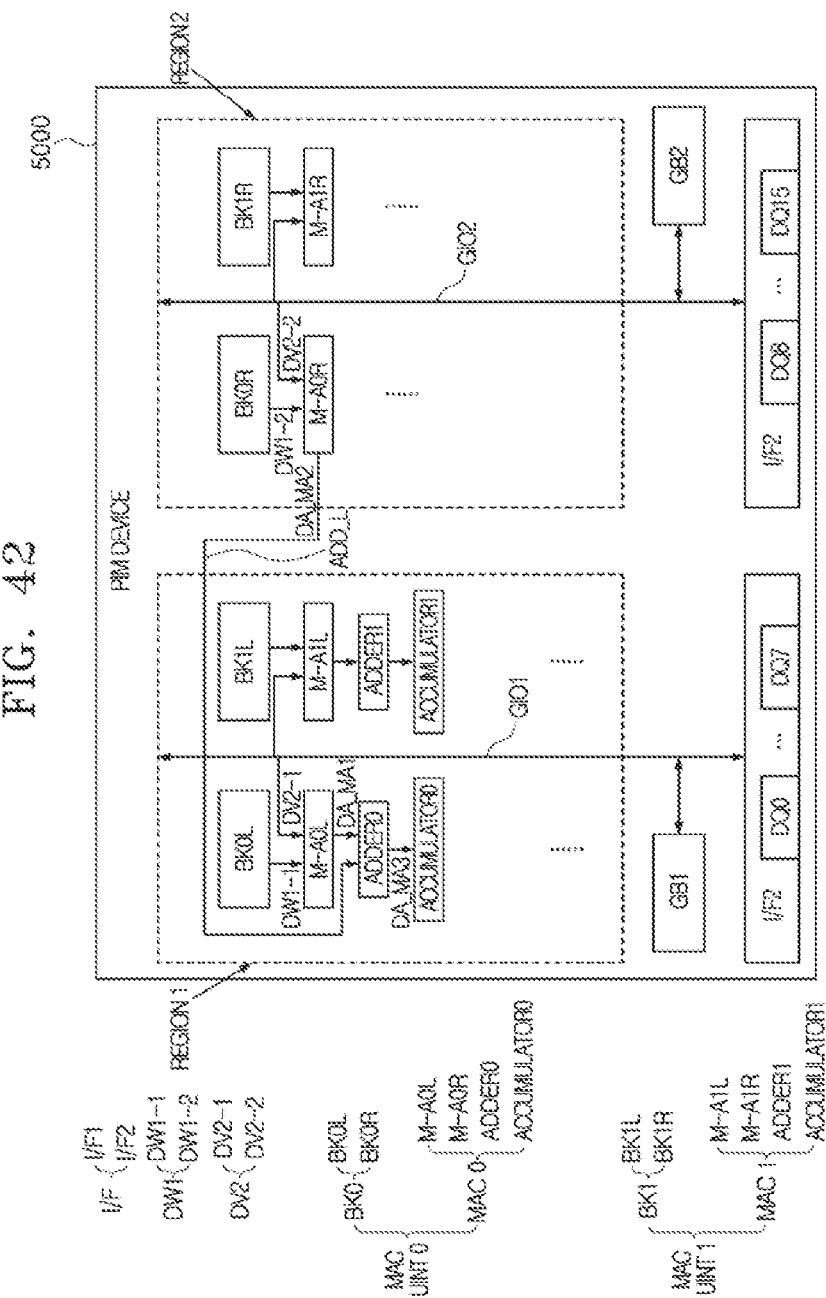
FIG. 42 illustrates an arrangement structure of memory banks and operation circuits in a PIM device according to another embodiment of the present disclosure.

FIG. 42 illustrates a disposal structure of memory banks and arithmetic circuits in a PIM device 5000 according to yet another embodiment of the present disclosure. Referring to FIG. 42, the PIM device 5000 may include a plurality of memory banks BK0 and BK1, a first global buffer GB1, a second global buffer GB2, MAC operators MAC0 and MAC1, a first global input/output line GIO1, a second global input/output line GIO2, and an interface I/F. The number of the memory banks included in the PIM device 5000 may be variously set.

The first memory bank BK0 and the first MAC operator MAC0 may constitute a first MAC unit MAC UNIT 0. Likewise, the second memory bank BK1 and the second MAC operator MAC1 may constitute a second MAC unit MAC UNIT 1. The description of the first MAC unit MAC UNIT 0 may be equally applied to the other MAC unit. The configuration of the first MAC unit MAC UNIT 0 will be described with reference to FIG. 43 below.

The interface I/F may include a first interface I/F1 allocated to a first region REGION 1, and a second interface I/F2 allocated to a second region REGION 2. The first interface I/F1 may include a plurality of data input/output circuits DQ0, . . . , and DQ7 performing data transmission between the outside and left banks BK0L and BK1L of the memory banks BK0 and BK1, respectively. The second interface I/F2 may include a plurality of data input/output circuits DQ8, ~, and DQ15 performing data transmission between the outside and right banks BK0R and BK1R of the memory banks BK0 and BK1, respectively. Previously, the descriptions of the data input/output circuits (DQ0, . . . , and DQ15 in FIG. 37) described with reference to FIG. 37 may be equally applied to the data input/output circuits DQ0, . . . , and DQ15 shown in FIG. 42.

Like the PIM device (3000 of FIG. 38) described with reference to FIG. 38 above, the PIM device 5000 may also include the first region REGION 1 and the second region REGION 2 that are separated within the PIM device 5000. The left banks BK0L and BK1L may be disposed in the first region REGION 1, and the right banks BK0R and BK1R may be disposed in the second region REGION 2. The data input/output circuits DQ0, . . . , and DQ7 allocated in the left banks BK0L and BK1L may be disposed adjacent to the first region REGION 1, and the data input/output circuits DQ8, . . . , and DQ15 allocated in the right banks BK0R and BK1R may be disposed adjacent to the second region REGION 2.

The first global buffer GB1 may transmit data to the first MAC operator MAC0 through the first global input/output line GIO1 allocated in the first region REGION 1. The second global buffer GB2 may transmit data to the second MAC operator MAC1 through the second global input/output line GIO2 allocated in the second region REGION 2. In an embodiment, the first global buffer GB1 may be disposed adjacent to the first region REGION 1, and the second global buffer GB2 may be disposed adjacent to the second region REGION 2.

Figure 43:
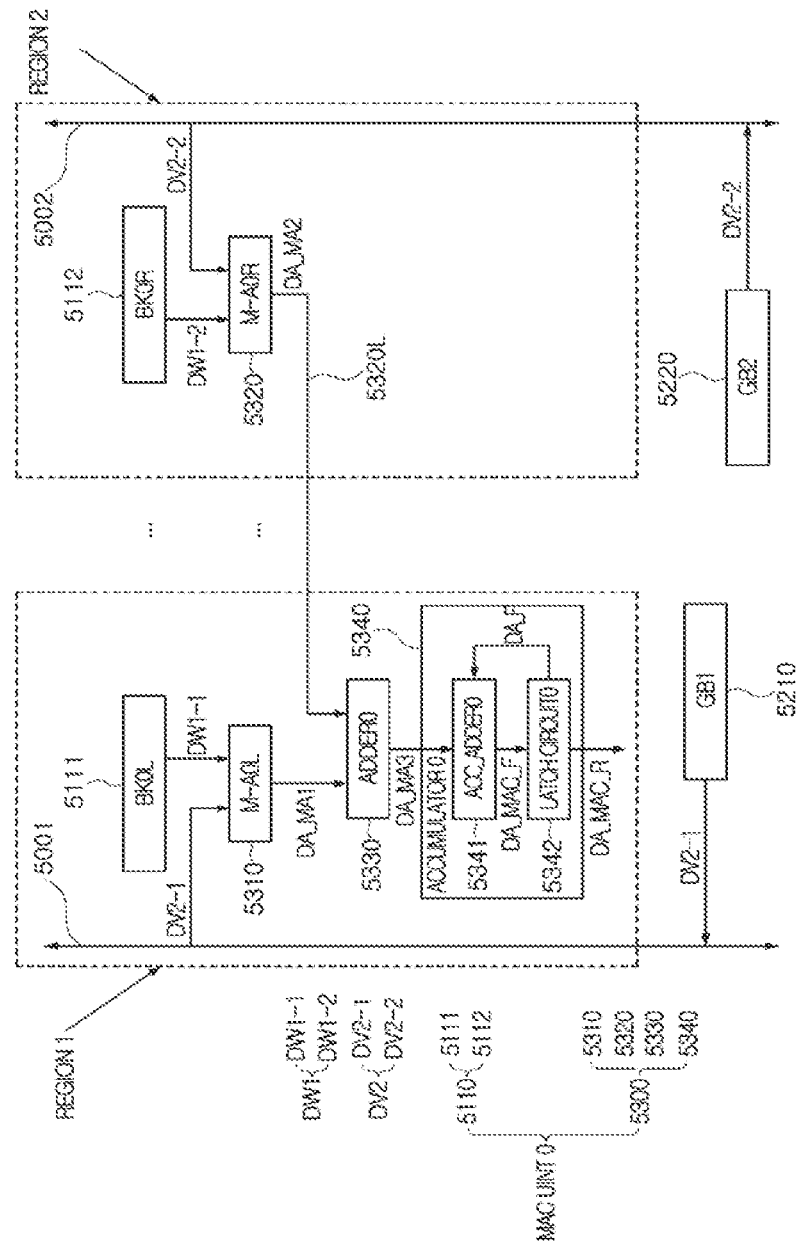
FIG. 43 illustrates an example of a configuration of a MAC unit included in the PIM device illustrated in FIG. 42.

FIG. 43 illustrates an example of a configuration of the first MAC unit MAC UNIT 0 included in the PIM device 5000 illustrated in FIG. 42. Referring to FIG. 43, a first memory bank 5110 may include the left bank (BK0L) 5111 that stores a first portion DW1-1 of first data DW1 composed of the first portion DW1-1 and a second portion DW1-2, and the right bank (BK0R) 5112 that stores the second portion DW1-2 of the first data DW1. A first global buffer 5210 may store a first portion DV2-1 of second data DV2 composed of the first portion DV2-1 and a second portion DV2-2. A second global buffer 5220 may store a second portion DV2-2 of the second data DV2.

A first MAC operator 5300 may include a first multiplication-addition circuit (M-A0L) 5310, a second multiplication-addition circuit (M-A0R) 5320, an adder 5330, and an accumulator 5340. The first multiplication-addition circuit (M-A0L) 5310 may receive the first portion DW1-1 of the first data DW1 from the left bank (BK0L) 5111. In addition, the first multiplication-addition circuit (M-A0L) 5310 may receive the first portion DV2-1 of the second data DV2 from the first global buffer (GB1) 5210 through a first global input/output line 5001. The multiplication-addition circuit (M-A0L) 5310 may output first multiplication-addition data DA_MA1 generated by performing a first multiplication-addition operation on the first portion DW1-1 of the first data DW1 and the first portion DV2-1 of the second data DV2. The first multiplication-addition circuit (M-A0L) 5310 may be positioned in the first region REGION 1.

The second multiplication-addition circuit (M-A0R) 5320 may receive the second portion DW1-2 of the first data DW1 from the right bank 5112. In addition, the second multiplication-addition circuit (M-A0R) 5320 may receive the second portion DV2-2 of the second data DV2 from the second global buffer (GB2) 5220 through a second global input/output line 5002. The second multiplication-addition circuit (M-A0R) 5320 may output second multiplication-addition data DA_MA2 generated by performing a second multiplication-addition operation on the second portion DW1-2 of the first data DW1 and the second portion DV2-2 of the second data DV2. The second multiplication-addition circuit (M-A0R) 5320 may be positioned in the second region REGION 2.

The adder 5330 may receive the first multiplication-addition data DA_MA1 from the first multiplication-addition circuit (M-A0L) 5310 and the second multiplication-addition data DA_MA2 from the second multiplication-addition circuit (M-A0R) 5320. The adder 5330 may output third multiplication-addition data DA_MA3 generated by summing the first multiplication-addition data DA_MA1 and the second multiplication-addition data DA_MA2. The adder 5330 may be positioned in the first region REGION 1.

The PIM device 5000 may further include a data transmission line 5320L configured to connect the adder 5330 positioned in the first region REGION 1 and the second multiplication-addition circuit (M-A0R) 5320 positioned in the second region REGION 2. The second multiplication-addition data DA_MA2 may be transmitted from the second multiplication-addition circuit (M-A0R) 5320 to the adder 5330 through the data transmission line 5320L.

The accumulator 5340 may receive the third multiplication-addition data DA_MA3 from the adder 5330. The accumulator 5340 may output final MAC result data DA_MAC_R generated by accumulating the third multiplication-addition data DA_MA3 transmitted from the adder 5330. The accumulator 5340 may be positioned in the first region REGION 1. The accumulator 5340 may include an accumulating adder 5341 and a latch circuit 5342. The accumulating adder 5341 may add feedback data DA_F to the third multiplication-addition data DA_MA3 transmitted from the adder 5330 to output MAC result data DA_MAC_F in which the feedback data DA_F has been added. The latch circuit 5342 may receive and latch the MAC result data DA_MAC_F transmitted from the accumulating adder 5341, in which the feedback data DA_F has been added. The latch circuit 5342 may transmit the MAC result data DA_MAC_F in which the feedback data DA_F has been added, transmitted from the accumulating adder 5341 to the accumulating adder 5341 as feedback data DA_F. When all operations on the first data DW1 and the second data DV2 are finished, final MAC result data DA_MAC_R of the first data DW1 and the second data DV2 may be output from the latch circuit 5432. Like the operation circuit (1200 in FIG. 31) described above with reference to FIGS. 31 to 34, the MAC operation of the first MAC operator 5300 may also be repeated a plurality of times.

Figure 44:
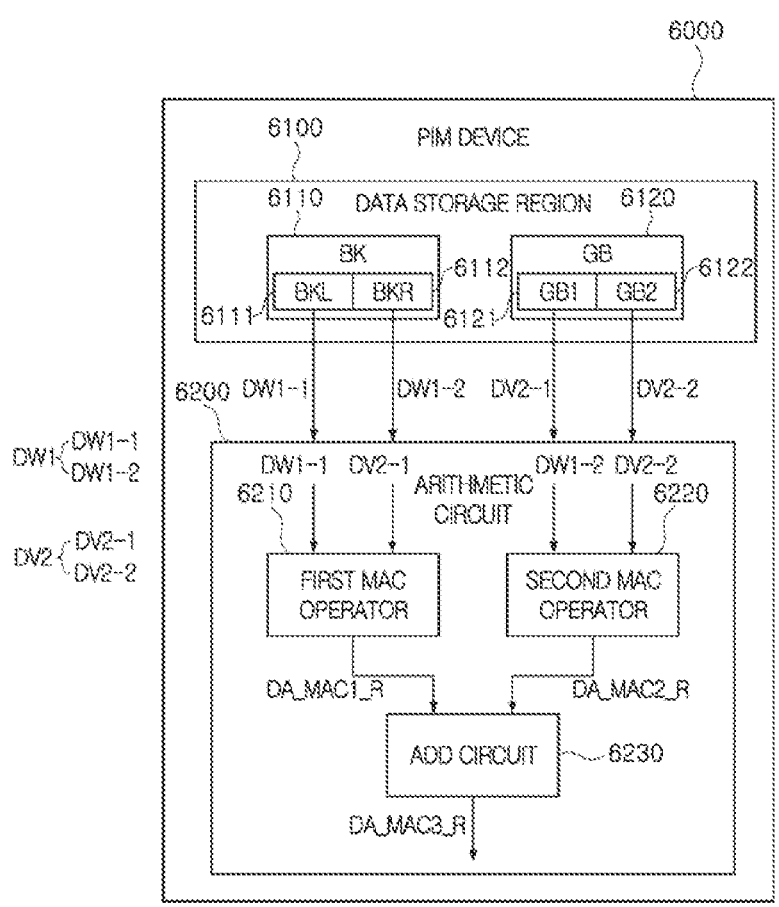
FIG. 44 is a block diagram of a PIM device according to another embodiment of the present disclosure.

FIG. 44 is a block diagram of a PIM device 6000 according to yet another embodiment of the present disclosure. Referring to FIG. 44, the PIM device 6000 may include a data storage region 6100 and an arithmetic circuit 6200. The data storage region 6100 may store first data DW1 and second data DV2. In the data storage region 6100, the first data DW1 and the second data DV2 may be separately stored. The first data DW1 may be composed of a first portion DW1-1 and a second portion DW1-2, and the second data DV2 may be composed of a first portion DV2-1 and a second portion DV2-2. The arithmetic circuit 6200 may perform multiplication-addition operations to the first data DW1 and the second data DV2 transmitted from the data storage region 6100 to output operation results. The description of the PIM device (10 in FIG. 1) described with reference to FIG. 1 may be equally applied to the PIM device 6000 illustrated in FIG. 44. For example, the PIM device 6000 may operate in a memory mode and a MAC operation mode, like the PIM device (10 of FIG. 1) illustrated in FIG. 1.

The data storage region 6100 may include a memory bank (BK) 6110 and a global buffer (GB) 6120. The memory bank (BK) 6110 may include a left bank (BKL) 6111 that stores the first portion DW101 of the first data DW1 and a right bank (BKR) that stores the second portion DW1-2 of the first data DW1. The global buffer (GB) 6120 may include a first global buffer (GB1) 6121 that stores the first portion DV2-1 of the second data DV2 and a second global buffer (GB2) 6122 that stores the second portion DV2-2 of the second data DV2.

The arithmetic circuit 6200 may receive the first portion DW1-1 of the first data DW1 from the left bank (BKL) 6111, and may receive the second portion DW1-2 of the first data DW1 from the right bank (BKR) 6112. The arithmetic circuit 6200 may receive the first portion DV2-1 of the second data DV2 from the first global buffer (GB1) 6121, and may receive the second portion DV2-2 of the second data DV2 from the second global buffer (GB2) 6122.

The arithmetic circuit 6200 may include a first MAC operator 6210, a second MAC operator 6220, and an addition circuit 6230. The first MAC operator 6210 may output first MAC result data DA_MAC1_R generated by performing a first MAC operation on the first portion DW1-1 of the first data DW1 and the first portion DV2-1 of the second data DV2. The second MAC operator 6220 may output second MAC result data DA_MAC2_R generated by performing a second MAC operation on the second portion DW1-2 of the first data DW1 and the second portion DV2-2 of the second data DV2. The addition circuit 6230 may receive the first MAC result data DA_MAC1_R from the first MAC operator 6210, and may receive the second MAC result data DA_MAC2_R from the second MACA operator 6220. The addition circuit 6230 may sum the first MAC result data DA_MAC1_R and the second MAC result data DA_MAC2_R to output third MAC result data DA_MAC3_R, which is a final MAC result data on the first data DW1 and the second data DV2.

Figure 45:
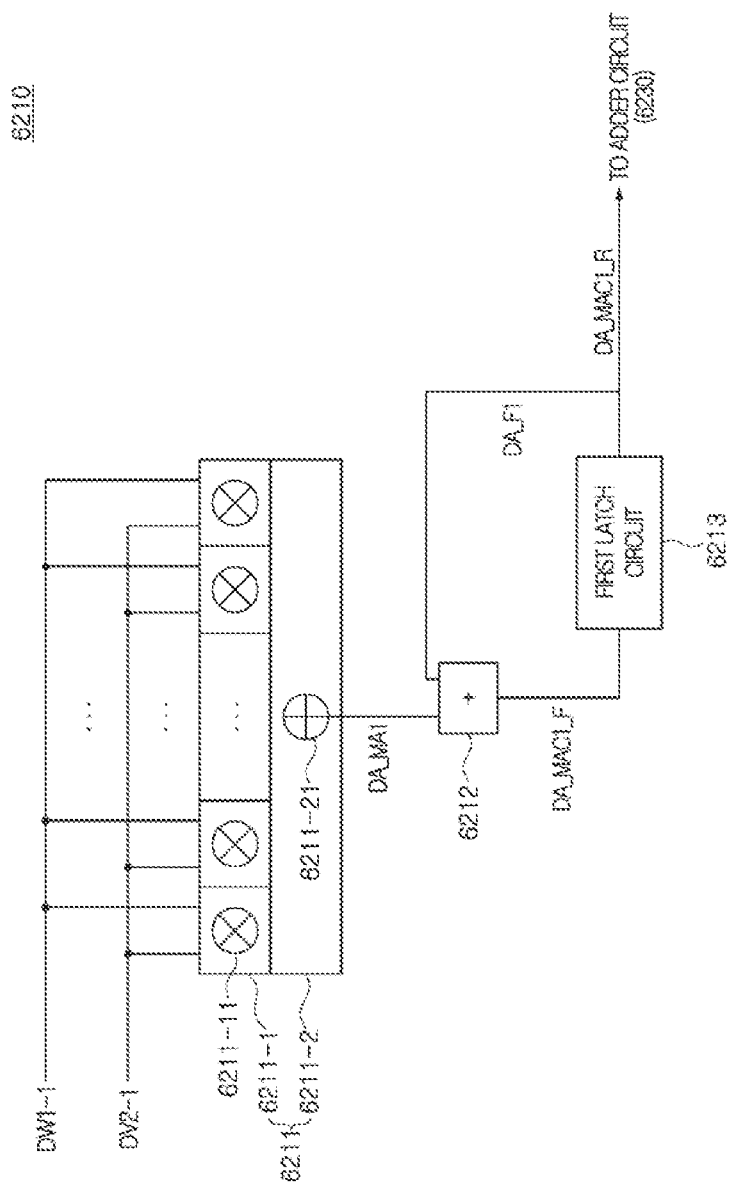
FIGS. 45, 46, and 47 illustrate an example of a detailed configuration of sub-elements of the operation circuit illustrated in FIG. 44.
Figure 46:
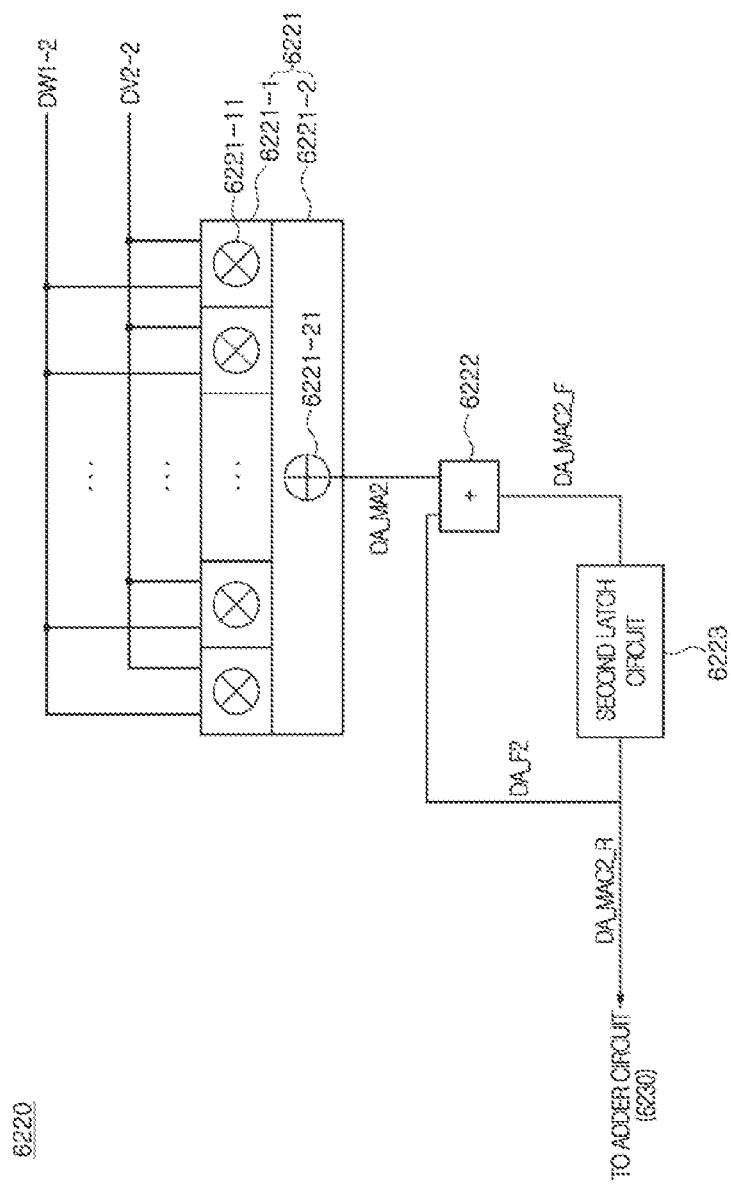
Figure 47:
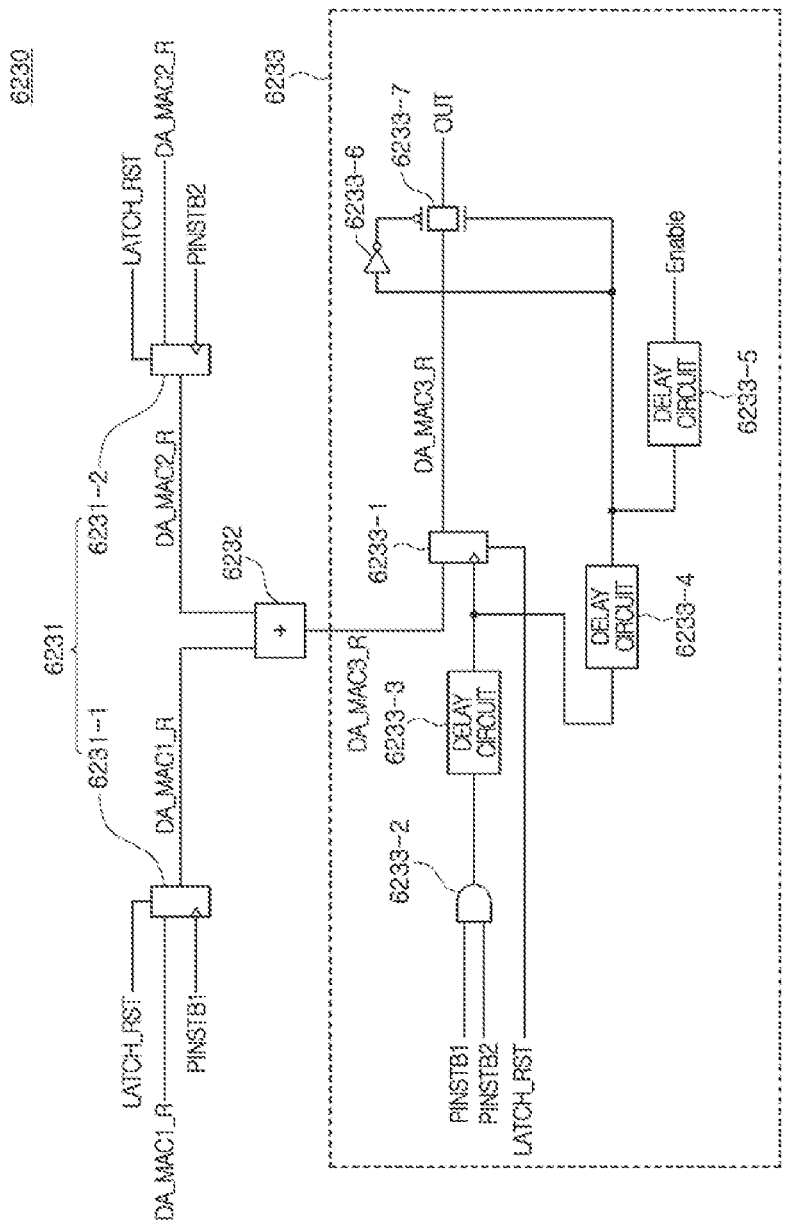

FIGS. 45 to 47 illustrate an example of detailed configurations of sub-elements of the arithmetic circuit 6200 of FIG. 44. For example, FIG. 45 illustrates an example of the detailed configuration of the first MAC operator 6210. FIG. 46 illustrates an example of the detailed configuration of the second MAC operator 6220. FIG. 47 illustrates an example of the detailed configuration of the addition circuit 6230.

Referring to FIG. 45, the first MAC operator 6210 may include a first calculation block 6211, a first accumulating adder 6212, and a first latch circuit 6213. The first calculation block 6211 may include a first multiplication logic circuit 6211-1 including a plurality of first multipliers 6211-11, and a first addition logic circuit 6211-2 including a plurality of first adders 6211-21. Each of the first multiplication logic circuit 6211-1 and the first addition logic circuit 6211-2 of the first calculation block 6211 may be configured substantially the same as the first multiplication logic circuit (1211 of FIG. 35) and the first addition logic circuit (1212 of FIG. 35) of the first multiplication-addition circuit (1210 of FIG. 35) described above with reference to FIG. 35. Accordingly, the description of the corresponding components will be omitted.

The first accumulating adder 6212 may add first feedback data DA_F1 to a first multiplication-addition data DA_MA1 transmitted from the first calculation block 6211 to output first MAC result data DA_MAC1_F. The first latch circuit 6213 may receive and latch the first MAC result data DA_MAC1_F transmitted from the first accumulating adder 6212, in which the first feedback data DA_F has been added. Thereafter, the first latch circuit 6213 may transmit the first MAC result data DA_MAC1_F transmitted from the first accumulating adder 6212, in which the first feedback data DA_F1 has been added to the first accumulating adder 6212 as first feedback data DA_F1.

The MAC operation process of the first MAC operator 6210 described above may be repeated. Accordingly, when all operations on the first portion DW1-1 of the first data DW1 and the first portion DV2-1 of the second data DV2 are finished, final first MAC result data DA_MAC1_R of the first portion DW1-1 of the first data DW1 and the first portion DV2-1 of the second data DV2 may be output from the first latch circuit 6213.

Referring to FIG. 46, the second MAC operator 6220 may include a second calculation block 6221, a second accumulating adder 6222, and a second latch circuit 6223. The second calculation block 6221 may include a second multiplication logic circuit 6221-1 including a plurality of second multipliers 6221-11, and a second addition logic circuit 6221-2 including a plurality of second adders 6221-21. Each of the second multiplication logic circuit 6221-1 and the second addition logic circuit 6221-2 of the second calculation block 6221 may be configured substantially the same as the second multiplication logic circuit (1221 of FIG. 36) and the second addition logic circuit (1222 of FIG. 36) of the second multiplication-addition circuit (1220 of FIG. 36) described above with reference to FIG. 36. Accordingly, the description of the corresponding components will be omitted.

The second accumulating adder 6222 may add second feedback data DA_F2 to second multiplication-addition data DA_MA2 transmitted from the second calculation block 6221 to output second MAC result data DA_MAC2_F. The second latch circuit 6223 may receive and latch the second MAC result data DA_MAC2_F transmitted from the second accumulating adder 6222, in which the second feedback data DA_F2 has been added. Thereafter, the second latch circuit 6223 may transmit the second MAC result data DA_MAC2_F transmitted from the second accumulating adder 6222, in which the second feedback data DA_F2 has been added to the second accumulating adder 6222 as second feedback data DA_F2.

The MAC operation process of the second MAC operator 6220 described above may be repeated. Accordingly, when all operations on the second portion DW1-2 of the first data DW1 and the second portion DV2-2 of the second data DV2 are finished, final second MAC result data DA_MAC2_R of the second portion DW1-2 of the first data DW1 and the second portion DV2-2 of the second data DV2 may be output from the second latch circuit 6223.

Referring to FIG. 47, the addition circuit 6230 may include a data input unit 6231, an adder 6232, and a data output unit 6233. The data input unit 6231 may include a first latch 6231-1 and a second latch 6231-2. The first latch 6231-1 may receive and latch the first MAC result data DA_MAC1_R. The first latch 6231-1 may output the received first MAC result data DA_MAC1_R in synchronization with a first latch control signal PINSTB1. The second latch 6231-2 may receive and latch the second MAC result data DA_MAC2_R. The second latch 6231-2 may output the received second MAC result data DA_MAC2_R in synchronization with a second latch control signal PINSTB2. The adder 6232 may sum the first MAC result data DA_MAC1_R transmitted from the first latch 6231-1 and the second MAC result data DA_MAC2_R transmitted from the second latch 6231-2 to output third MAC result data DA_MAC3_R.

The data output unit 6233 may include a third latch 6233-1, an AND gate 6233-2, first to third delay circuits 6233-3, 6233-4, and 6233-5, an inversion gate 6233-6, and a transfer gate 6233-7. The third latch 6233-1 may receive and latch the third MAC result data DA_MAC3_R output from the adder 6232. The AND gate 6233-3 may receive the first latch control signal PINSTB1 and the second latch control signal PINSTB2, and may perform an AND operation to output.

The first to third delay circuits 6233-3, 6233-4, and 6233-5 may delay the received signa for a certain time to output the same. The first delay circuit 6233-3 may receive a signal output from the AND gate 6233-2, and may delay the received signal for a certain time to output the same. The signal output from the first delay circuit 6233-3 may be input to the third latch 6233-1 and the second delay circuit 6233-2. The third latch 6233-1 may output the received third MAC result data DA_MAC3_R in synchronization with a signal output from the first delay circuit 6233-3. The signal output from the second delay circuit 6233-4 may be input to the third delay circuit 6233-5 and the inversion gate 6233-6. The inversion gate 6233-6 may perform inversion buffering of the received signal to output the inversion-buffered signal to the transfer gate 6233-7. The third delay circuit 6233-5 may delay the received signal for a certain time and output an activation signal Enable. In response to the activation signal Enable, the first latch control signal PINSTB1 and the second latch control signal PINSTB2 may be generated.

The transfer gate 6233-7 may output the third MAC result data DA_MAC3_R transmitted from the third latch 6233-1 to the outside OUT in response to the signal output from the inversion gate 6233-6. Thereafter, a latch reset signal LATCH_RST generated inside or outside the PIM device 6000 of FIG. 44 may be input to each of the first to third latches 621-1, 6231-2, and 6233-1. Accordingly, the first to third latches 621-1, 6231-2, and 6233-1 may be initialized, and all data stored in the first to third latches 621-1, 6231-2, and 6233-1 may be removed.

Figure 48:
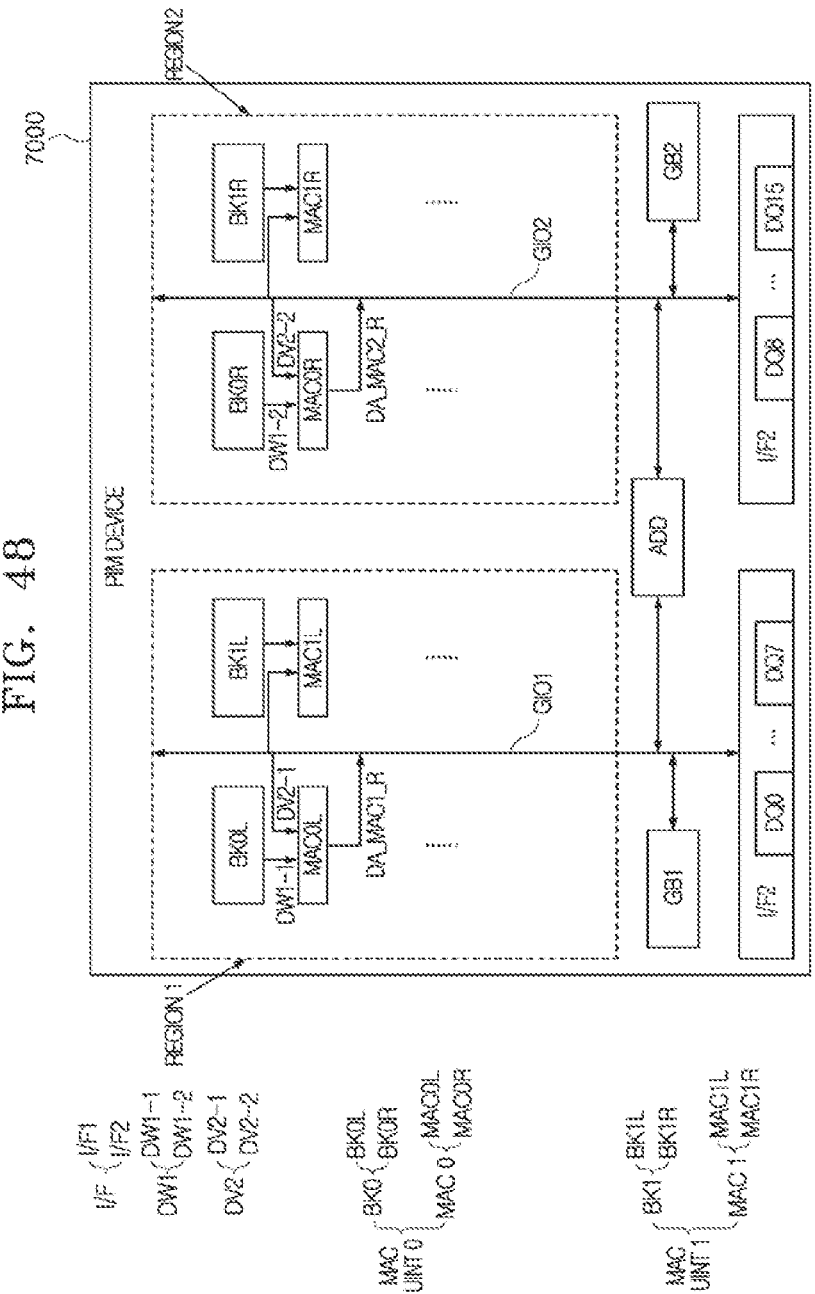
FIG. 48 illustrates an arrangement structure of memory banks and operation circuits in a PIM device according to another embodiment of the present disclosure.

FIG. 48 illustrates a disposal structure of memory banks and calculation circuits in a PIM device 7000 according to still yet another embodiment of the present disclosure. Referring to FIG. 48, the PIM device 7000 may include a plurality of memory banks BK1 and BK1, a first global buffer GB1, a second global buffer GB2, a plurality of MAC operators MAC0 and MAC1, a first global input/output line GIO1, a second global input/output line GIO2, an addition circuit ADD, and an interface I/F. The number of the memory banks included in the PIM device 7000 may be variously set.

A first memory bank BK0 and a first MAC operator MAC0 may constitute a first MAC unit MAC UNIT 0. Likewise, a second memory bank BK1 and a second MAC operator MAC1 may constitute a second MAC unit MAC UNIT 1. The description of the first MAC unit MAC UNIT 0 may be equally applied to the other MAC unit. The first MAC unit MAC UNIT 0 will be described in more detail below with reference to FIG. 49.

The interface I/F may include a first interface I/F1 allocated to a first region REGION 1 and a second interface I/F2 allocated to a second region REGION 2. The first interface I/F1 may include a plurality of data input/output circuits DQ0, . . . , and DQ7 performing data transmission between the outside and left banks BK0L and BK1L of the memory banks BK0 and BK1, respectively. The second interface I/F2 may include a plurality of data input/output circuits DQ8, . . . , and DQ15 performing data transmission between the outside and right banks BK0R and BK1R of the memory banks BK0 and BK1, respectively. Previously, the description of the data input/output circuits (DQ0, . . . , and DQ15 in FIG. 37) described with reference to FIG. 37 may be equally applied to the data input/output circuits DQ0, . . . , and DQ15 illustrated in FIG. 48.

Like the PIM device (3000 of FIG. 38) described above with reference to FIG. 38, the PIM device 7000 may also include the first region REGION 1 and the second region REGION 2 that are separated within the PIM device 7000. The left banks BK0L and BK1L may be disposed in the first region REGION 1, and the right banks BK0R and BK1R may be disposed in the second region REGION 2. The data input/output circuits DQ0, . . . , and DQ7 included in the left banks BK0L and BK1L may be disposed adjacent to the first region REGION 1, and the data input/output circuits D80, . . . , and DQ15 included in the right banks BK0R and BK1R may be disposed adjacent to the second region REGION 2.

The first global buffer GB1 may transmit data to a first MAC circuit MAC0L of the first MAC operator MAC0 through the first global input/output line GIO1 allocated in the first region REGION 1. The second global buffer GB2 may transmit data to a second MAC circuit MAC0R of the second MAC operator MAC1 through the second global input/output line GIO2 allocated in the second region REGION 2. In an embodiment, the first global buffer GB1 may be disposed adjacent to the first region REGION 1, and the second global buffer GB2 may be disposed adjacent to the second region REGION 2.

The addition circuit ADD may receive output data DA_MAC1_R of the first MAC circuit MAC0L of the first MAC operator MAC0 through the first global input/output line GIO1, and may receive output data DA_MAC0_R of the second MAC circuit MAC0R of the first MAC operator MAC0 through the second global input/output line GIO2.

Figure 49:
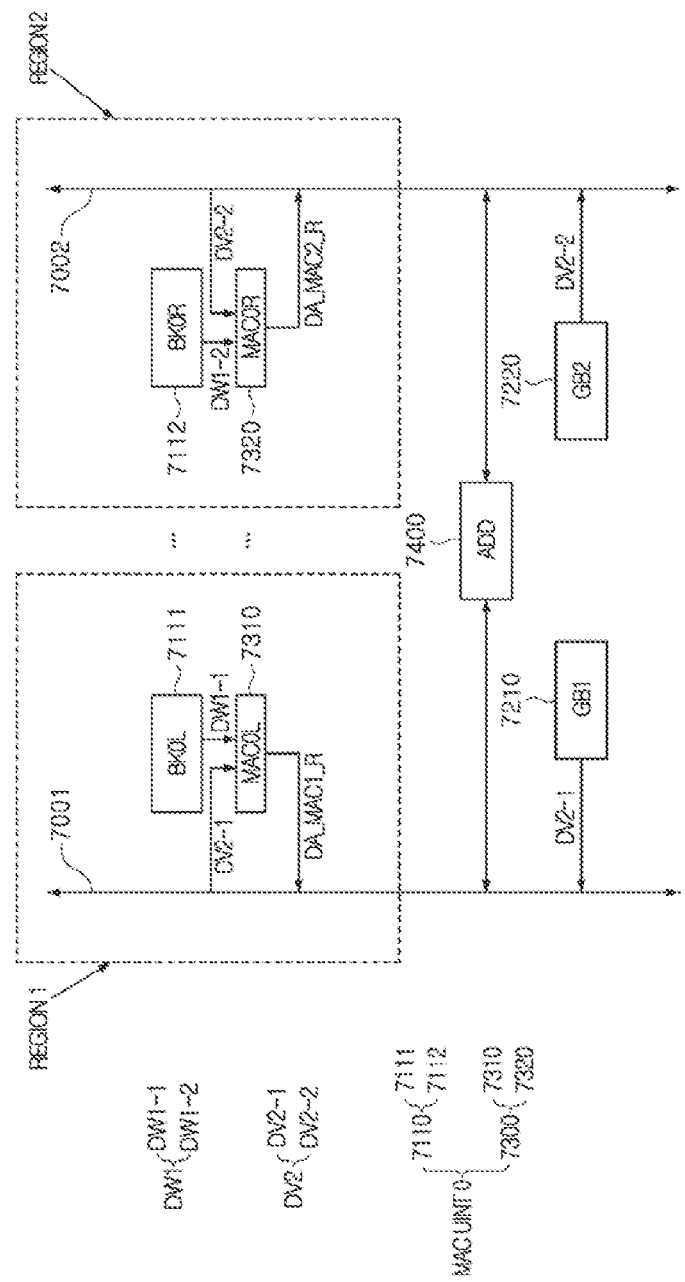
FIG. 49 illustrates an example of a configuration of a MAC unit included in the PIM device illustrated in FIG. 48.

FIG. 49 illustrates an example of a configuration of the first MAC unit MAC UNIT 0 included in the PIM device 7000 of FIG. 48. A first memory bank (BK0) 7110 may include a left bank (BK0L) 7111 that stores a first portion DW1-1 of first data DW1 composed of the first portion DW1-1 and a second portion DW1-2, and a right bank (BK0R) 7112 that stores the second portion DW1-2 of the first data DW1. A first global buffer (GB1) 7210 may store a first portion DV2-1 of second data DV2 composed of the first portion DV2-1 and a second portion DV2-2. A second global buffer (GB2) 7220 may store the second portion DV2-2 of the second data DV2.

A first MAC operator 7300 may include the first MAC circuit (MAC0L) 7310 and the second MAC circuit (MAC0R) 7320. The first MAC circuit (MAC0L) 7310 may output first MAC result data DATA_MAC1_R generated by performing a first MAC operation on the first portion DW1-1 of the first data DW1 and the first portion DV2-1 of the second data DV2. The second MAC circuit (MAC0R) 7320 may output second MAC result data DATA_MAC2_R generated by performing a second MAC operation on the second portion DW1-2 of the first data DW1 and the second portion DV2-2 of the second data DV2. The addition circuit (ADD) 7400 may receive the first MAC result data DA_MAC0_R from the first MAC circuit (MAC0L) 7310 through a first global input/output line 7001, and may receive the second MAC result data DA_MAC1_R from the second MAC circuit (MAC0R) 7320 through a second global input/output line 7002. The addition circuit (ADD) 7400 may sum the first MAC result data DA_MAC1_R and the second MAC result data DA_MAC2_R to output third MAC result data DA_MAC3_R, which is final MAC result data for the first data DW1 and the second data DV2.

The first MAC circuit (MAC0L) 7310, the second MAC circuit (MAC0R) 7320, and the addition circuit (ADD) 7400 may have substantially the same configurations as the first MAC operator (6210 of FIG. 45), the second MAC operator (6220 of FIG. 46), and the addition circuit (6230 of FIG. 47) described above with reference to FIGS. 45 to 47. Accordingly, the detailed descriptions for the configurations of the first MAC circuit (MAC0L) 7310, the second MAC circuit (MAC0R) 7320, and the addition circuit (ADD) 7400 will be omitted.

Figure 50:
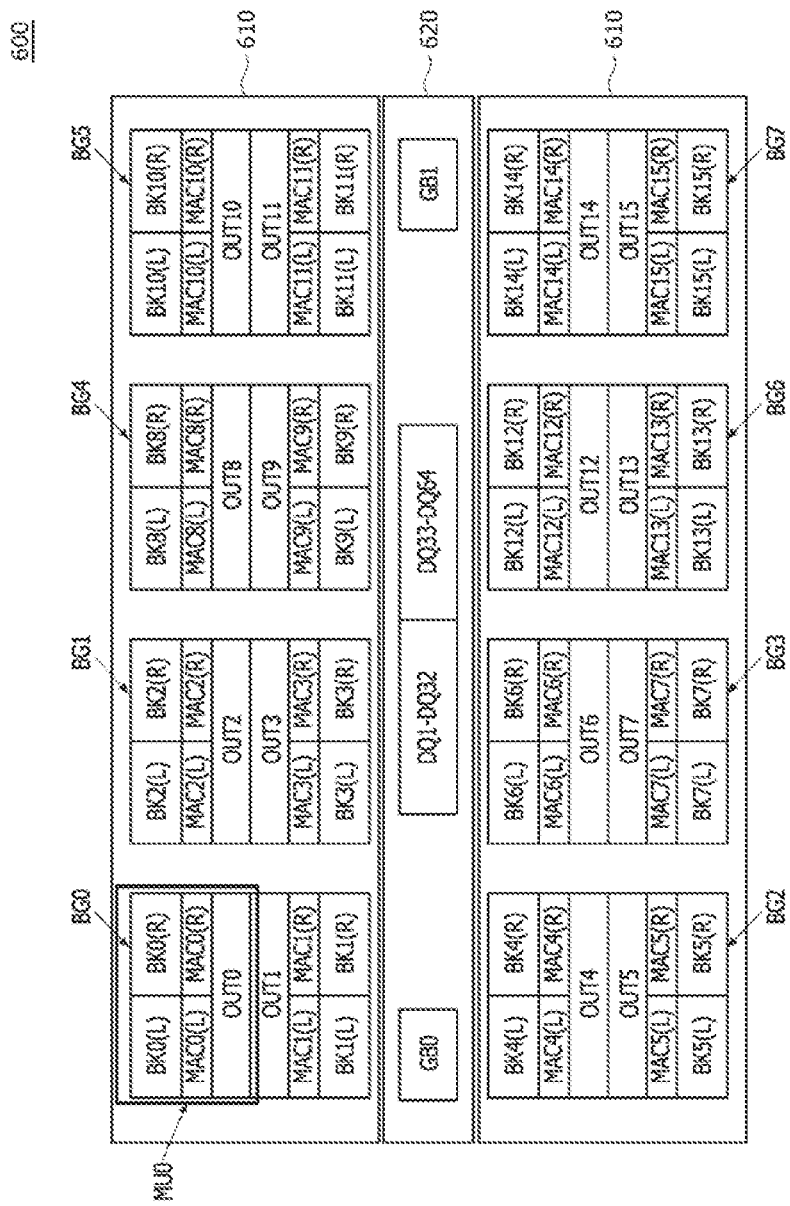
FIG. 50 is a block diagram illustrating a PIM device according to another embodiment of the present disclosure.

FIG. 50 is a block diagram illustrating a PIM device 600 according to another embodiment of the present disclosure. Referring to FIG. 50, the PIM device 600 may include a plurality of memory banks BKs (e.g., first to sixteenth memory banks BK0~BK15), a plurality of MAC operators MACs (e.g., first to sixteenth MAC operators MAC0~MAC15), a plurality of output circuits OUTs (e.g., first to sixteenth output circuits OUT0~OUT15), a first global buffer GB0, a second global buffer GB1, and a plurality of data I/O circuits DQs (e.g., first to $64^{th}$ data I/O circuits DQ1~DQ64). In an embodiment, the plurality of memory banks BKs and the plurality of MAC operators MACs may be disposed in a memory/arithmetic region 610, and the first and second global buffers GB0 and GB1 and the data I/O circuits DQs may be disposed in a peripheral circuit region 620. The plurality of output circuits OUTs may be disposed in the memory/arithmetic region 610 to be adjacent to the plurality of MAC operators MACs. Although the plurality of output circuits OUTs are disposed in the memory/arithmetic region 610 to be adjacent to the plurality of MAC operators MACs in the present embodiment, the present embodiment may be merely an example of the present disclosure. Accordingly, in some other embodiments, the plurality of output circuits OUTs may be disposed in the peripheral circuit region 620. The plurality of memory banks BKs, the first global buffer GB0, and the second global buffer GB1 may constitute the data storage region 11 described with reference to FIG. 1. The plurality of MAC operators MACs may constitute the arithmetic circuit 12 described with reference to FIG. 1. In the PIM device 600, the number of the memory banks BKs may be set to be different according to the embodiments. Hereinafter, it may be assumed that the plurality of memory banks BKs include the first to sixteenth memory banks BK0~BK15.

Each of the first to sixteenth memory banks BK0~BK15 may be divided into a left memory bank and a right memory bank. The left memory bank and the right memory bank included in each of the first to sixteenth memory banks BK0~BK15 may be physically distinguished from each other and may be disposed to be adjacent to each other. Although not shown in FIG. 50, the left memory bank and the right memory bank included in each of the first to sixteenth memory banks BK0~BK15 may be disposed to share a row control circuit such as a row decoder with each other. Specifically, the first memory bank BK0 may include a first left memory bank BK0(L) and a first right memory bank BK0(R) which are disposed to be adjacent to each other. The second memory bank BK1 may include a second left memory bank BK1(L) and a second right memory bank BK1(R) which are disposed to be adjacent to each other. Similarly, the sixteenth memory bank BK15 may include a sixteenth left memory bank BK15(L) and a sixteenth right memory bank BK15(R) which are disposed to be adjacent to each other.

The first to sixteenth MAC operators MAC0~MAC15 may be disposed to be allocated to respective ones of the first to sixteenth memory banks BK0~BK15. Each of the first to sixteenth MAC operators MAC0~MAC15 may include a left MAC operator and a right MAC operator. The left MAC operator may be allocated to the left memory bank, and the right MAC operator may be allocated to the right memory bank. The left MAC operator and the right MAC operator may also be disposed to be adjacent to each other. Specifically, the first MAC operator MAC0 may include a first left MAC operator MAC0(L) and a first right MAC operator MAC0(R) which are allocated to respective ones of the first left memory bank BK0(L) and the first right memory bank BK0(R). The second MAC operator MAC1 may include a second left MAC operator MAC1(L) and a second right MAC operator MAC1(R) which are allocated to respective ones of the second left memory bank BK1(L) and the second right memory bank BK1(R). Similarly, the sixteenth MAC operator MAC15 may include a sixteenth left MAC operator MAC15(L) and a sixteenth right MAC operator MAC15(R) which are allocated to respective ones of the sixteenth left memory bank BK15(L) and the sixteenth right memory bank BK15(R).

The first to sixteenth output circuits OUT0~OUT15 may be disposed to be allocated to the first to sixteenth MAC operators MAC0~MAC15, respectively. Specifically, the first output circuit OUT0 may be disposed to be allocated to the first left MAC operator MAC0(L) and the first right MAC operator MAC0(R). The first output circuit OUT0 may receive data from the first left MAC operator MAC0(L) and the first right MAC operator MAC0(R) allocated to the first output circuit OUT0. The second output circuit OUT1 may be disposed to be allocated to the second left MAC operator MAC1(L) and the second right MAC operator MAC1(R). The second output circuit OUT1 may receive data from the second left MAC operator MAC1(L) and the second right MAC operator MAC1(R) allocated to the second output circuit OUT1. Similarly, the sixteenth output circuit OUT15 may be disposed to be allocated to the sixteenth left MAC operator MAC15(L) and the sixteenth right MAC operator MAC15(R). The sixteenth output circuit OUT15 may receive data from the sixteenth left MAC operator MAC15(L) and the sixteenth right MAC operator MAC15(R) allocated to the sixteenth output circuit OUT15.

A certain memory bank BK of the first to sixteenth memory banks BK0~BK15, a certain MAC operator MAC allocated to the certain memory bank, and a certain output circuit OUT allocated to the certain MAC operator MAC may constitute one MAC unit MU. Thus, the PIM device 600 according to the present embodiment may include first to sixteenth MAC units MUs. For example, as illustrated in FIG. 50, a first MAC unit MU0 of the first to sixteenth MAC units MUs may be comprised of the first memory bank BK0 (i.e., the first left memory bank BK0(L) plus the first right memory bank BK0(R)), the first MAC operator MAC0 (i.e., the first left MAC operator MAC0(L) plus the first right MAC operator MAC0(R)), and the first output circuit OUT0. Although not indicated in FIG. 50, each of the second to sixteenth MAC units MUs may also have substantially the same configuration as the first MAC unit MU0. The left MAC operator and the right MAC operator included in a certain MAC unit may receive left weight data and right weight data from the left memory bank and the right memory bank included in the certain MAC unit, respectively. The output circuit included in a certain MAC unit may receive left MAC data and right MAC data from respective ones of the left MAC operator and the right MAC operator included in the certain MAC unit. For example, the first left MAC operator MAC0(L) may receive the left weight data from the first left memory bank BK0(L), and the first right MAC operator MAC0(R) may receive the right weight data from the first right memory bank BK0(R). In addition, the first output circuit OUT0 may receive first left MAC data from the first left MAC operator MAC0(L) and may receive first right MAC data from the first right MAC operator MAC0(R).

In the PIM device 600 according to the present embodiment, two memory banks may constitute one bank group. That is, one bank group BG may include an odd-numbered memory bank and an even-numbered memory bank. Specifically, the first bank group BG0 may include the first left memory bank BK0(L), the first right memory bank BK0(R), the second left memory bank BK1(L), and the second right memory bank BK1(R). In addition, the second bank group BG1 may include the third left memory bank BK0(L), the third right memory bank BK0(R), the fourth left memory bank BK3(L), and the fourth right memory bank BK3(R). Similarly, each of the third to eighth bank groups BG2~BG7 may have the same configuration as the first or second bank group BG0 or BG1. Thus, the eight bank group BG7 may include the fifteenth left memory bank BK14(L), the fifteenth right memory bank BK14(R), the sixteenth left memory bank BK15(L), and the sixteenth right memory bank BK15(R).

The first global buffer GB0 may transmit left vector data to the first to sixteenth left MAC operators MAC0(L)~MAC15(L). The left vector data output from the first global buffer GB0 may be transmitted to each of the first to sixteenth left MAC operators MAC0(L)~MAC15(L). The second global buffer GB1 may transmit right vector data to the first to sixteenth right MAC operators MAC0(R)~MAC15(R). The right vector data output from the second global buffer GB0 may be transmitted to each of the first to sixteenth right MAC operators MAC0(R)~MAC15(R). Although not shown in FIG. 50, the left vector data output from the first global buffer GB0 and the right vector data output from the second global buffer GB1 may be transmitted through a global I/O line GIO.

The first to $64^{th}$ data I/O circuits DQ1~DQ64 may provide data transmission paths between the PIM device 600 and an external device such as a host or a controller. The first to $32^{nd}$ data I/O circuits DQ1~DQ32 of the first to $64^{th}$ data I/O circuits DQ1~DQ64 may correspond to left data I/O circuits, and the $33^{rd}$ to $64^{th}$ data I/O circuits DQ33~DQ64 of the first to $64^{th}$ data I/O circuits DQ1~DQ64 may correspond to right data I/O circuits. The left data I/O circuits (i.e., the first to 32$^{nd}$ data I/O circuits DQ1~DQ32) may provide transmission paths that transmit read data from the first to sixteenth left memory banks BK0(L)~BK15(L) to an external device or that transmit write data from the external device to the first to sixteenth left memory banks BK0(L)~BK15(L). Moreover, the right data I/O circuits (i.e., the 33$^{rd}$ to 64$^{th}$ data I/O circuits DQ33~DQ64) may provide transmission paths that transmit read data from the first to sixteenth right memory banks BK0(R)~BK15(R) to an external device or that transmit write data from the external device to the first to sixteenth right memory banks BK0(R)~BK15(R). The left data I/O circuits (i.e., the first to 32$^{nd}$ data I/O circuits DQ1~DQ32) and the right data I/O circuits (i.e., the 33$^{rd}$ to 64$^{th}$ data I/O circuits DQ33~DQ64) may output MAC result data generated by the first to sixteenth output circuits OUT0~OUT15 as output data of the PIM device 600. In such a case, the left data I/O circuits DQ1~DQ32 may sequentially output the MAC result data which are output from the output circuits OUT0, OUT1, OUT4, OUT5, OUT8, OUT9, OUT12, and OUT13 allocated to odd-numbered bank groups BG0, BG2, BG4, and BG6. In addition, the right data I/O circuits DQ33~DQ64 may sequentially output the MAC result data which are output from the output circuits OUT2, OUT3, OUT6, OUT7, OUT10, OUT11, OUT14, and OUT15 allocated to even-numbered bank groups BG1, BG3, BG5, and BG7.

Figure 51:
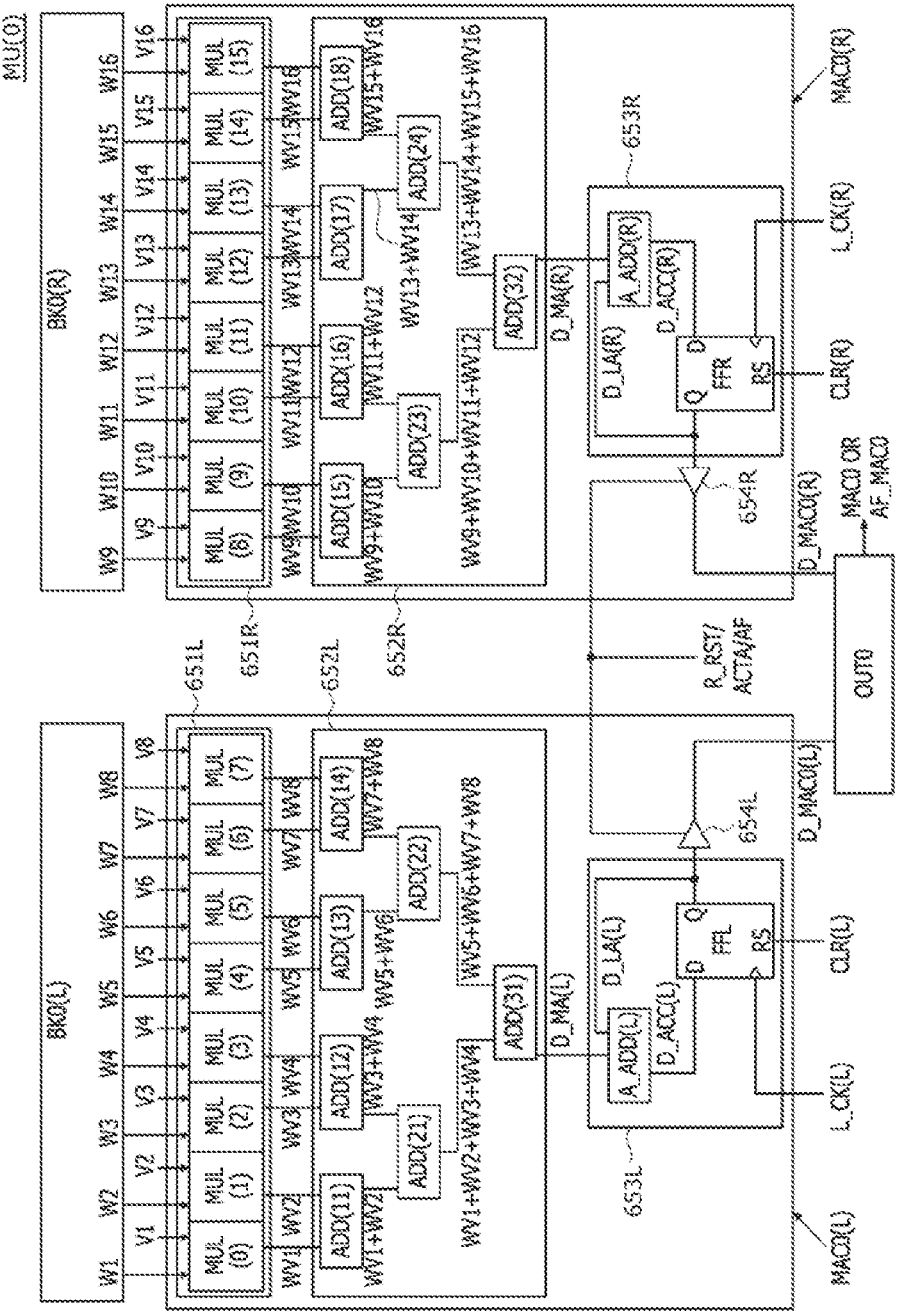
FIG. 51 illustrates a configuration of a first MAC unit included in the PIM device illustrated in FIG. 50.

FIG. 51 illustrates a configuration of the first MAC unit MU0 included in the PIM device 600 illustrated in FIG. 50. The following descriptions of the first MAC unit MU0 set forth hereinafter will be equally applied to each of the remaining MAC units. Referring to FIG. 51, the first MAC unit MU0 may include the first left memory bank BK0(L), the first right memory bank BK0(R), the first left MAC operator MAC0(L), the first right MAC operator MAC0(R), and the first output circuit OUT0. As described with reference to FIG. 50, the first left memory bank BK0(L) may transmit the left weight data (e.g., first to eighth weight data W1~W8) to the first left MAC operator MAC0(L), and the first right memory bank BK0(R) may transmit the right weight data (e.g., ninth to sixteenth weight data W9~W16) to the first right MAC operator MAC0(R).

The first left MAC operator MAC0(L) may include a left multiplication circuit 651L, a left adder tree 652L, a left accumulator 653L, and a left output buffer 654L. The left multiplication circuit 651L may include a plurality of multipliers, for example, first to eighth multipliers MUL(0)~MUL(7). The first to eighth multipliers MUL(0)~MUL(7) may receive the left weight data (i.e., the first to eighth weight data W1~W8) from the first left memory bank BK0(L). In addition, the first to eighth multipliers MUL(0)~MUL(7) may receive the left vector data (e.g., first to eighth vector data V1~V8) from the first global buffer (GB0 of FIG. 50). The first to eighth multipliers MUL(0)~MUL(7) may perform multiplying calculations of the first to eighth weight data W1~W8 and the first to eighth vector data V1~V8 to generate first to eighth multiplication result data WV1~WV8 (i.e., left multiplication result data). For example, the first multiplier MUL(0) may perform a multiplying calculation of the first weight data W1 and the first vector data V1 to generate the first multiplication result data WV1, and the second multiplier MUL(1) may perform a multiplying calculation of the second weight data W2 and the second vector data V2 to generate the second multiplication result data WV2. In the same way, the third to eighth multipliers MUL(2)~MUL(7) may also perform multiplying calculations of the third to eighth weight data W3~W8 and the third to eighth vector data V3~V8 to generate the third to eighth multiplication result data WV3~WV8. The first to eighth multiplication result data WV1~WV8 output from the first to eighth multipliers MUL(0)~MUL(7) may be transmitted to the left adder tree 652L.

The left adder tree 652L may perform an adding calculation using the first to eighth multiplication result data WV1~WV8 as input data. The left adder tree 652L may output left addition result data D_MA(L) which are generated by the adding calculation of the left adder tree 652L. The left adder tree 652L may include a plurality of adders ADDs which are arrayed to have a hierarchical structure such as a tree structure. In the present embodiment, the left adder tree 652L may be comprised of half-adders. However, the present embodiment is merely an example of the present disclosure. Accordingly, in some other embodiment, the left adder tree 652L may be comprised of full-adders. In the present embodiment, four adders ADD(11)~ADD(14) may be disposed in a first stage located at a highest level of the left adder tree 652L, and two adders ADD(21) and ADD(22) may be disposed in a second stage located at a second highest level of the left adder tree 652L. In addition, one adder ADD(31) may be disposed in a third stage located at a lowest level of the left adder tree 652L.

The first adder ADD(11) disposed in the first stage of the left adder tree 652L may perform an adding calculation of the first multiplication result data WV1 and the second multiplication result data WV2 output from respective ones of the first and second multipliers MUL(0) and MUL(1), thereby generating and outputting added data of "WV1+WV2". The second adder ADD(12) disposed in the first stage of the left adder tree 652L may perform an adding calculation of the third multiplication result data WV3 and the fourth multiplication result data WV4 output from respective ones of the third and fourth multipliers MUL(2) and MUL(3), thereby generating and outputting added data of "WV3+WV4". The third adder ADD(13) disposed in the first stage of the left adder tree 652L may perform an adding calculation of the fifth multiplication result data WV5 and the sixth multiplication result data WV6 output from respective ones of the fifth and sixth multipliers MUL(4) and MUL(5), thereby generating and outputting added data of "WV5+WV6". The fourth adder ADD(14) disposed in the first stage of the left adder tree 652L may perform an adding calculation of the seventh multiplication result data WV7 and the eighth multiplication result data WV8 output from respective ones of the seventh and eighth multipliers MUL(6) and MUL(7), thereby generating and outputting added data of "WV7+WV8".

The first adder ADD(21) disposed in the second stage of the left adder tree 652L may perform an adding calculation of the added data of "WV1+WV2" and "WV3+WV4" output from respective ones of the first and second adders ADD(11) and ADD(12) in the first stage of the left adder tree 652L, thereby generating and outputting added data of "WV1+WV2+WV3+WV4". The second adder ADD(22) disposed in the second stage of the left adder tree 652L may perform an adding calculation of the added data of "WV5+WV6" and "WV7+WV8" output from respective ones of the third and fourth adders ADD(13) and ADD(14) in the first stage of the left adder tree 652L, thereby generating and outputting added data of "WV5+WV6+WV7+WV8". The adder ADD(31) disposed in the third stage of the left adder tree 652L may perform an adding calculation of the added data of "WV1+WV2+WV3+WV4" and "WV5+WV6+WV7+WV8" output from respective ones of the first and second adders ADD(21) and ADD(22) in the second stage of the left adder tree 652L, thereby generating and outputting the left addition result data D_MA(L) corresponding to added data of "WV1+WV2+WV3+WV4+WV5+WV6+WV7+WV8". The left addition result data D_MA(L) may be transmitted to the left accumulator 653L.

The left accumulator 653L may include a left accumulative adder A_ADD(L) and a left latch circuit FFL. The left accumulative adder A_ADD(L) may receive the left addition result data D_MA(L) from the left adder tree 652L. In addition, the left accumulator 653L may receive left latched data D_LA(L), which are latched in the left latch circuit FFL by a previous MAC operation, from the left latch circuit FFL. Because the left latch circuit FFL is reset prior to a first MAC operation, the left latched data D_LA(L) may have a value of zero during the first MAC operation. The left accumulative adder A_ADD(L) may perform an adding calculation of the left addition result data D_MA(L) and the left latched data D_LA(L) to generate left accumulated data D_ACC(L). The left accumulative adder A_ADD(L) may output the left accumulated data D_ACC(L) to an input terminal D of the left latch circuit FFL.

The left latch circuit FFL may have the input terminal D, an output terminal Q, a reset terminal RS, and a clock terminal. The input terminal D of the left latch circuit FFL may be coupled to an output terminal of the left accumulative adder A_ADD(L). The output terminal Q of the left latch circuit FFL may be coupled to an input terminal of the left accumulative adder A_ADD(L) and an input terminal of the left output buffer 654L. A left clear signal CLR(L) may be applied to the reset terminal RS of the left latch circuit FFL. A left clock signal L_CK(L) may be applied to the clock terminal of the left latch circuit FFL. The left latch circuit FFL may be synchronized with a pulse of the left clock signal L_CK(L), which is input to the clock terminal of the left latch circuit FFL, to latch the left accumulated data D_ACC(L) input to the input terminal D of the left latch circuit FFL and to output the latched data of the left accumulated data D_ACC(L). In addition, the left latch circuit FFL may be synchronized with a pulse of the left clock signal L_CK(L), which is input to the clock terminal of the left latch circuit FFL, to output the latched data of the left accumulated data D_ACC(L) as the left latched data D_LA(L) corresponding to feedback data which are transmitted to the left accumulative adder A_ADD(L).

The left output buffer 654L may have an input terminal, a control terminal, and an output terminal. The input terminal of the left output buffer 654L may be coupled to the output terminal Q of the left latch circuit FFL of the left accumulator 653L. The left output buffer 654L may receive a first MAC read signal R_RST requesting a read operation of the MAC result data, an activation signal ACTA requesting activation of a row in which activation function data are stored, and an activation function signal AF requesting a process or application of an activation function through the control terminal of the left output buffer 654L. The output terminal of the left output buffer 654L may be coupled to a first input terminal of the first output circuit OUT0. The left output buffer 654L may output the left accumulated data D_ACC(L), which are input to the input terminal of the left output buffer 654L, as first left MAC data D_MAC0(L) when one of the first MAC read signal R_RST, the activation signal ACTA, and the activation function signal AF has a first logic level (e.g., a logic "high" level).

The first right MAC operator MAC0(R) may include a right multiplication circuit 651R, a right adder tree 652R, a right accumulator 653R, and a right output buffer 654R. The right multiplication circuit 651R may include a plurality of multipliers, for example, ninth to sixteenth multipliers MUL(8)~MUL(15). The ninth to sixteenth multipliers MUL(8)~MUL(15) may receive the right weight data (i.e., the ninth to sixteenth weight data W9~W16) from the first right memory bank BK0(R). In addition, the ninth to sixteenth multipliers MUL(8)~MUL(15) may receive the right vector data (e.g., ninth to sixteenth vector data V9~V16) from the second global buffer (GB1 of FIG. 50). The ninth to sixteenth multipliers MUL(8)~MUL(15) may perform multiplying calculations of the ninth to sixteenth weight data W9~W16 and the ninth to sixteenth vector data V9~V16 to generate ninth to sixteenth multiplication result data WV9~WV16 (i.e., right multiplication result data). For example, the ninth multiplier MUL(8) may perform a multiplying calculation of the ninth weight data W9 and the ninth vector data V9 to generate the ninth multiplication result data WV9, and the tenth multiplier MUL(9) may perform a multiplying calculation of the tenth weight data W10 and the tenth vector data V10 to generate the tenth multiplication result data WV10. In the same way, the eleventh to sixteenth multipliers MUL(10)~MUL(15) may also perform multiplying calculations of the eleventh to sixteenth weight data W11~W16 and the eleventh to sixteenth vector data V11~V16 to generate the eleventh to sixteenth multiplication result data WV11~WV16. The ninth to sixteenth multiplication result data WV9~WV16 output from the ninth to sixteenth multipliers MUL(8)~MUL(15) may be transmitted to the right adder tree 652R.

The right adder tree 652R may perform an adding calculation using the ninth to sixteenth multiplication result data WV9~WV16 as input data. The right adder tree 652R may output right addition result data D_MA(R) which are generated by the adding calculation of the right adder tree 652R. The right adder tree 652R may include a plurality of adders ADDs which are arrayed to have a hierarchical structure such as a tree structure. In the present embodiment, the right adder tree 652R may be comprised of half-adders. However, the present embodiment is merely an example of the present disclosure. Accordingly, in some other embodiment, the right adder tree 652R may be comprised of full-adders. In the present embodiment, four adders ADD(15)~ADD(18) may be disposed in a first stage located at a highest level of the right adder tree 652R, and two adders ADD(23) and ADD(24) may be disposed in a second stage located at a second highest level of the right adder tree 652R. In addition, one adder ADD(32) may be disposed in a third stage located at a lowest level of the right adder tree 652R.

The first adder ADD(15) disposed in the first stage of the right adder tree 652R may perform an adding calculation of the ninth multiplication result data WV9 and the tenth multiplication result data WV10 output from respective ones of the ninth and tenth multipliers MUL(8) and MUL(9), thereby generating and outputting added data of "WV9+WV10". The second adder ADD(16) disposed in the first stage of the right adder tree 652R may perform an adding calculation of the eleventh multiplication result data WV11 and the twelfth multiplication result data WV12 output from respective ones of the eleventh and twelfth multipliers MUL(10) and MUL(11), thereby generating and outputting added data of "WV11+WV12". The third adder ADD(17) disposed in the first stage of the right adder tree 652R may perform an adding calculation of the thirteenth multiplication result data WV13 and the fourteenth multiplication result data WV14 output from respective ones of the thirteenth and fourteenth multipliers MUL(12) and MUL(13), thereby generating and outputting added data of "WV13+WV14". The fourth adder ADD(18) disposed in the first stage of the right adder tree 652R may perform an adding calculation of the fifteenth multiplication result data WV15 and the sixteenth multiplication result data WV16 output from respective ones of the fifteenth and sixteenth multipliers MUL(14) and MUL(15), thereby generating and outputting added data of "WV15+WV16".

The first adder ADD(23) disposed in the second stage of the right adder tree 652R may perform an adding calculation of the added data of "WV9+WV10" and "WV11+WV12" output from respective ones of the first and second adders ADD(15) and ADD(16) in the first stage of the right adder tree 652R, thereby generating and outputting added data of "WV9+WV10+WV11+WV12". The second adder ADD(24) disposed in the second stage of the right adder tree 652R may perform an adding calculation of the added data of "WV13+WV14" and "WV15+WV16" output from respective ones of the third and fourth adders ADD(17) and ADD(18) in the first stage of the right adder tree 652R, thereby generating and outputting added data of "WV13+WV14+WV15+WV16". The adder ADD(32) disposed in the third stage of the right adder tree 652R may perform an adding calculation of the added data of "WV9+WV10+WV11+WV12" and "WV13+WV14+WV15+WV16" output from respective ones of the first and second adders ADD(23) and ADD(24) in the second stage of the right adder tree 652R, thereby generating and outputting the right addition result data D_MA(R) corresponding to added data of "WV9+WV10+WV11+WV12+WV13+WV14+WV15+WV16". The right addition result data D_MA(R) may be transmitted to the right accumulator 653R.

The right accumulator 653R may include a right accumulative adder A_ADD(R) and a right latch circuit FFR. The right accumulative adder A_ADD(R) may receive the right addition result data D_MA(R) from the right adder tree 652R. In addition, the right accumulator 653R may receive right latched data D_LA(R), which are latched in the right latch circuit FFR by a previous MAC operation, from the right latch circuit FFR. Because the right latch circuit FFR is reset prior to a first MAC operation, the right latched data D_LA(R) may have a value of zero during the first MAC operation. The right accumulative adder A_ADD(R) may perform an adding calculation of the right addition result data D_MA(R) and the right latched data D_LA(R) to generate right accumulated data D_ACC(R). The right accumulative adder A_ADD(R) may output the right accumulated data D_ACC(R) to an input terminal D of the right latch circuit FFR.

The right latch circuit FFR may have the input terminal D, an output terminal Q, a reset terminal RS, and a clock terminal. The input terminal D of the right latch circuit FFR may be coupled to an output terminal of the right accumulative adder A_ADD(R). The output terminal Q of the right latch circuit FFR may be coupled to an input terminal of the right accumulative adder A_ADD(R) and an input terminal of the right output buffer 654R. A right clear signal CLR(R) may be applied to the reset terminal RS of the right latch circuit FFR. A right clock signal L_CK(R) may be applied to the clock terminal of the right latch circuit FFR. The right latch circuit FFR may be synchronized with a pulse of the right clock signal L_CK(R), which is input to the clock terminal of the right latch circuit FFR, to latch the right accumulated data D_ACC(R) input to the input terminal D of the right latch circuit FFR and to output the latched data of the right accumulated data D_ACC(R). In addition, the right latch circuit FFR may be synchronized with a pulse of the right clock signal L_CK(R), which is input to the clock terminal of the right latch circuit FFR, to output the latched data of the right accumulated data D_ACC(R) as the right latched data D_LA(R) corresponding to feedback data which are transmitted to the right accumulative adder A_ADD(R).

The right output buffer 654R may have an input terminal, a control terminal, and an output terminal. The input terminal of the right output buffer 654R may be coupled to the output terminal Q of the right latch circuit FFR of the right accumulator 653R. The right output buffer 654R may receive the first MAC read signal R_RST requesting a read operation of the MAC result data, the activation signal ACTA requesting activation of a row in which the activation function data are stored, and the activation function signal AF requesting a process or application of the activation function through the control terminal of the right output buffer 654R. The output terminal of the right output buffer 654R may be coupled to a second input terminal of the first output circuit OUT0. The right output buffer 654R may output the right accumulated data D_ACC(R), which are input to the input terminal of the right output buffer 654R, as first right MAC data D_MAC0(R) when one of the first MAC read signal R_RST, the activation signal ACTA, and the activation function signal AF has the first logic level (e.g., a logic "high" level).

The first output circuit OUT0 may receive the first left MAC data D_MAC0(L) from the left output buffer 654L of the first left MAC operator MAC0(L) through the first input terminal of the first output circuit OUT0. The first output circuit OUT0 may also receive the first right MAC data D_MAC0(R) from the right output buffer 654R of the first right MAC operator MAC0(R) through the second input terminal of the first output circuit OUT0. The first output circuit OUT0 may output first MAC result data MAC0 or first activation function-processed MAC result data AF_MAC0 processed with the activation function in response to control signals. A configuration and an operation of the first output circuit OUT0 will be described hereinafter with reference to FIG. 52.

Figure 52:
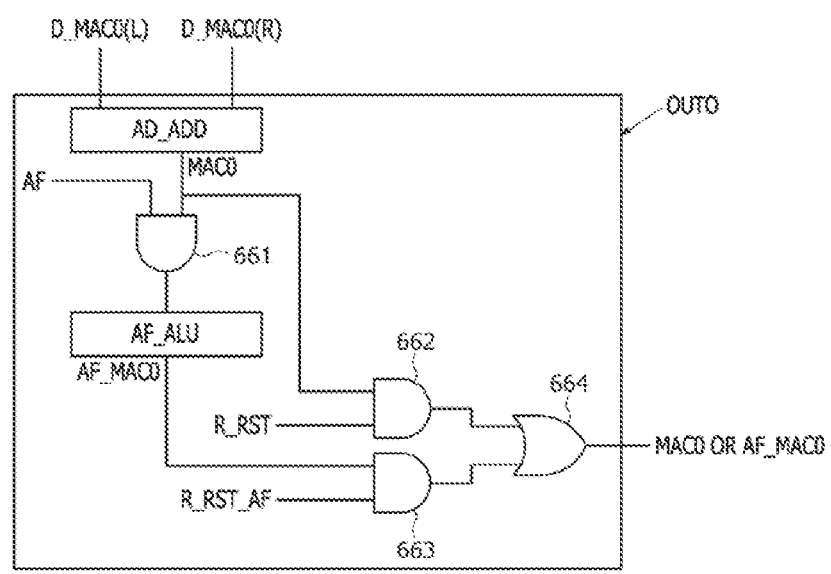
FIG. 52 illustrates a configuration of a first output circuit included in the first MAC unit illustrated in FIG. 51.

FIG. 52 illustrates a configuration of the first output circuit OUT0 included in the first MAC unit MU0 illustrated in FIG. 51. The following descriptions of the first output circuit OUT0 may be equally applied to each of the second to eighth output circuits OUT1~OUT7 illustrated in FIG. 50. Referring to FIG. 52, the first output circuit OUT0 may include an additional adder AD_ADD, an activation function logic circuit AF_ALU, a first AND gate 661, a second AND gate 662, a third AND gate 663, and an OR gate 664. The additional adder AD_ADD may have a first input terminal, a second input terminal, and an output terminal. The first input terminal and the second input terminal of the additional adder AD_ADD may be coupled to an output terminal of the left output buffer (654L of FIG. 51) and an output terminal of the right output buffer (654R of FIG. 51), respectively. The output terminal of the additional adder AD_ADD may be coupled to a second input terminal of the first AND gate 661 and a first input terminal of the second AND gate 662. The additional adder AD_ADD may perform an adding calculation of the first left MAC data D_MAC0 (L) input through the first input terminal of the additional adder AD_ADD and the first right MAC data D_MAC0(R) input through the second input terminal of the additional adder AD_ADD, thereby generating and outputting the first MAC result data MAC0. The additional adder AD_ADD may transmit the first MAC result data MAC0 to the first AND gate 661 and the second AND gate 662.

The first AND gate 661 may receive an activation function signal AF requesting a process or application of the activation function through a first input terminal of the first AND gate 661 and may receive the first MAC result data MAC0 from the additional adder AD_ADD through the second input terminal of the first AND gate 661. The first AND gate 661 may perform a logical AND operation of the activation function signal AF and the first MAC result data MAC0 to output the result data of the logical AND operation through an output terminal of the first AND gate 661. When the activation function signal AF has the first logic level (i.e., a logic "high" level), the first AND gate 661 may output the first MAC result data MAC0. The output terminal of the first AND gate 661 may be coupled to an input terminal of the activation function logic circuit AF_ALU. The activation function logic circuit AF_ALU may process an activation function for the output data of the first AND gate 661 to generate the first activation function-processed MAC result data AF_MAC0. The activation function logic circuit AF_ALU may output the first activation function-processed MAC result data AF_MAC0 though an output terminal of the activation function logic circuit AF_ALU. The output terminal of the activation function logic circuit AF_ALU may be coupled to a first input terminal of the third AND gate 663.

The second AND gate 662 may receive the first MAC result data MAC0 from the additional adder AD_ADD through the first input terminal of the second AND gate 662 and may receive the first MAC read signal R_RST through a second input terminal of the second AND gate 662. The first MAC read signal R_RST may be defined as a signal for controlling a read operation for reading MAC result data that are not processed by the activation function. The second AND gate 662 may perform a logical AND operation of the first MAC result data MAC0 and the first MAC read signal R_RST to output the result data of the logical AND operation through an output terminal of the second AND gate 662. When the first MAC read signal R_RST has the first logic level (i.e., a logic "high" level), the second AND gate 662 may output the first MAC result data MAC0. The output terminal of the second AND gate 662 may be coupled to an input terminal of the OR gate 664.

The third AND gate 663 may receive the first activation function-processed MAC result data AF_MAC0 from the activation function logic circuit AF_ALU through the first input terminal of the third AND gate 663 and may receive a second MAC read signal R_RST_AF through a second input terminal of the third AND gate 663. The second MAC read signal R_RST_AF may be defined as a signal for controlling a read operation for reading MAC result data that are processed by the activation function. The third AND gate 663 may perform a logical AND operation of the first activation function-processed MAC result data AF_MAC0 and the second MAC read signal R_RST_AF to output the result data of the logical AND operation through an output terminal of the third AND gate 663. When the second MAC read signal R_RST_AF gas the first logic level (i.e., a logic "high" level), the third AND gate 663 may output the first activation function-processed MAC result data AF_MAC0. The output terminal of the third AND gate 663 may be coupled to a second input terminal of the OR gate 664.

The OR gate 664 may receive the output data of the second AND gate 662 through the first input terminal of the OR gate 664 and may receive the output data of the third AND gate 663 through the second input terminal of the OR gate 664. When the second AND gate 662 outputs the first MAC result data MAC0 and the third AND gate outputs the second logic level (i.e., a logic "low" level), the OR gate 664 may output the first MAC result data MAC0 through an output terminal of the OR gate 664. Alternatively, when the second AND gate 662 outputs the second logic level (i.e., a logic "low" level) and the third AND gate 663 outputs the first activation function-processed MAC result data AF_MAC0, the OR gate 664 may output the first activation function-processed MAC result data AF_MAC0 through the output terminal of the OR gate 664.

The PIM device (600 of FIG. 50) may execute a matrix multiplication calculation of a weight matrix and a vector matrix to perform the MAC operation for generating a result matrix. The matrix multiplication calculation has been already described with reference to FIG. 35. In the present embodiment, the weight data Ws mean elements constituting the weight matrix illustrated in FIG. 35, and the vector data Vs mean elements constituting the vector matrix illustrated in FIG. 35. In addition, the MAC result data MACs mean elements constituting the MAC result matrix illustrated in FIG. 35. As described with reference to FIG. 50, the weight data W0.0~W511.511 illustrated in FIG. 35 used for the MAC operation may be stored in the left memory banks BK(L) and the right memory banks BK(R). Hereinafter, the weight data stored in the left memory banks BK(L) will be referred to as left weight data, and the weight data stored in the right memory banks BK(R) will be referred to as right weight data.

The weight data W0.0~W511.511 arrayed in the first to $512^{th}$ rows of the weight matrix illustrated in FIG. 35 may be stored into the first sixteenth memory banks BK0~BK15 in units of rows. For example, the weight data W0.0~W0.511 arrayed in the first row of the weight matrix illustrated in FIG. 35 may be stored into the first row ROW0 of the first memory bank BK0. In addition, the weight data W1.0~W1.511 arrayed in the second row of the weight matrix illustrated in FIG. 35 may be stored into the first row ROW0 of the second memory bank BK1. Similarly, the weight data W15.0~W15.511 arrayed in the sixteenth row of the weight matrix illustrated in FIG. 35 may be stored into the first row ROW0 of the sixteenth memory bank BK15. In the same way, the weight data arrayed in the seventeenth to $32^{nd}$ rows of the weight matrix illustrated in FIG. 35 may be stored into the first to sixteenth memory banks BK0~BK15, respectively. The weight data arrayed in the remaining rows of the weight matrix illustrated in FIG. 35 may also be stored into the first to sixteenth memory banks BK0~BK15 in the same way as described above.

Figure 53:
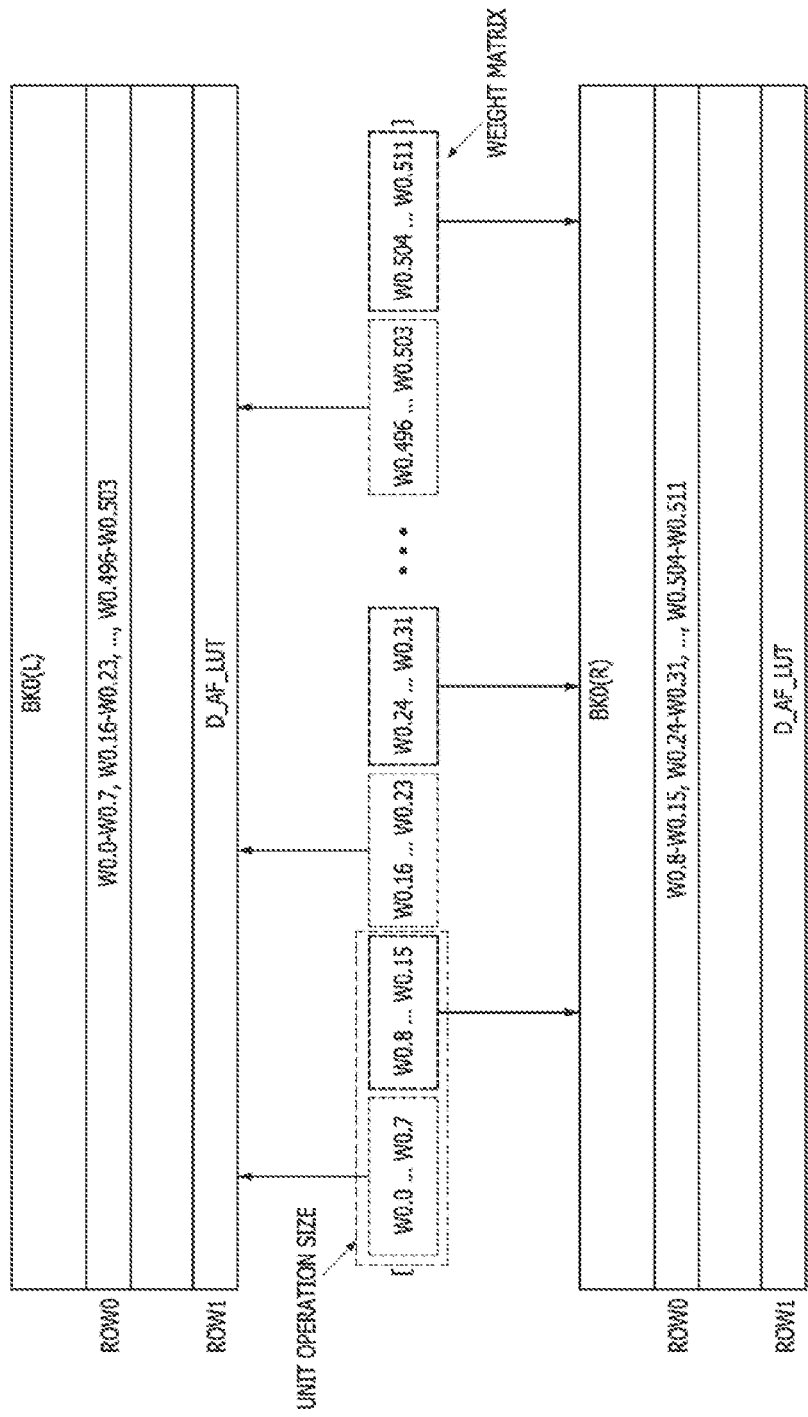
FIG. 53 illustrates a process for storing weight data and activation function data into a first left memory bank and a first right memory bank of the first MAC unit illustrated in FIG. 51.

FIG. 53 illustrates a process for storing the weight data and activation function data into the first left memory bank BK0(L) and the first right memory bank BK0(R) of the first MAC unit MU0 illustrated in FIG. 51. The present embodiment will be described in conjunction with a case that the weight data W0.0~W0.511 in the first row of the weight matrix illustrated in FIG. 35 are stored in the first left memory bank BK0(L) and the first right memory bank BK0(R) of the first MAC unit MU0 illustrated in FIG. 51. The following descriptions may be equally applied to a process for storing the weight data arrayed in each of the remaining rows of the weight matrix.

Referring to FIG. 53, the weight data W0.0~W0.511 in the first row of the weight matrix illustrated in FIG. 35 may be categorize as either left weight data or right weight data according to a unit operation size to be evenly allocated and disposed in both of the first left memory bank BK0(L) and the first right memory bank BK0(R). The unit operation size may be defined as a size of the weigh data (or the vector data) which are used for a single MAC operation of the PIM device 600 illustrated in FIG. 50. The unit operation size may be determined according to a hardware configuration of the left multiplication circuit (651L of FIG. 51) and the right multiplication circuit (651R of FIG. 51) included in the PIM device 600. Hereinafter, it may be assumed that a size (i.e., the unit operation size) of the weight data processed by a single arithmetic operation of the left multiplication circuit (651L of FIG. 51) and the right multiplication circuit (651R of FIG. 51) is 256 bits. As described with reference to FIG. 36, when each set of the plural sets of the weight data and the plural sets of the vector data has 16 bits, each of the left multiplication circuit (651L of FIG. 51) and the right multiplication circuit (651R of FIG. 51) may perform multiplying calculations of sixteen sets of the weight data and sixteen sets of the vector data at a time. In such a case, first to $512^{th}$ sets of the weight data (i.e., the first to $512^{th}$ weight data W0.0~W0.511) in the first row of the weight matrix may be evenly stored in the first left memory bank BK0(L) and the first right memory bank BK0(R) in units of 16 sets of the weight data.

Specifically, a first group of 16 sets of the weight data (i.e., the first to sixteenth weight data W0.0~W0.15) may be evenly stored in the first left memory bank BK0(L) and the first right memory bank BK0(R). That is, the first to eighth weight data W0.0~W0.7 may be stored in the first row ROW0 of the first left memory bank BK0(L) to provide first left weight data, and the ninth to sixteenth weight data W0.8~W0.15 may be stored in the first row ROW0 of the first right memory bank BK0(R) to provide first right weight data. A second group of 16 sets of the weight data (i.e., the seventeenth to $32^{nd}$ weight data W0.16~W0.31) may also be evenly stored in the first left memory bank BK0(L) and the first right memory bank BK0(R). That is, the seventeenth to $24^{th}$ weight data W0.16~W0.23 may be stored in the first row ROW0 of the first left memory bank BK0(L) to provide second left weight data, and the $25^{th}$ to $32^{nd}$ weight data W0.24~W0.31 may be stored in the first row ROW0 of the first right memory bank BK0(R) to provide second right weight data. Similarly, a $32^{nd}$ group of 16 sets of the weight data (i.e., the $497^{th}$ to $512^{th}$ weight data W0.496~W0.511) may also be evenly stored in the first left memory bank BK0(L) and the first right memory bank BK0(R). That is, the $497^{th}$ to $504^{th}$ weight data W0.496~W0.503 may be stored in the first row ROW0 of the first left memory bank BK0(L) to provide $32^{nd}$ left weight data, and the $505^{th}$ to $512^{th}$ weight data W0.504~W0.511 may be stored in the first row ROW0 of the first right memory bank BK0(R) to provide $32^{nd}$ right weight data.

Meanwhile, activation function data D_AF_LUT may be stored in the second rows ROW1 of the first left memory bank BK0(L) and the first right memory bank BK0(R). In an embodiment, the activation function data D_AF_LUT may include result data which are generated by processing or applying the activation function such as a sigmoid function, a hyperbolic tangent (Tan h) function, a rectified linear unit (ReLU) function, a leaky ReLU function, or a maxout function. In an embodiment, the activation function data D_AF_LUT may be arrayed in a look-up table (LUT) form. In the present embodiment, the activation function data D_AF_LUT may be stored in the second rows ROW1 of the first left memory bank BK0(L) and the first right memory bank BK0(R). The activation function data D_AF_LUT stored in the first left memory bank BK0(L) and the first right memory bank BK0(R) may also be stored in the second row ROW1 of each of the second to sixteenth left memory banks BK1(L)~BK15(L) and the second row ROW1 of each of the second to sixteenth right memory banks BK1(R)~BK15(R). In order to process or apply the activation function, it may be necessary to activate the second rows ROW1 of the memory banks in which the activation function data D_AF_LUT are stored by the activation signal ACTA. The activation function logic circuit (AF_ALU of FIG. 52) of the first output circuit (OUT0 of GOH. 52) may process the activation function for the MAC result data MAC0 using the activation function data D_AF_LUT stored in the memory banks.

Figure 54:
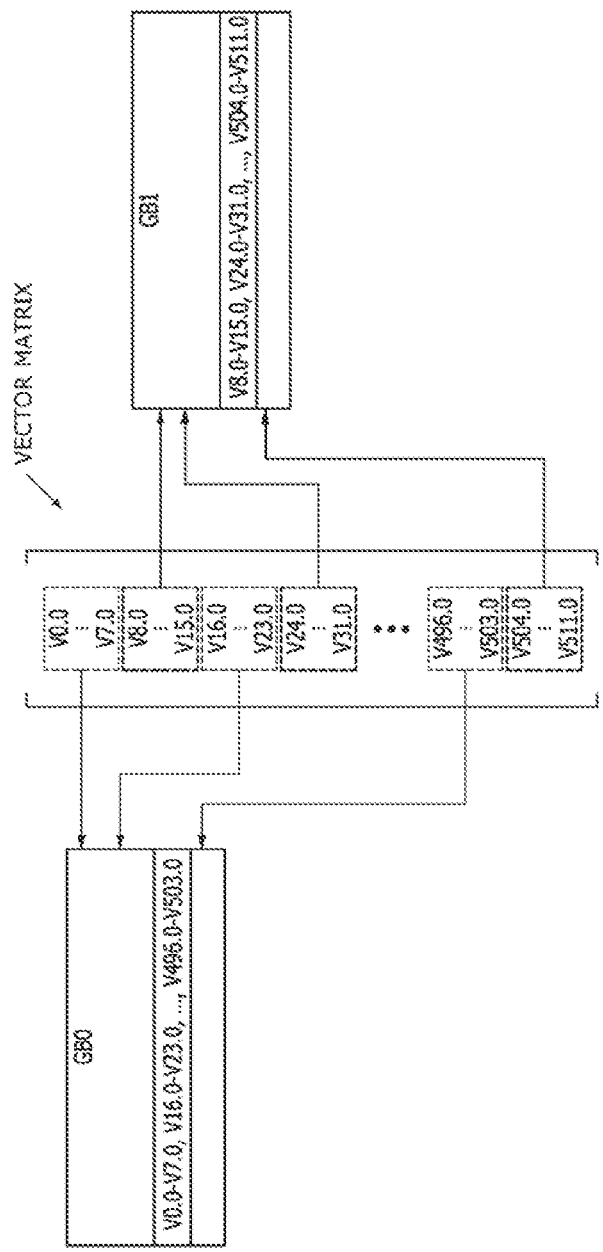
FIG. 54 illustrates a process for storing vector data into a first global buffer and a second global buffer included in the PIM device illustrated in FIG. 50.

FIG. 54 illustrates a process for storing the vector data into the first global buffer GB0 and the second global buffer GB1 included in the PIM device 600 illustrated in FIG. 50. Referring to FIG. 54, the vector data V0.0~V511.0 of the vector matrix illustrated in FIG. 35 may be disposed to be evenly allocated to the first global buffer GB0 and the second global buffer GB1 by the unit operation size. Because the unit operation size is set to be 256 bits in the present embodiment, the vector data V0.0~V511.0 may be categorized as either left vector data to be stored into the first global buffer GB0 or right vector data to be stored into the second global buffer GB1. Specifically, a first group of 16 sets of the vector data (i.e., the first to sixteenth vector data V0.0~V15.0) may be evenly stored in the first global buffer GB0 and the second global buffer GB1. That is, the first to eighth vector data V0.0~V7.0 may be stored in the first global buffer GB0 to provide first left vector data, and the ninth to sixteenth vector data V8.0~V15.0 may be stored in the second global buffer GB1 to provide first right vector data. A second group of 16 sets of the vector data (i.e., the seventeenth to $32^{nd}$ vector data V16.0~V31.0) may also be evenly stored in the first global buffer GB0 and the second global buffer GB1. That is, the seventeenth to $24^{th}$ vector data V16.0~V23.0 may be stored in the first global buffer GB0 to provide second left vector data, and the $25^{th}$ to $32^{nd}$ vector data V24.0~V31.0 may be stored in the second global buffer GB1 to provide second right vector data. Similarly, a $32^{nd}$ group of 16 sets of the vector data (i.e., the $497^{th}$ to $512^{th}$ vector data V496.0~V511.0) may also be evenly stored in the first global buffer GB0 and the second global buffer GB1. That is, the $497^{th}$ to $504^{th}$ vector data V496.0~V503.0 may be stored in the first global buffer GB0 to provide $32^{nd}$ left vector data, and the $505^{th}$ to $512^{th}$ vector data V504.0~V511.0 may be stored in the second global buffer GB1 to provide $32^{nd}$ right vector data.

According to the PIM device 600, each of the MAC units may perform the MAC operation using 16 sets of the weight data and 16 sets of the vector data as input data. Thus, the first MAC operator MAC0 including the first left MAC operator MAC0(L) and the first right MAC operator MAC0(R) may perform the MAC operation 32 times to generate the first MAC result data MAC0.0 of the MAC result matrix illustrated in FIG. 35. Because the first to sixteenth MAC operators MAC0~MAC15 are configured to perform the MAC operations in parallel, the first to sixteenth MAC operators MAC0~MAC15 may generate the first to $16^{th}$ MAC result data MAC0.0~MAC15.0 of the MAC result matrix illustrated in FIG. 35 in the event that each of the first to sixteenth MAC operators MAC0~MAC15 performs the MAC operation 32 times. Thus, in order to generate all of the first to $512^{th}$ MAC result data MAC0.0~MAC511.0 of the MAC result matrix illustrated in FIG. 35, each of the each of the first to sixteenth MAC operators MAC0~MAC15 has to perform the MAC operation '32×32' times.

Figure 55:
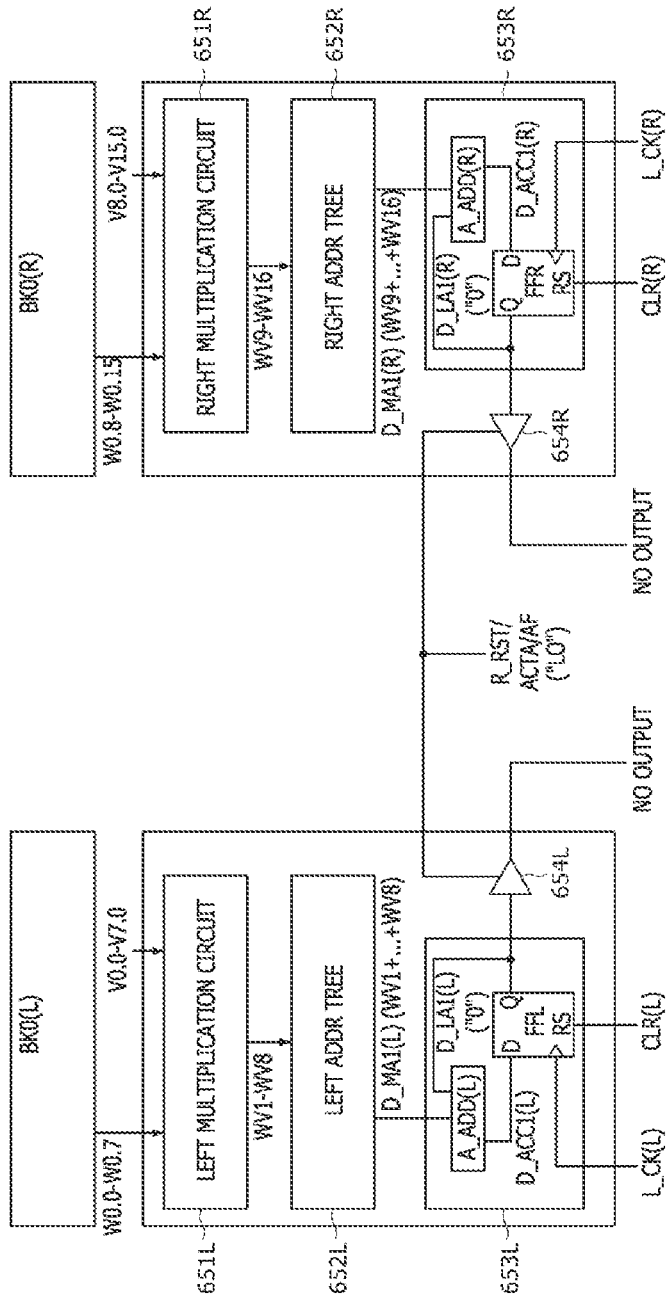
FIG. 55 illustrates a first MAC operation among 32 MAC operations for generating first MAC result data in the first MAC unit illustrated in FIG. 51.

FIG. 55 illustrates a first MAC operation among 32 MAC operations for generating the first MAC result data MAC0.0 in the first MAC unit MU0 illustrated in FIG. 51. Referring to FIG. 55, the left multiplication circuit 651L of the first left MAC operator MAC0(L) may receive the first left weight data W0.0~W0.7, which are located at cross points of the first row and the first to eighth columns of the weight matrix illustrated in FIG. 35, from the first left memory bank BK0(L). In addition, the left multiplication circuit 651L may receive the first left vector data V0.0~V7.0, which are arrayed in the first to eighth rows of the vector matrix illustrated in FIG. 35, from the first global buffer GB0 illustrated in FIG. 50. The first to eighth multipliers (MUL(0)~MUL(7) of FIG. 51) of the left multiplication circuit 651L may perform multiplying calculations of the first left weight data W0.0~W0.7 and the first left vector data V0.0~V7.0 to generate the first to eighth multiplication result data WV1~WV8. The first to eighth multiplication result data WV1~WV8 may be transmitted to the left adder tree 652L.

The left adder tree 652L may perform adding calculations of the first to eighth multiplication result data WV1~WV8 output from the left multiplication circuit 651L to generate and output first left addition result data D_MA1(L) having a value of "WV1+WV2+ . . . +WV8". The adding calculations of the left adder tree 652L may be performed in the same way as the adding calculations described with reference to FIG. 51. Thus, the descriptions of the adding calculations performed by the left adder tree 652L will be omitted hereinafter to avoid duplicate explanation. The left adder tree 652L may transmit the first left addition result data D_MA1(L) to the left accumulative adder A_ADD(L) of the left accumulator 653L. The left accumulative adder A_ADD(L) of the left accumulator 653L may add the first left addition result data D_MA1(L) output from the left adder tree 652L to first left latched data D_LA1(L) output from the left latch circuit FFL to generate first left accumulated data D_ACC1(L). As described with reference to FIG. 51, because the left latch circuit FFL is reset prior to the first MAC operation, the first left latched data D_LA1(L) may have a value of zero during the first MAC operation. Accordingly, the first left accumulated data D_ACC1(L) may have the same data as the first left addition result data D_MA1(L). The left accumulative adder A_ADD(L) may transmit the first left accumulated data D_ACC1(L) to the input terminal D of the left latch circuit FFL.

The left latch circuit FFL may be synchronized with a pulse of the left clock signal L_CK(L) to latch the first left accumulated data D_ACC1(L) input through the input terminal D of the left latch circuit FFL. In addition, the left latch circuit FFL may output the first left accumulated data D_ACC1(L) through the output terminal Q of the left latch circuit FFL. Although not shown in FIG. 55, the first left accumulated data D_ACC1(L) output from the left latch circuit FFL may be temporarily stored in a register and may be used as second left latched data which are transmitted to the left accumulative adder A_ADD(L) during the next MAC operation (i.e., a second MAC operation). The first left accumulated data D_ACC1(L) output from the left latch circuit FFL may also be transmitted to the left output buffer 654L. Because all of the MAC operations for generating the first MAC result data M0.0 do not terminate, all of the first MAC read signal R_RST, the activation signal ACTA, and the activation function signal AF have a logic "low" level. Thus, no output data are generated by the first left MAC operator MAC0(L).

The right multiplication circuit 651R of the first right MAC operator MAC0(R) may receive the first right weight data W0.8~W0.15, which are located at cross points of the first row and the ninth to sixteenth columns of the weight matrix illustrated in FIG. 35, from the first right memory bank BK0(R). In addition, the right multiplication circuit 651R may receive the first right vector data V8.0~V15.0, which are arrayed in the ninth to sixteenth rows of the vector matrix illustrated in FIG. 35, from the second global buffer GB1 illustrated in FIG. 50. The ninth to sixteenth multipliers (MUL(8)~MUL(15) of FIG. 51) of the right multiplication circuit 651R may perform multiplying calculations of the first right weight data W0.8~W0.15 and the first right vector data V8.0~V15.0 to generate the ninth to sixteenth multiplication result data WV9~WV16. The ninth to sixteenth multiplication result data WV9~WV16 may be transmitted to the right adder tree 652R.

The right adder tree 652R may perform adding calculations of the ninth to sixteenth multiplication result data WV9~WV16 output from the right multiplication circuit 651R to generate and output first right addition result data D_MA1(R) having a value of "WV9+WV10+ . . . +WV16". The adding calculations of the right adder tree 652R may be performed in the same way as the adding calculations described with reference to FIG. 51. Thus, the descriptions of the adding calculations performed by the right adder tree 652R will be omitted hereinafter to avoid duplicate explanation. The right adder tree 652R may transmit the first right addition result data D_MA1(R) to the right accumulative adder A_ADD(R) of the right accumulator 653R. The right accumulative adder A_ADD(R) of the right accumulator 653R may add the first right addition result data D_MA1(R) output from the right adder tree 652R to first right latched data D_LA1(R) output from the right latch circuit FFR to generate first right accumulated data D_ACC1(R). As described with reference to FIG. 51, because the right latch circuit FFR is reset prior to the first MAC operation, the first right latched data D_LA1(R) may have a value of zero during the first MAC operation. Accordingly, the first right accumulated data D_ACC1(R) may have the same data as the first right addition result data D_MA1(R). The right accumulative adder A_ADD(R) may transmit the first right accumulated data D_ACC1(R) to the input terminal D of the right latch circuit FFR.

The right latch circuit FFR may be synchronized with a pulse of the right clock signal L_CK(R) to latch the first right accumulated data D_ACC1(R) input through the input terminal D of the right latch circuit FFR. In addition, the right latch circuit FFR may output the first right accumulated data D_ACC1(R) through the output terminal Q of the right latch circuit FFR. Although not shown in FIG. 55, the first right accumulated data D_ACC1(R) output from the right latch circuit FFR may be temporarily stored in a register and may be used as second right latched data which are transmitted to the right accumulative adder A_ADD(R) during the next MAC operation (i.e., the second MAC operation). The first right accumulated data D_ACC1(R) output from the right latch circuit FFR may also be transmitted to the right output buffer 654R. Because all of the MAC operations for generating the first MAC result data M0.0 do not terminate, all of the first MAC read signal R_RST, the activation signal ACTA, and the activation function signal AF have a logic "low" level. Thus, no output data are generated by the first right MAC operator MAC0(R).

As described above, even though the first MAC operation terminates, no data are transmitted from the first left MAC operator MAC0(L) and the first right MAC operator MAC0(R) to the first output circuit (OUT0 of FIG. 51). Thus, no data are generated by the additional adder AD_ADD included in the first output circuit OUT0 illustrated in FIG. 52. Accordingly, the activation function logic circuit AF_ALU of the first output circuit OUT0 does not output any data. That is, even though the first MAC operation terminates, no data are output from the first output circuit OUT0.

Figure 56:
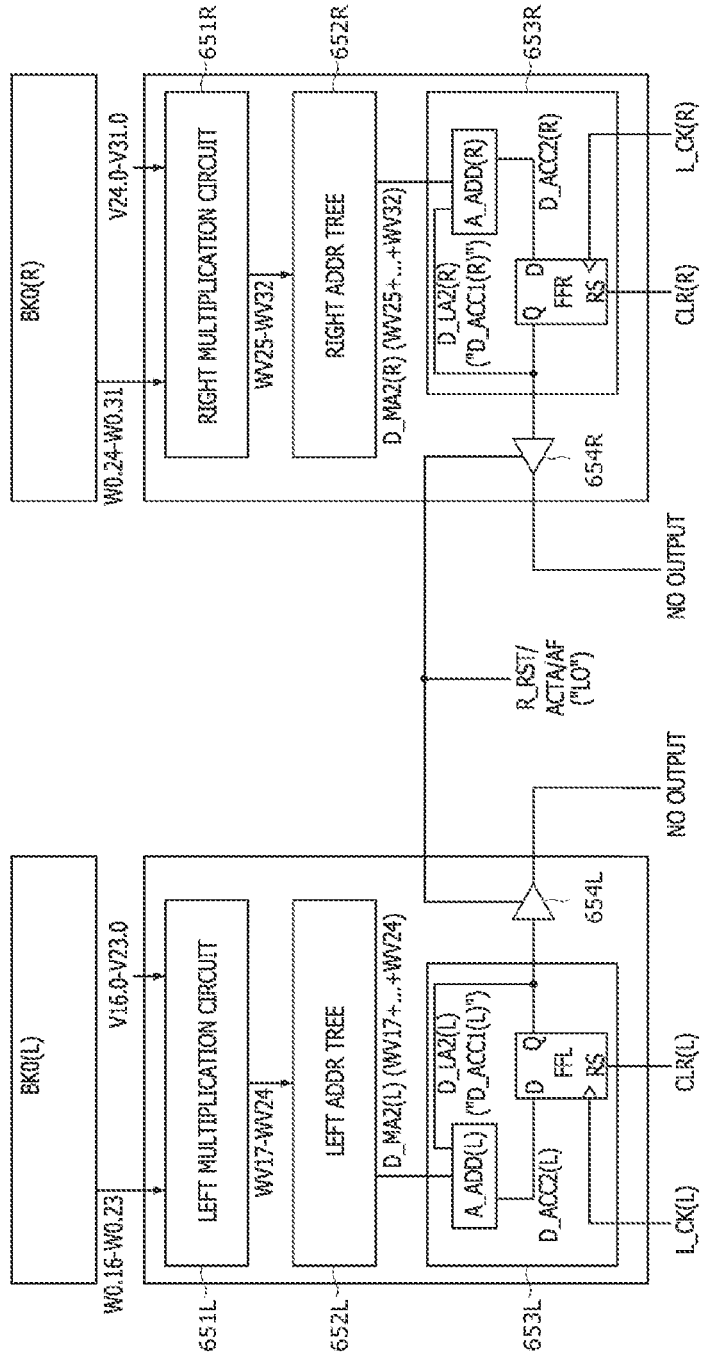
FIG. 56 illustrates a second MAC operation among 32 MAC operations for generating first MAC result data in the first MAC unit illustrated in FIG. 51.

FIG. 56 illustrates the second MAC operation among the 32 MAC operations for generating the first MAC result data MAC0.0 in the first MAC unit MU0 illustrated in FIG. 51. Referring to FIG. 56, the left multiplication circuit 651L of the first left MAC operator MAC0(L) may receive the second left weight data W0.16~W0.23, which are located at cross points of the first row and the seventeenth to $24^{th}$ columns of the weight matrix illustrated in FIG. 35, from the first left memory bank BK0(L). In addition, the left multiplication circuit 651L may receive the second left vector data V16.0~V23.0, which are arrayed in the seventeenth to $24^{th}$ rows of the vector matrix illustrated in FIG. 35, from the first global buffer GB0 illustrated in FIG. 50. The first to eighth multipliers (MUL(0)~MUL(7) of FIG. 51) of the left multiplication circuit 651L may perform multiplying calculations of the second left weight data W0.16~W0.23 and the second left vector data V16.0~V23.0 to generate the seventeenth to $24^{th}$ multiplication result data WV17~WV24. The seventeenth to $24^{th}$ multiplication result data WV17~WV24 may be transmitted to the left adder tree 652L.

The left adder tree 652L may perform adding calculations of the seventeenth to $24^{th}$ multiplication result data WV17~WV24 output from the left multiplication circuit 651L to generate and output second left addition result data D_MA2(L) having a value of "WV17+WV18+ . . . +WV24". The adding calculations of the left adder tree 652L may be performed in the same way as the adding calculations described with reference to FIG. 51. Thus, the descriptions of the adding calculations performed by the left adder tree 652L will be omitted hereinafter to avoid duplicate explanation. The left adder tree 652L may transmit the second left addition result data D_MA2(L) to the left accumulative adder A_ADD(L) of the left accumulator 653L. The left accumulative adder A_ADD(L) of the left accumulator 653L may add the second left addition result data D_MA2(L) output from the left adder tree 652L to second left latched data D_LA2(L) output from the left latch circuit FFL to generate second left accumulated data D_ACC2(L). As described with reference to FIG. 55, the first left accumulated data D_ACC1(L) latched in the left latch circuit FFL during the first MAC operation may be used as the second left latched data D_LA2(L) during the second MAC operation. Thus, the second left accumulated data D_ACC2(L) may have a value of "WV1+WV2+ . . . +WV8+WV17+WV18+ . . . +WV24" corresponding to a sum of the first to eighth multiplication result data WV1~WV8 and the seventeenth to $24^{th}$ multiplication result data WV17~WV24. The left accumulative adder A_ADD(L) may transmit the second left accumulated data D_ACC2(L) to the input terminal D of the left latch circuit FFL.

The left latch circuit FFL may be synchronized with a pulse of the left clock signal L_CK(L) to latch the second left accumulated data D_ACC2(L) input through the input terminal D of the left latch circuit FFL. In addition, the left latch circuit FFL may output the second left accumulated data D_ACC2(L) through the output terminal Q of the left latch circuit FFL. Although not shown in FIG. 56, the second left accumulated data D_ACC2(L) output from the left latch circuit FFL may be temporarily stored in a register and may be used as third left latched data which are transmitted to the left accumulative adder A_ADD(L) during the next MAC operation (i.e., a third MAC operation). The second left accumulated data D_ACC2(L) output from the left latch circuit FFL may also be transmitted to the left output buffer 654L. Because all of the MAC operations for generating the first MAC result data M0.0 do not terminate, all of the first MAC read signal R_RST, the activation signal ACTA, and the activation function signal AF have a logic "low" level. Thus, no output data are generated by the first left MAC operator MAC0(L).

The right multiplication circuit 651R of the first right MAC operator MAC0(R) may receive the second right weight data W0.24~W0.31, which are located at cross points of the first row and the $25^{th}$ to $32^{nd}$ columns of the weight matrix illustrated in FIG. 35, from the first right memory bank BK0(R). In addition, the right multiplication circuit 651R may receive the second right vector data V24.0~V31.0, which are arrayed in the $25^{th}$ to $32^{nd}$ rows of the vector matrix illustrated in FIG. 35, from the second global buffer GB1 illustrated in FIG. 50. The ninth to sixteenth multipliers (MUL(8)~MUL(15) of FIG. 51) of the right multiplication circuit 651R may perform multiplying calculations of the second right weight data W0.24~W0.31 and the second right vector data V24.0~V31.0 to generate the $25^{th}$ to $32^{nd}$ multiplication result data WV25~WV32. The $25^{th}$ to $32^{nd}$ multiplication result data WV25~WV32 may be transmitted to the right adder tree 652R.

The right adder tree 652R may perform adding calculations of the $25^{th}$ to $32^{nd}$ multiplication result data WV25~WV32 output from the right multiplication circuit 651R to generate and output second right addition result data D_MA2(R) having a value of "WV25+WV26+ . . . +WV32". The adding calculations of the right adder tree 652R may be performed in the same way as the adding calculations described with reference to FIG. 51. Thus, the descriptions of the adding calculations performed by the right adder tree 652R will be omitted hereinafter to avoid duplicate explanation. The right adder tree 652R may transmit the second right addition result data D_MA2(R) to the right accumulative adder A_ADD(R) of the right accumulator 653R. The right accumulative adder A_ADD(R) of the right accumulator 653R may add the second right addition result data D_MA2(R) output from the right adder tree 652R to second right latched data D_LA2(R) output from the right latch circuit FFR to generate second right accumulated data D_ACC2(R). As described with reference to FIG. 55, the first right accumulated data D_ACC1(R) latched in the right latch circuit FFR during the first MAC operation may be used as the second right latched data D_LA2(R) during the second MAC operation. Thus, the second right accumulated data D_ACC2(R) may have a value of "WV9+WV10+ . . . +WV16+WV25+WV26+ . . . +WV32" corresponding to a sum of the ninth to sixteenth multiplication result data WV9~WV16 and the $25^{th}$ to $32^{nd}$ multiplication result data WV25~WV32. The right accumulative adder A_ADD(R) may transmit the second right accumulated data D_ACC2(R) to the input terminal D of the right latch circuit FFR.

The right latch circuit FFR may be synchronized with a pulse of the right clock signal L_CK(R) to latch the second right accumulated data D_ACC2(R) input through the input terminal D of the right latch circuit FFR. In addition, the right latch circuit FFR may output the second right accumulated data D_ACC2(R) through the output terminal Q of the right latch circuit FFR. Although not shown in FIG. 56, the second right accumulated data D_ACC2(R) output from the right latch circuit FFR may be temporarily stored in a register and may be used as third right latched data which are transmitted to the right accumulative adder A_ADD(R) during the next MAC operation (i.e., the third MAC operation). The second right accumulated data D_ACC2(R) output from the right latch circuit FFR may also be transmitted to the right output buffer 654R. Because all of the MAC operations for generating the first MAC result data M0.0 do not terminate, all of the first MAC read signal R_RST, the activation signal ACTA, and the activation function signal AF have a logic "low" level. Thus, no output data are generated by the first right MAC operator MAC0(R).

As described above, even though the second MAC operation terminates, no data are transmitted from the first left MAC operator MAC0(L) and the first right MAC operator MAC0(R) to the first output circuit (OUT0 of FIG. 51). Thus, no data are generated by the additional adder AD_ADD included in the first output circuit OUT0 illustrated in FIG. 52. Accordingly, the activation function logic circuit AF_ALU of the first output circuit OUT0 does not output any data. That is, even though the second MAC operation terminates, no data are output from the first output circuit OUT0. Similarly, even though the third to $31^{st}$ MAC operations terminate, no data are output from the first output circuit OUT0.

Figure 57:
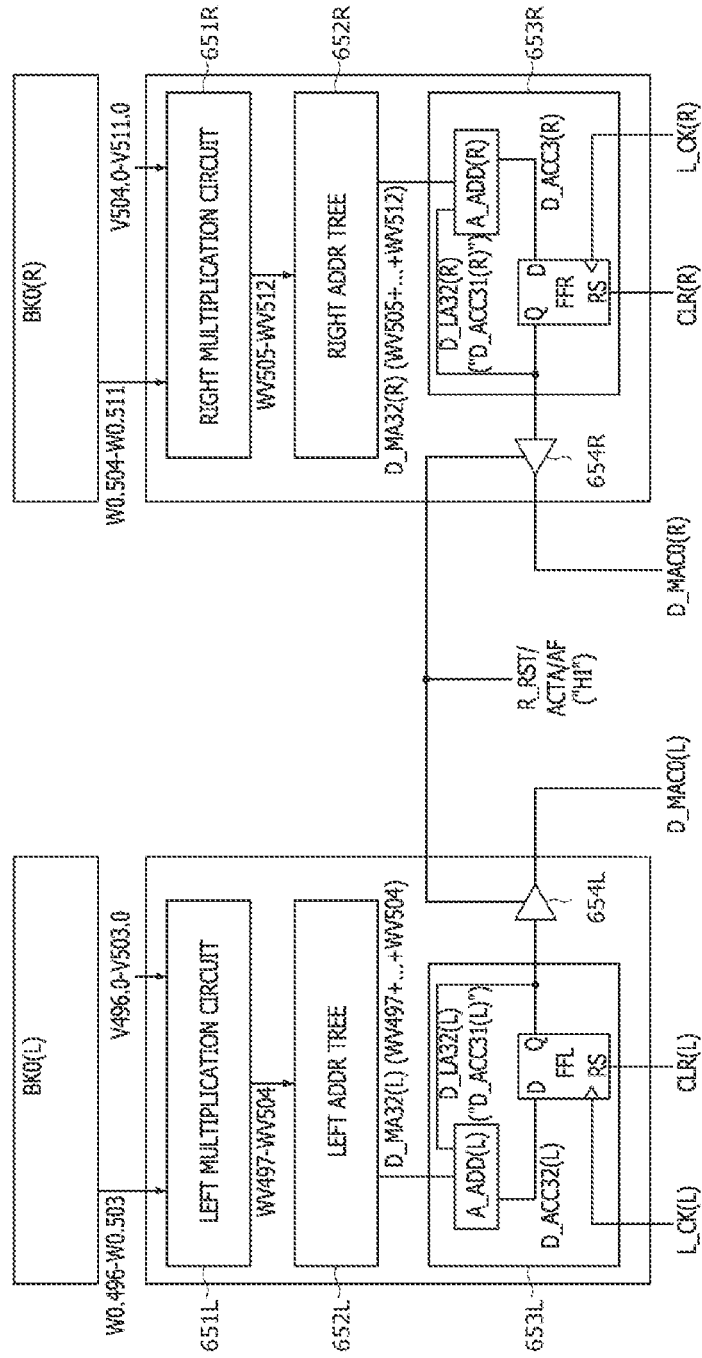
FIG. 57 illustrates a $32^{nd}$ MAC operation corresponding to the last MAC operation among 32 MAC operations for generating first MAC result data in the first MAC unit illustrated in FIG. 51.

FIG. 57 illustrates a $32^{nd}$ MAC operation corresponding to the last MAC operation among the 32 MAC operations for generating the first MAC result data MAC0.0 in the first MAC unit MU0 illustrated in FIG. 51. Referring to FIG. 57, the left multiplication circuit 651L of the first left MAC operator MAC0(L) may receive the $32^{nd}$ left weight data W0.496~W0.503, which are located at cross points of the first row and the $497^{th}$ to $504^{th}$ columns of the weight matrix illustrated in FIG. 35, from the first left memory bank BK0(L). In addition, the left multiplication circuit 651L may receive the $32^{nd}$ left vector data V496.0~V503.0, which are arrayed in the $497^{th}$ to $504^{th}$ rows of the vector matrix illustrated in FIG. 35, from the first global buffer GB0 illustrated in FIG. 50. The first to eighth multipliers (MUL(0)~MUL(7) of FIG. 51) of the left multiplication circuit 651L may perform multiplying calculations of the $32^{nd}$ left weight data W0.496~W0.503 and the $32^{nd}$ left vector data V496.0~V503.0 to generate the $497^{th}$ to $504^{th}$ multiplication result data WV497~WV504. The $497^{th}$ to $504^{th}$ multiplication result data WV497~WV504 may be transmitted to the left adder tree 652L.

The left adder tree 652L may perform adding calculations of the $497^{th}$ to $504^{th}$ multiplication result data WV497~WV504 output from the left multiplication circuit 651L to generate and output $32^{nd}$ left addition result data D_MA32(L) having a value of "WV497+WV498+ . . . +WV504". The adding calculations of the left adder tree 652L may be performed in the same way as the adding calculations described with reference to FIG. 51. Thus, the descriptions of the adding calculations performed by the left adder tree 652L will be omitted hereinafter to avoid duplicate explanation. The left adder tree 652L may transmit the $32^{nd}$ left addition result data D_MA32(L) to the left accumulative adder A_ADD(L) of the left accumulator 653L. The left accumulative adder A_ADD(L) of the left accumulator 653L may add the $32^{nd}$ left addition result data D_MA32(L) output from the left adder tree 652L to $32^{nd}$ left latched data D_LA32(L) output from the left latch circuit FFL to generate $32^{nd}$ left accumulated data D_ACC32(L). As described with reference to FIG. 55, $31^{st}$ left accumulated data D_ACC31(L) latched in the left latch circuit FFL during previous MAC operation (i.e., the $31^{st}$ MAC operation) may be used as the $32^{nd}$ left latched data D_LA32(L) during the $32^{nd}$ MAC operation. Thus, the $32^{nd}$ left accumulated data D_ACC32(L) may have a value of data which are obtained by multiplying calculations and adding calculations for all of the left weight data and all of the left vector data. The left accumulative adder A_ADD(L) may transmit the $32^{nd}$ left accumulated data D_ACC32(L) to the input terminal D of the left latch circuit FFL.

The left latch circuit FFL may be synchronized with a pulse of the left clock signal L_CK(L) to latch the $32^{nd}$ left accumulated data D_ACC32(L) input through the input terminal D of the left latch circuit FFL. In addition, the left latch circuit FFL may output the $32^{nd}$ left accumulated data D_ACC32(L) through the output terminal Q of the left latch circuit FFL. The left latch circuit FFL may be reset in response to the left clear signal CLR(L) having a logic "high" level after outputting the $32^{nd}$ left accumulated data D_ACC32(L). The $32^{nd}$ left accumulated data D_ACC32(L) output from the left latch circuit FFL may also be transmitted to the left output buffer 654L. Because all of the MAC operations for generating the first MAC result data M0.0 terminate, any one of the first MAC read signal R_RST, the activation signal ACTA, and the activation function signal AF may have a logic "high" level. Thus, the left output buffer 654L may output the first left MAC data D_MAC0(L) corresponding to the $32^{nd}$ left accumulated data D_ACC32(L) to the first output circuit OUT0.

The right multiplication circuit 651R of the first right MAC operator MAC0(R) may receive the $32^{nd}$ right weight data W0.504~W0.511, which are located at cross points of the first row and the $505^{th}$ to $512^{th}$ columns of the weight matrix illustrated in FIG. 35, from the first right memory bank BK0(R). In addition, the right multiplication circuit 651R may receive the $32^{nd}$ right vector data V504.0~V511.0, which are arrayed in the $505^{th}$ to $512^{th}$ rows of the vector matrix illustrated in FIG. 35, from the second global buffer GB1 illustrated in FIG. 50. The ninth to sixteenth multipliers (MUL(8)~MUL(15) of FIG. 51) of the right multiplication circuit 651R may perform multiplying calculations of the $32^{nd}$ right weight data W0.504~W0.511 and the second right vector data V504.0~V511.0 to generate the $505^{th}$ to $512^{th}$ multiplication result data WV505~WV512. The $505^{th}$ to $512^{th}$ multiplication result data WV505~WV512 may be transmitted to the right adder tree 652R.

The right adder tree 652R may perform adding calculations of the $505^{th}$ to $512^{th}$ multiplication result data WV505~WV512 output from the right multiplication circuit 651R to generate and output $32^{nd}$ right addition result data D_MA32(R) having a value of "WV505+WV506+ . . . +WV512". The adding calculations of the right adder tree 652R may be performed in the same way as the adding calculations described with reference to FIG. 51. Thus, the descriptions of the adding calculations performed by the right adder tree 652R will be omitted hereinafter to avoid duplicate explanation. The right adder tree 652R may transmit the $32^{nd}$ right addition result data D_MA32(R) to the right accumulative adder A_ADD(R) of the right accumulator 653R. The right accumulative adder A_ADD(R) of the right accumulator 653R may add the $32^{nd}$ right addition result data D_MA32(R) output from the right adder tree 652R to $32^{nd}$ right latched data D_LA32(R) output from the right latch circuit FFR to generate $32^{nd}$ right accumulated data D_ACC32(R). As described with reference to FIG. 55, $31^{st}$ right accumulated data D_ACC31(R) latched in the right latch circuit FFR during the $31^{st}$ MAC operation may be used as the $32^{nd}$ right latched data D_LA32(R) during the $32^{nd}$ MAC operation. Thus, the $32^{nd}$ right accumulated data D_ACC32(R) may have a value of data which are obtained by multiplying calculations and adding calculations for all of the right weight data and all of the right vector data. The right accumulative adder A_ADD(R) may transmit the $32^{nd}$ right accumulated data D_ACC32(R) to the input terminal D of the right latch circuit FFR.

The right latch circuit FFR may be synchronized with a pulse of the right clock signal L_CK(R) to latch the $32^{nd}$ right accumulated data D_ACC32(R) input through the input terminal D of the right latch circuit FFR. In addition, the right latch circuit FFR may output the $32^{nd}$ right accumulated data D_ACC32(R) through the output terminal Q of the right latch circuit FFR. The right latch circuit FFR may be reset in response to the right clear signal CLR(R) having a logic "high" level after outputting the $32^{nd}$ right accumulated data D_ACC32(R). The $32^{nd}$ right accumulated data D_ACC32(R) output from the right latch circuit FFR may also be transmitted to the right output buffer 654R. Because all of the MAC operations for generating the first MAC result data M0.0 terminate, any one of the first MAC read signal R_RST, the activation signal ACTA, and the activation function signal AF may have a logic "high" level. Thus, the right output buffer 654R may output the first right MAC data D_MAC0(R) corresponding to the $32^{nd}$ right accumulated data D_ACC32(R) to the first output circuit OUT0. As such, if the $32^{nd}$ MAC operation terminates, the first left MAC data D_MAC0(L) and the first right MAC data D_MAC0(R) output from the first left MAC operator MAC0(L) and the first right MAC operator MAC0(R) may be transmitted to the first output circuit (OUT0 of FIG. 51).

Figure 58:
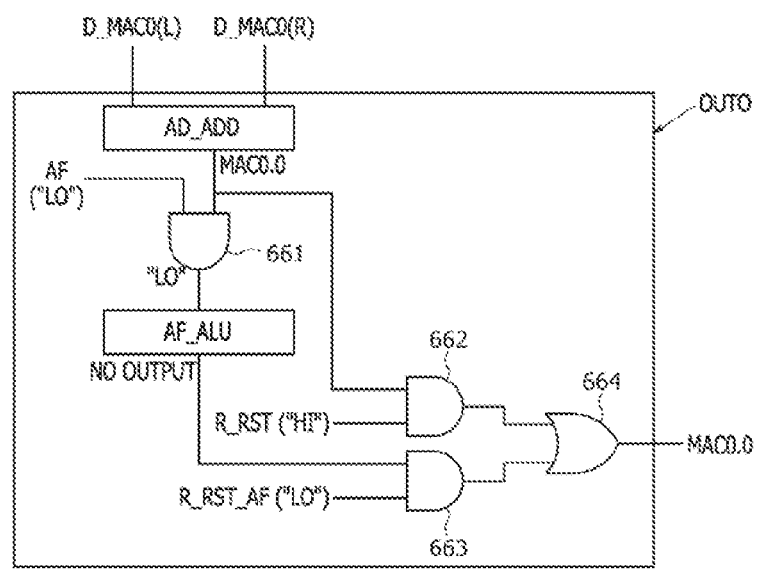
FIG. 58 illustrates an example of an operation of a first output circuit included in the first MAC unit illustrated in FIG. 51.

FIG. 58 illustrates an example of an operation of the first output circuit OUT0 included in the first MAC unit MU0 illustrated in FIG. 51. The example illustrated in FIG. 58 will be described in conjunction with an operation for outputting the first MAC result data MAC0.0 without processing or applying the activation function. In FIG. 58, the same reference numerals or symbols as used in FIG. 52 denote the same elements. Referring to FIG. 58, when the first left MAC data D_MAC0(L) and the first right MAC data D_MAC0(R) are transmitted from the first left MAC operator MAC0(L) and the first right MAC operator MAC0(R) to the additional adder AD_ADD of the first output circuit OUT0, the additional adder AD_ADD may perform an adding calculation of the first left MAC data D_MAC0(L) and the first right MAC data D_MAC0(R) to generate the first MAC result data MAC0.0. The first MAC result data MAC0.0 may correspond to data which are located in the first row of the MAC result matrix illustrated in FIG. 35. Thus, the first MAC result data MAC0.0 may correspond to data which are generated by a matrix multiplication calculation on the weight data W0.0~W0.511 arrayed in the first row of the weight matrix illustrated in FIG. 35 and the vector data V0.0~V511.0 of the vector matrix illustrated in FIG. 35. The additional adder AD_ADD may output the first MAC result data MAC0.0 to the first AND gate 661 and the second AND gate 662.

Because no activation function is processed, the first AND gate 661 may receive the activation function signal AF having a logic "low" level. Thus, an output signal of the first AND gate 661 may have a logic "low" level. The activation function logic circuit AF_ALU does not process any activation function and does not output any data. Because no activation function is processed, the third AND gate 663 may receive the second MAC read signal R_RST_AF having a logic "low" level and may output a signal having a logic "low" level. The second AND gate 662 may receive the first MAC result data MAC0.0 from the additional adder AD_ADD and may also receive the first MAC read signal R_RST having a logic "high" level. Thus, the second AND gate 662 may output the first MAC result data MAC0.0. The OR gate 664 may receive the first MAC result data MAC0.0 from the second AND gate 662 and may also receive a signal having a logic "low" level from the third AND gate 663. The OR gate 664 may output the first MAC result data MAC0.0 as a result of the logical OR operation of the OR gate 664.

Figure 59:
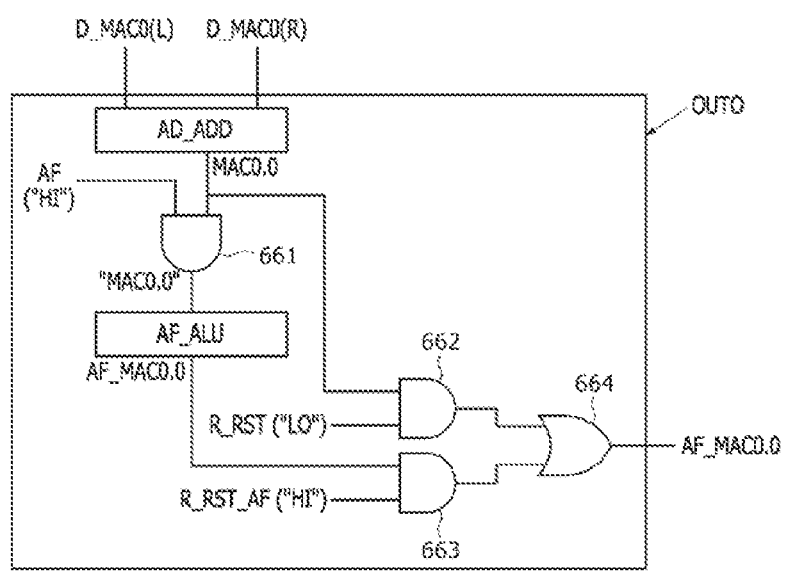
FIG. 59 illustrates another example of an operation of a first output circuit included in the first MAC unit illustrated in FIG. 51.

FIG. 59 illustrates another example of an operation of the first output circuit OUT0 included in the first MAC unit MU0 illustrated in FIG. 51. The example illustrated in FIG. 59 will be described in conjunction with an operation for outputting the first activation function-processed MAC result data AF_MAC0.0. In FIG. 59, the same reference numerals or symbols as used in FIG. 52 denote the same elements. Referring to FIG. 59, when the first left MAC data D_MAC0(L) and the first right MAC data D_MAC0(R) are transmitted from the first left MAC operator MAC0(L) and the first right MAC operator MAC0(R) to the additional adder AD_ADD of the first output circuit OUT0, the additional adder AD_ADD may perform an adding calculation of the first left MAC data D_MAC0(L) and the first right MAC data D_MAC0(R) to generate the first MAC result data MAC0.0. The additional adder AD_ADD may transmit the first MAC result data MAC0.0 to the first AND gate 661 and the second AND gate 662.

Because the activation function is processed, the first AND gate 661 may receive the activation function signal AF having a logic "high" level. Thus, the first AND gate 661 may output the first MAC result data MAC0.0. The activation function logic circuit AF_ALU may apply the activation function to the first MAC result data MAC0.0 using the activation function data (D_AF_LUT of FIG. 53) stored in the first left memory bank BK0(L) and the first right memory bank BK0(R). The activation function logic circuit AF_ALU may generate and output the first activation function-processed MAC result data AF_MAC0.0. Because the activation function is applied to the first MAC result data MAC0.0 by the activation function logic circuit AF_ALU, the first MAC read signal R_RST input to the second AND gate 662 may have a logic "low" level. Thus, the second AND gate 662 may output a signal having a logic "low" level. The third AND gate 663 may receive the second MAC read signal R_RST_AF having a logic "high" level with the first activation function-processed MAC result data AF_MAC0.0 which are output from the activation function logic circuit AF_ALU. Thus, the third AND gate 663 may output the first activation function-processed MAC result data AF_MAC0.0. The OR gate 664 may receive a signal having a logic "low" level from the second AND gate 662 and may also receive the first activation function-processed MAC result data AF_MAC0.0 from the third AND gate 663. The OR gate 664 may output the first activation function-processed MAC result data AF_MAC0.0 as a result of the logical OR operation of the OR gate 664.

A limited number of possible embodiments for the present teachings have been presented above for illustrative purposes. Those of ordinary skill in the art will appreciate that various modifications, additions, and substitutions are possible. While this patent document contains many specifics, these should not be construed as limitations on the scope of the present teachings or of what may be claimed, but rather as descriptions of features that may be specific to particular embodiments. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A processing-in-memory (PIM) device comprising:
a plurality of memory banks, wherein each of the plurality of memory banks includes a left memory bank configured for providing left weigh data and a right memory bank configured for providing right weigh data;
a first global buffer configured to provide left vector data;
a second global buffer configured to provide right vector data;
a plurality of multiplying-and-accumulating (MAC) operators, wherein each of the plurality of MAC operators includes a left MAC operator configured for performing a MAC operation on the left weight data and the left vector data to generate and output left MAC data and a right MAC operator configured for performing a MAC operation on the right weight data and the right vector data to generate and output right MAC data; and
a plurality of output circuits, wherein each of the plurality of output circuits are configured to add the left MAC data to the right MAC data to generate MAC result data,
wherein each of the plurality of output circuits is configured to output one of the MAC result data and activation function-processed MAC result data in response to a first MAC read signal and a second MAC read signal.

2. The PIM device of claim 1, further comprising a data input and output (I/O) circuit providing a data transmission path through which output data of the PIM device are transmitted to an external device coupled to the PIM device,
wherein the data I/O circuit includes:
a plurality of left data I/O circuits providing transmission paths that transmit read data output from the left memory banks or write data input to the left memory banks; and
a plurality of right data I/O circuits providing transmission paths that transmit read data output from the right memory banks or write data input to the right memory banks.

3. The PIM device of claim 1, wherein the left memory bank and the right memory bank included in each of the plurality of memory banks are physically distinguished from each other and are disposed to be adjacent to each other.

4. The PIM device of claim 3, wherein the left MAC operator and the right MAC operator included in each of the plurality of MAC operators are physically distinguished from each other and are disposed to be adjacent to each other.

5. The PIM device of claim 1,
wherein the left MAC operators are disposed to be allocated to the left memory banks, respectively; and
wherein the right MAC operators are disposed to be allocated to the right memory banks, respectively.

6. The PIM device of claim 5, wherein the plurality of output circuits are disposed to be allocated to the plurality of MAC operators, respectively.

7. The PIM device of claim 6, wherein the left MAC operator includes:
a left multiplication circuit configured to perform a multiplying calculation on the left weight data and the left vector data to generate and output left multiplication result data;
a left adder tree configured to perform an adding calculation on the left multiplication result data to generate and output left addition result data;
a left accumulator configured to perform an accumulative adding calculation on the left addition result data and left latched data to generate and output left MAC data; and
a left output buffer configured to transmit the left MAC data to one output circuit, which is allocated to the MAC operator including the left MAC operator and the right MAC operator, among the plurality of output circuits in response to the first MAC read signal.

8. The PIM device of claim 7, wherein the left accumulator includes:
a left accumulative adder configured to perform an adding calculation on the left addition result data and the left latched data to generate and output left accumulated data; and
a left latch circuit synchronized with a left clock signal having a first logic level to output latched data in the left latch circuit as the left latched data input to the left accumulative adder and to latch and output the left accumulated data output from the left accumulative adder.

9. The PIM device of claim 8, wherein the right MAC operator includes:
a right multiplication circuit configured to perform a multiplying calculation on the right weight data and the right vector data to generate and output right multiplication result data;
a right adder tree configured to perform an adding calculation on the right multiplication result data to generate and output right addition result data;
a right accumulator configured to perform an accumulative adding calculation on the right addition result data and right latched data to generate and output right MAC data; and
a right output buffer configured to transmit the right MAC data to one output circuit, which is allocated to the MAC operator including the left MAC operator and the right MAC operator, among the plurality of output circuits in response to the first MAC read signal.

10. The PIM device of claim 9, wherein the right accumulator includes:
a right accumulative adder configured to perform an adding calculation on the right addition result data and the right latched data to generate and output right accumulated data; and
a right latch circuit synchronized with a right clock signal having the first logic level to output latched data in the right latch circuit as the right latched data input to the right accumulative adder and to latch and output the right accumulated data output from the right accumulative adder.

11. The PIM device of claim 10,
wherein the left memory bank and the right memory bank are configured to store activation function data;
wherein the left output buffer configured to transmit the left MAC data to the allocated output circuit in response to an activation signal for activating rows of the left memory bank and the right memory bank in which the activation function data is stored; and
wherein right output buffer configured to transmit the right MAC data to the allocated output circuit in response to the activation signal.

12. The PIM device of claim 11,
wherein the left output buffer is configured to transmit the left MAC data to the allocated output circuit in response to an activation function signal requesting a process or application of an activation function; and wherein the right output buffer is configured to transmit the right MAC data to the allocated output circuit in response to the activation function signal.

13. The PIM device of claim 12,
wherein the allocated output circuit includes an addition adder generating and outputting the MAC result data; and
wherein the allocated output circuit applies the activation function data to the MAC result data to generate the activation function-processed MAC result data in response to the activation function signal.

14. The PIM device of claim 13, wherein the allocated output circuit is configured to output the MAC result data in response to the first MAC read signal having the first logic level.

15. The PIM device of claim 14, wherein the allocated output circuit is configured to output the activation function-processed MAC result data in response to the second MAC read signal having the first logic level.

16. The PIM device of claim 1, wherein each of the plurality of output circuits includes:

an additional adder configured to generate and output the MAC result data;
a first AND gate configured to perform a logical AND operation on an activation function signal and the MAC result data;
an activation function logic circuit configured to apply activation function data to output data of the first AND gate to generate and output the activation function-processed MAC result data;
a second AND gate configured to perform a logical AND operation on the MAC result data and the first MAC read signal to generate and output first output data;
a third AND gate configured to perform a logical AND operation on the activation function-processed MAC result data and the second MAC read signal to generate and output second output data; and
an OR gate configured to perform a logical OR operation on the first output data and the second output data to selectively output one of the MAC result data and the activation function-processed MAC result data.

* * * * *